United States Patent [19]

Chelcun et al.

[11] 4,227,045
[45] Oct. 7, 1980

[54] DATA PROCESSING PROTOCOL SYSTEM

[75] Inventors: Darrell Chelcun, Boling Brook; Lawrence J. Dressel, Bartlett, both of Ill.

[73] Assignee: Honeywell Inc., Minneapolis, Minn.

[21] Appl. No.: 919,871

[22] Filed: Jun. 28, 1978

[51] Int. Cl.² .......................................... H03K 13/24
[52] U.S. Cl. ........................... 178/66.1; 340/347 DD; 375/28
[58] Field of Search ................. 178/68, 3; 325/38 R, 325/38 A; 340/347 DD; 328/116, 118, 119

[56] References Cited
U.S. PATENT DOCUMENTS

| | | | |
|---|---|---|---|
| 3,691,553 | 9/1972 | McIntosh | 178/68 |
| 3,705,398 | 12/1972 | Kostenbauer et al. | 340/347 DD |
| 3,744,051 | 7/1973 | Sanders et al. | 178/68 |

Primary Examiner—Thomas A. Robinson
Attorney, Agent, or Firm—Trevor B. Joike

[57] ABSTRACT

A transceiver circuit for connecting a data processing unit to a communication bus, wherein said data processing unit is capable of transmitting, receiving and processing non-return to zero (NRZ) signals having a normally high level and assuming a low level to indicate a data bit and said communication bus is capable of transmitting a pulse-no pulse signal to indicate data bits, is disclosed having an input connected to the data processing unit for receiving the non-return to zero signals, a triggering circuit which is responsive to a leading edge of a non-return to zero signal to supply triggering pulses having a predetermined frequency, a gating circuit for passing through the triggering pulses as long as the non-return to zero signal is at a predetermined level, and a pulse-no pulse circuit responsive to the triggering pulses for supplying the pulse-no pulse signals to the communication bus. In addition, the receive portion of the transceiver circuit is responsive to the pulse-no pulse signals to convert them into non-return to zero signals.

24 Claims, 26 Drawing Figures

DATA PROCESSING PROTOCOL SYSTEM

BACKGROUND OF THE INVENTION

This invention is related to a protocol system wherein each station connected to a data bus of a data processing system must calculate its time to transmit turn during which it may begin transmitting data on the bus. This data processing equipment may be used for building automation, monitoring and control for fire and security management, air-conditioning control, or the like.

Prior art data processing systems, for example those systems used for controlling or supervising the environment or fire and security points within a building, having a central panel for providing alarm or status indications of the various points within a building, originally provided a separate wire running from the panel to each supervised point. In today's large buildings, however, the cost of wiring in this manner can be prohibitive. Therefore, the prior art replaced these plurality of wires by a single transmission channel running from the central processing unit to the remote points being monitored.

The central processing unit is capable of scanning the status of the various remote points and controlling various operations at the remote points by addressing, in turn, each remote point and requiring each remote point to take some action. This action may be to report back its present status, such as temperaure, pressure or humidity, or to perform some operation such as starting or stopping a fan, opening a damper or the like. By using one or more of these multiplexed transmission channels, the cost of installation of these monitoring systems is greatly reduced.

In such systems, the central processing unit typically consisted of a computer connected to one or more such channels running to the various remote points in a building. The size of the computer which was used in the central processing unit depends upon the number of remote points to be monitored and controlled. Because of flexibility and convenience, it has become necessary to configure such systems in such a manner that they can be expanded and can be interconnected for complex, large or multiple building facilities.

The present system comprises a plurality of remote stations each connected to a data bus. Each remote station may have a microprocessor or other type of computer connected through various circuits to the data bus and also connected to peripheral devices such as displays, supervised and control points, or the like.

Since the remote stations connected to the data bus may be physically separated by several miles, data communications between them is in serial form to permit transmission over common and inexpensive mediums or buses, such as phone lines and triaxial cables. Serial data transmission on a "party line" requires a protocol to prevent more than one device from transmitting at a time and to identify the transmitting device. This communication protocol is accomplished through a disclosed Transmission Protocol residing in each remote station.

A bus controller is not necessary since each remote station is capable of transmitting and receiving data independently of a controller. However, a bus monitor is utilized to make sure that the remote stations are transmitting in their proper turns. Functionally, each remote station continuously monitors all "party line" bus traffic. Based on present and past transmissions, each module "knows" its turn or time slot to transmit and transmits only at that time.

SUMMARY OF THE INVENTION

A transceiver circuit is disclosed for use in a data processing system for converting between the non-return to zero signals of a data processing unit and the pulse-no pulse signals which are transmitted on a communication bus having a triggering circuit responsive to the leading edge of a non-return to zero signal to begin supplying triggering pulses of a predetermined frequency, a gate circuit for passing through the triggering pulses as long as the non-return to zero signal is at a predetermined level and a pulse-no pulse circuit responsive to the triggering pulses for supplying pulse-no pulses to the communication bus. The receiving portion of the transceiver circuit likewise converts the pulse-no pulse signals on the communication bus to non-return to zero signals for supplying to the data processing unit.

BRIEF DESCRIPTION OF THE DRAWINGS

These and other features and advantages of the invention will become apparent when taken into consideration with the drawings in which.

DETAILED DESCRIPTION OF THE INVENTION

Figure 1:
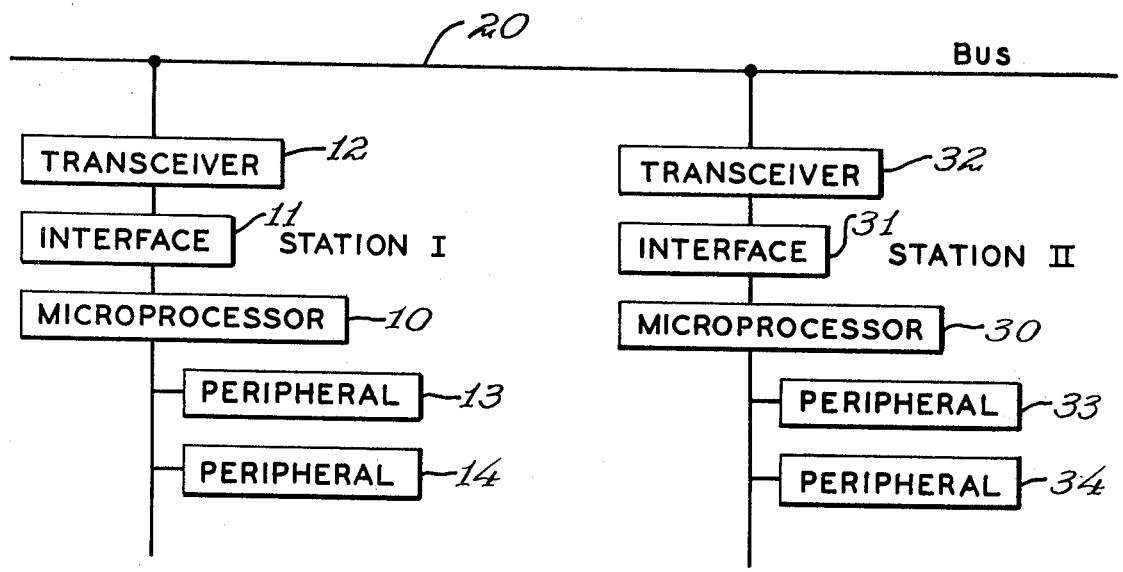
FIG. 1 is a generalized block diagram of the present invention showing two remote stations connected to a common data bus.

In FIG. 1, Station I comprises microprocessor 10 connected to common data or communication bus 20 through interface circuit 11 and transceiver circuit 12. In addition, the microprocessor may also be connected to peripheral devices 13 and 14. These peripheral devices may take the form of CRT or printer displays, supervisory or control points in building automation or fire and security systems, or the like.

Station II is also connected to common data bus 20 and comprises microprocessor 30 connected to data bus 20 through interface circuit 31 and transceiver circuit 32. In addition, microprocessor 30 may be connected to peripheral devices 33 and 34.

Based on present and past transmissions, each station on the common communication bus "knows" its turn or sequential time slot during which it can transmit data, and transmits only at that precise turn or time slot. Thus, no two remote stations can talk on the bus at the same time unless a system error has occurred. If a remote station does not transmit when its turn to transmit occurs, a system error results. A remote station's individual time slot during which only it can transmit is calculated based on the sender's address of the remote station presently transmitting. Thus, a time slot does not depend upon time so much as it does upon priority. After each transmission is begun, each remote station recalculates its own time slot based upon the present sender's address and its own address. The number of total time slots for this system is fixed but does not have to equal the number of remote stations connected to the data bus. For example, in the present system the total number of time slots may be 127 and the maximum number of remote stations may be 99. Thus, a remote station may have assigned to it a real time slot (1–99) during which it can transmit any type of message and a pseudo time slot (100–127) during which it may transmit specified types of messages only.

Each station connected to the data bus contains its own precision oscillator which controls the station's Baud rate. Since the Baud rate for each station is the same, each station is synchronized with each other within one bit width.

After a station transmits and assuming it is not assigned to a pseudo time slot, it sets a countdown counter to 256 which is twice the 127 slots plus 2. The extra 2 counts results in a count of 4 being necessary to switch from time slot 127 to time slot 1 since there is no time slot 0. After station 48 transmits its address, station 50 calculates its time to transmit count by subtracting 48 from 50 and multiplying by 2, or 4. Each station also generates interrupts after predetermined lengths of time started after no data is on the data bus. If station 49 fails to transmit, station 50 will transmit after 4, [2(50-48)], interrupts. If station 49 transmits, station 50 now sets its counter at 2(50-49) or 2. After two quiet interrupts decrementing its counter to 0, station 50 may now transmit. Once station 50 transmits, it sets its counter to 256; but if it has a pseudo time slot, e.g. 101, it sets its counter at 2(50-101) or 102, calculations being done in the binary system. A station which has assigned to it both a real time slot and a pseudo time slot will have a real address and a pseudo address so that it may put into its countdown count a count which depends upon the address of the last transmitter, and its own real address or pseudo address depending upon whether its real time slot or pseudo time slot is coming up next.

Figure 2:
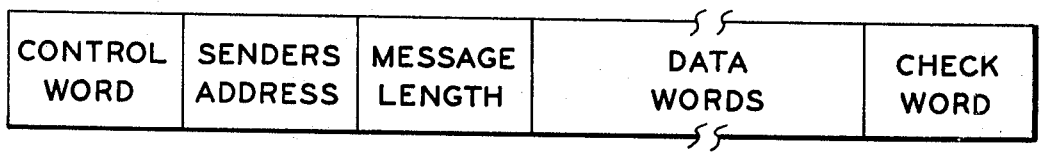
FIG. 2 shows a typical message, comprising a plurality of words, which can be transmitted from one station to another.
Figure 11:
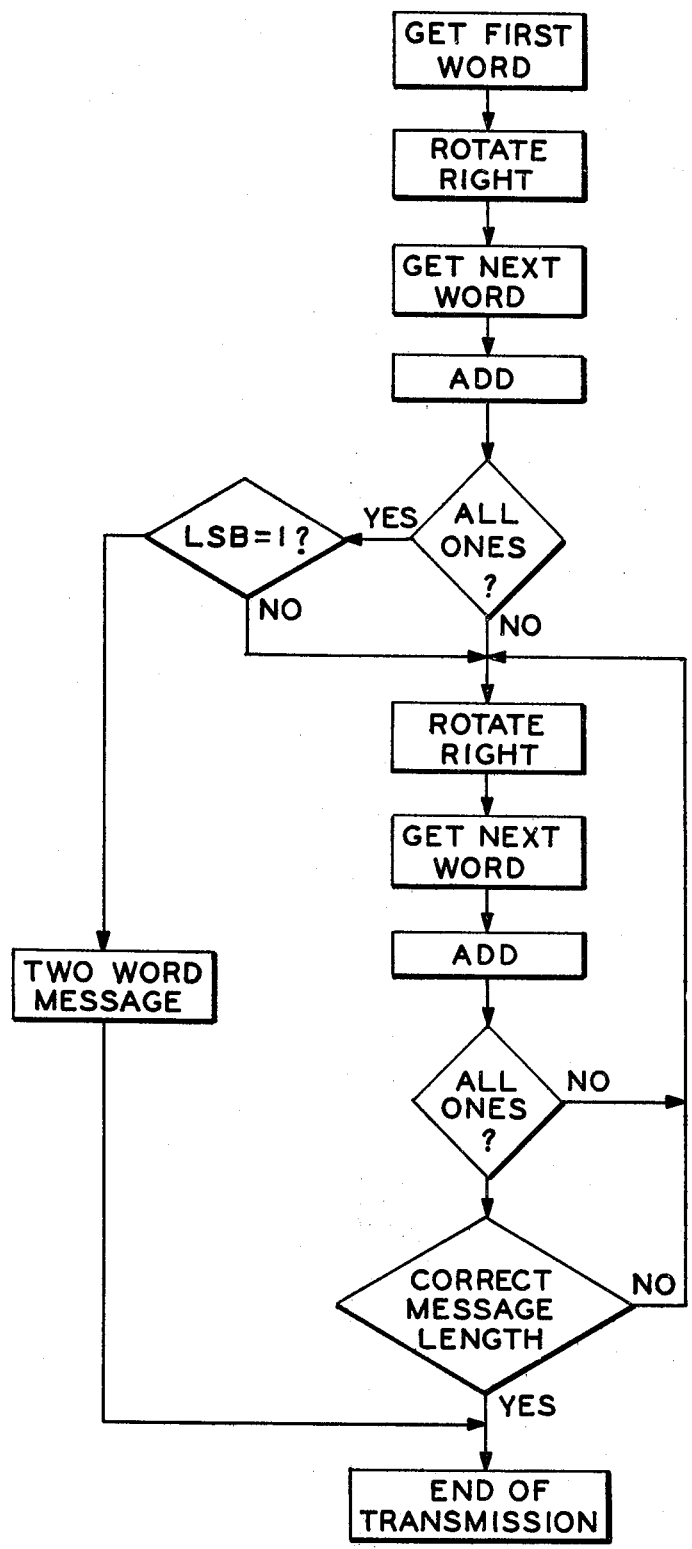
FIG. 11 shows the routine used for forming the check word shown in FIG. 2.

FIG. 2 shows the message format for the present protocol system. Each message which is transmitted on the data bus must comprise at least two words, the control word and the sender's address. If more than two words are transmitted by a remote station, the message must then comprise a message length word which indicates the total number of words in a message, the data words and finally a check word. The check word must satisfy the algorithm shown in FIG. 11. As each word is transmitted, the algorithm of FIG. 11 is performed. After all words except the check word have been transmitted, the last or remaining calculated result from the algorithm is complemented and sent out as the check word. When the check word algorithm has been performed and is satisfied, the number or words which were used by the algorithm is compared to the number of words indicated in the message length word. If there is no agreement, a transmission error has occurred and appropriate action is taken. If there is agreement, an end of message has been detected and there has been no error.

Every station must transmit a message. If the station has no data to transmit, then it transmits an "I'm OK" message comprising the control word and its address. If a message is not transmitted by a station during its time slot, an error has occurred. A bus monitor is used in the system and it is the function of the bus monitor to detect these kinds of errors. Each remote station is capable of transmitting a global message which is a message directed to all other stations. Each station is also capable of transmitting direct messages to a specific station. The control word indicates the type of message which is being sent. In a two word "I'm OK" message, the two words must satisfy the check words algorithm even though a check word is not transmitted. Satisfying the check word algorithm is obtained by appropriately constructing the control word.

Figure 3:
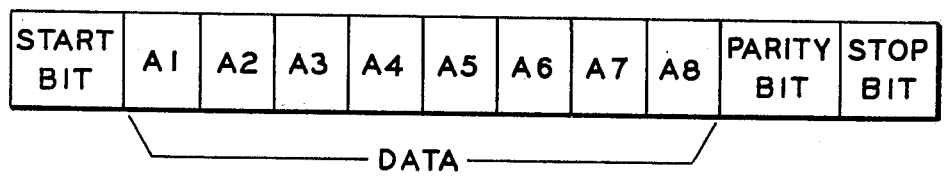
FIG. 3 shows the typical construction for each word in the message of FIG. 2.

Each word in a message takes the format of FIG. 3. It is comprised of a start bit, eight data bits, a parity bit and a stop bit.

Figure 4:
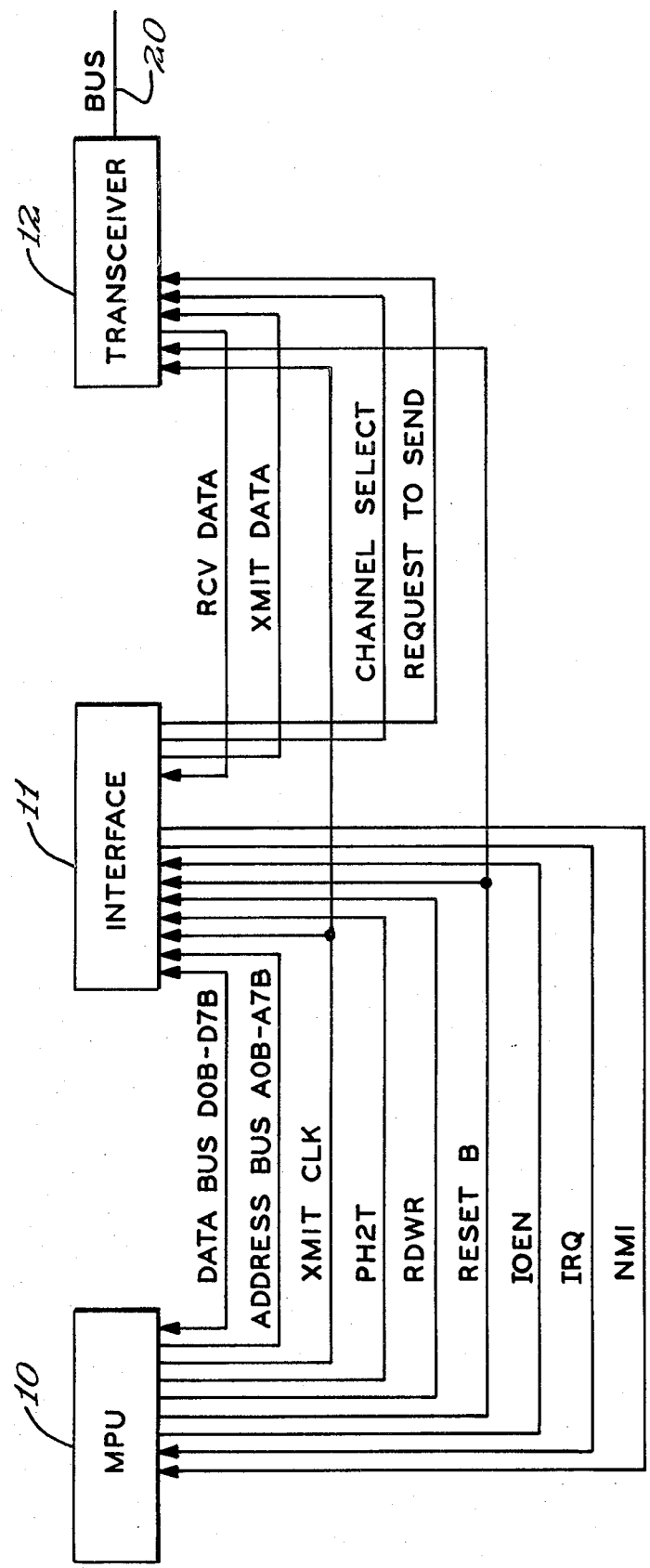
FIG. 4 shows the connecting lines between the various elements of one of the remote stations shown in FIG. 1.

FIG. 4 shows a typical remote station such as Stations I and II of FIG. 1. In FIG. 4, the station comprises microprocessor 10 connected to interface 11 which in turn is connected to transceiver 12 and then to data bus 20. Microprocessor 10 and interface 11 are interconnected by eight data lines D0B–D7B. Interface 11 is also connected to microprocessing unit 10 by an address bus comprising eight address lines, A0B–A7B. Microprocessing unit 10 contains a system clock, not shown, which generates the transmit clock signal, XMIT CLK, to interface 11 and transceiver 12 and PH2T and IOEN signals to interface 11. Also, microprocessing unit 10 generates a read-write signal, RDWR, to interface 11 and a RESET B signal, which is a reset signal generated upon power up, to both interface 11 and transceiver 12. Interface 11 generates interrupt signals IRQ and NMI to microprocessing unit 10. Data which is received from bus 20 by transceiver 12 is transmitted to interface 11 over receive data line, RCV DATA, which is then transmitted by interface 11 to microprocessing unit 10 over data bus lines D0B–D7B. Data to be transmitted from a station to another station on data bus 20 is transmitted by microprocessing unit 10 over data bus D0B–D7B to interface circuit 11 in parallel form and then by interface 11 to transceiver 12 over the MXIT DATA line in serial form and then on to bus 20. If redundant buses are used, the microprocessor through its address bus A0B–A7B will select through interface 11 the specific channel which it wishes to transmit data over. Consequently, a CHANNEL SELECT line runs from interface 11 to transceiver 12. When microprocessing unit 10 wishes to transmit data over the bus 20, it uses the address bus A0B–A7B to interface 11 and then the REQUEST TO SEND line from interface 11 to transceiver 12 to initiate the transceiver 12 to begin transmitting the data from interface 11 to bus 20.

As shown in FIG. 1, the microprocessor is connected not only to interface 11 but to peripheral devices 13 and 14. Thus, each device, i.e., interface 11 and peripherals 13 and 14, has a unique address assigned to it. When the microprocessing unit wishes to transmit data over bus 20, it addresses the interface 11 over the address bus A0B–A7B. Data between the microprocessing unit 10 and interface 11 is transmitted in parallel form over data bus D0B–D7B. Data is transmitted between interface 11 and transceiver 12 in serial form over either line RCV DATA or XMIT DATA. Data is transmitted over the data bus 20 in serial form.

Interface 11 is shown in more detail in FIGS. 5A–5D. FIGS. 5A–5D are interconnected at points designated by a letter number such as D7 or F1. In addition, the terminals which connect interface 11 to microprocessing unit 10 and to transceiver 12 use the symbology shown in FIG. 4.

Figure 5A:
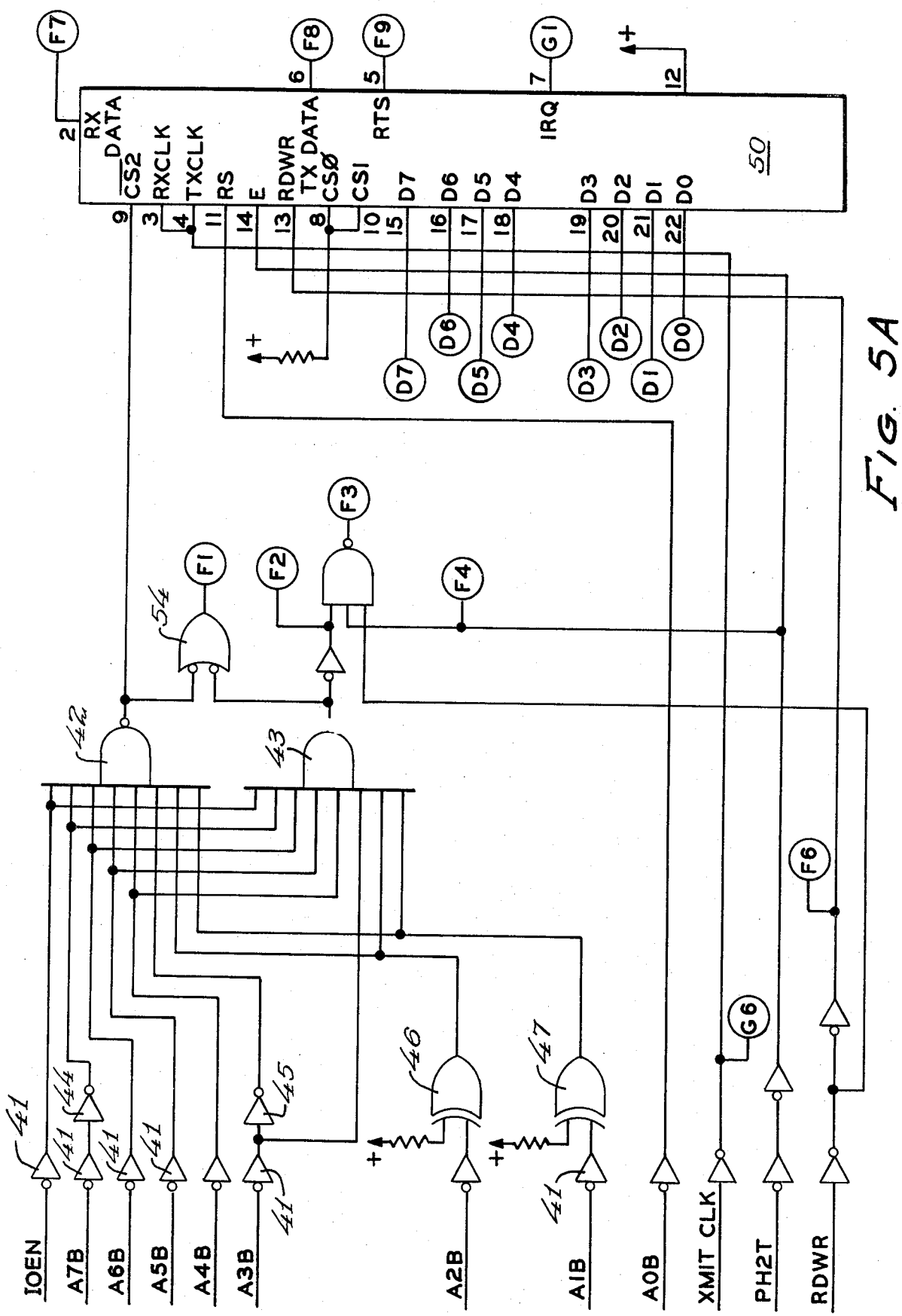
FIGS. 5A–5D show in detail the interface circuit shown in FIG. 1 and 4.

The interface circuit has an address known to the microprocessor and may be addressed by the microprocessor over address lines A0B–A7B shown in FIG. 5A. These address lines are connected through buffer-inverters 41 to various inputs of NAND gate comparators 42 and 43. Specifically, each address line is connected to each NAND gate 42 and 43. In addition to buffer-inverter 41, address line A7B is connected through inverter 44 to both NAND gates 42 and 43. With respect to address line A3B, the output of buffer-inverter 41 is connected to NAND gate 43 directly and is also connected through inverter 45 to NAND gate 42. In addition to buffer-inverters 41, address lines A1B and A2B are connected through EXCLUSIVE OR gates 46 and 47 to each NAND gate 42 and 43. Each EXCLUSIVE OR gate 46 and 47 has a second input connected to a positive voltage bias. Address line A0B is not connected to NAND gates 42 and 43 but, instead, is directly connected to the RS terminal of an asynchronous communication interface adaptor (ACIA) 50 which may be of the type MC6850 manufactured by Motorola. The pin numbers of ACIA 50 have been shown to show how it is connected in the circuit. ACIA 50 is a register which is conditioned to send or receive data by being appropriately addressed by the microprocessing unit over address lines A0B–A7B. In addition, clock line IOEN is connected through a buffer-inverter 41 to both NAND gates 42 and 43. The arrangement of inverters 44 and 45 together with EXCLUSIVE OR gates 46 and 47 determine the particular address of interface 11 shown in FIGS. 5A–5D.

Figure 5B:
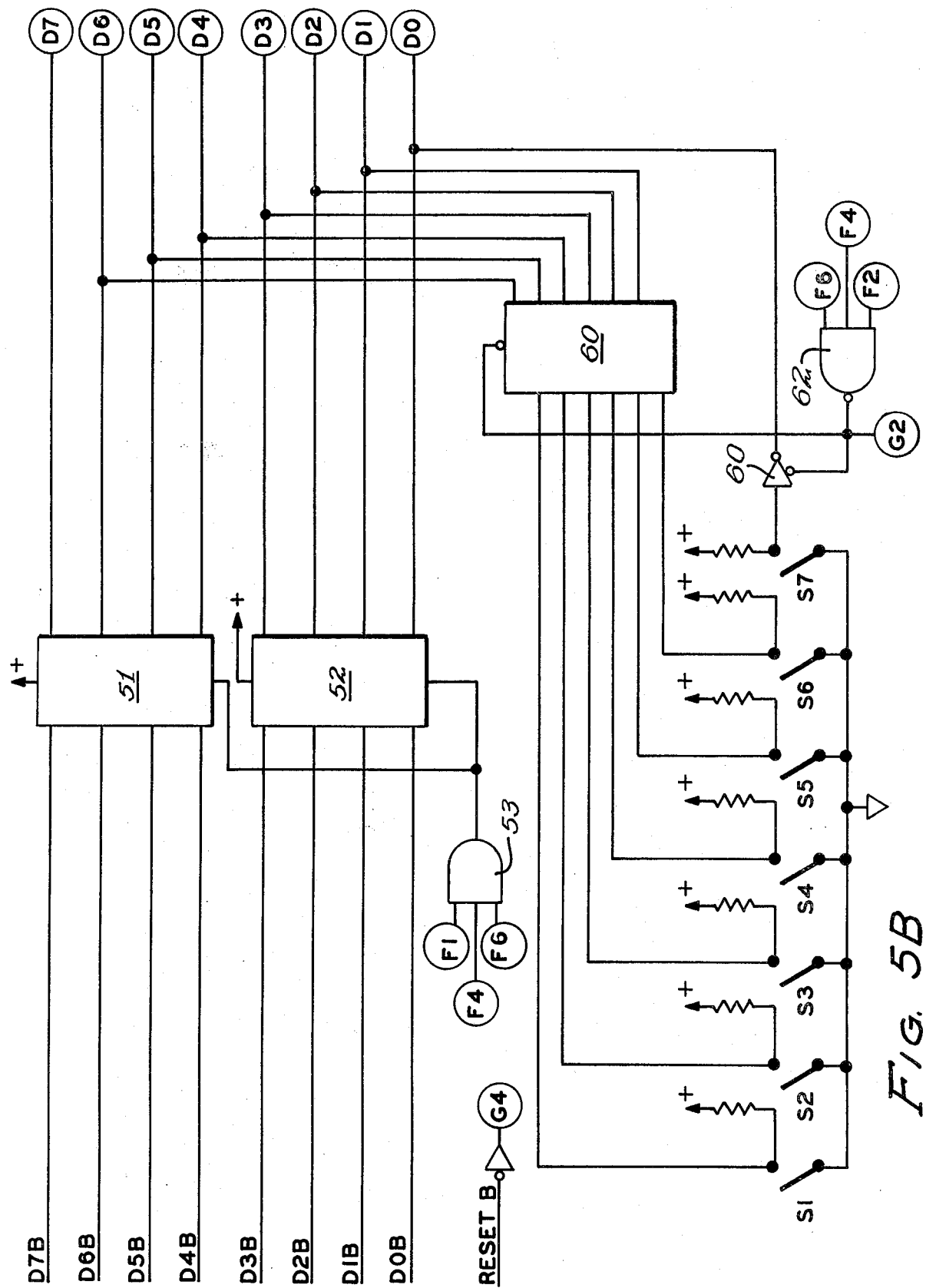

FIG. 5B shows the manner in which the data terminals D0–D7 of ACIA 50 can be connected to the data bus lines D0B–D7B. Data can be supplied to ACIA 50 over data bus lines D0B–D7B and then to data terminals D0–D7 of ACIA 50 for transmission over terminal F8 and then to the transceiver circuit 12 or may be received from transceiver circuit 12 at intput terminal F7 of ACIA 50 for supply over terminals D0–D7 to data bus lines D0B–D7B and then to microprocessing unit 10. Data bus lines D0B–D7B and data terminals D0–D7 of ACIA 50 are interconnected by tri-state buffers 51 and 52 which are bi-directional devices having the type number 8T26. These devices 51 and 52 are conditioned to allow data to pass therethrough in either direction dependent upon the state of AND gate 53 which receives a input at F1 from notted input OR gate 54 which generates an output at F1 whenever interface 11 receives an appropriate address signal from microprocessing unit 10. In addition, AND gate 53 must receive a signal from terminal F4 which receives the PH2T clock signal from microprocessing unit 10 and terminal F6 which receives a read-write signal over line RDWR from microprocessing unit 10. Thus, if data is to be transmitted from the microprocessor unit to the data bus 20, tri-state buffers 51 and 52 are conditioned to allow data to pass from data lines D0B–D7B to terminals D0–D7 of ACIA 50. At the same time, the microprocessing unit conditions ACIA 50 to receive this data and transmit it over terminal F8. If data is to be received from the transmission line and routed to the miroprocessing unit 10, the microprocessing unit 10 supplies the appropriate address to interface 11 which conditions ACIA 50 to receive the data over line F7 and transmit it to terminals D0–D7. At the same time, tri-state buffers 51 and 52 are conditioned by microprocessing unit 10 to allow the data at terminals D0–D7 of ACIA 50 to be supplied to data bus lines D0B–D7B.

FIG. 5B also shows a bank of switches S1–S7 which establish the address for the particular interface 11 shown in FIG. 4. A closed switch indicates a high level or "one" and an open switch indicates a low level or "zero." These switches are connected through a series of tri-state buffers 60 shown connected to all of the switches S1–S7 plus an additional tri-state buffer 60 shown in FIG. 5C connected to terminal D7 of ACIA 50 and to NMI flip-flop 61. The tri-state buffers 60 are connected to terminals D0–D7 of ACIA 50 and are multiplexed along with ACIA data lines D0–D7 to drive buffers 51 and 52 shown in FIG. 5B. When NMI flip-flop 61 is set, a 1 appears and is read at terminal D7 indicating that the device is requesting an NMI interrupt. The reading of this bit will automatically reset NMI flip-flop 61 as discussed hereinafter. Thus, the microprocessing unit will know when it receives an interrupt and, because of switches S1–S7, the identity of the device which has issued the interrupt.

Buffers 60 are conditioned to transmit the address and NMI interrupts to data terminals D0–D7 by NAND gate 62 shown in FIG. 5B. The output of NAND gate 62 is connected directly to buffers 60 shown in FIG. 5B and through terminal G2 to buffer 60 shown in FIG. 5C. In order for NAND gate 62 to condition buffers 60, NAND gate 62 receives inputs from terminal F2 which is an address decode terminal, terminal F4 which is the PH2T clock terminal and terminal F6 which is the RDWR input terminal.

Figure 5C:
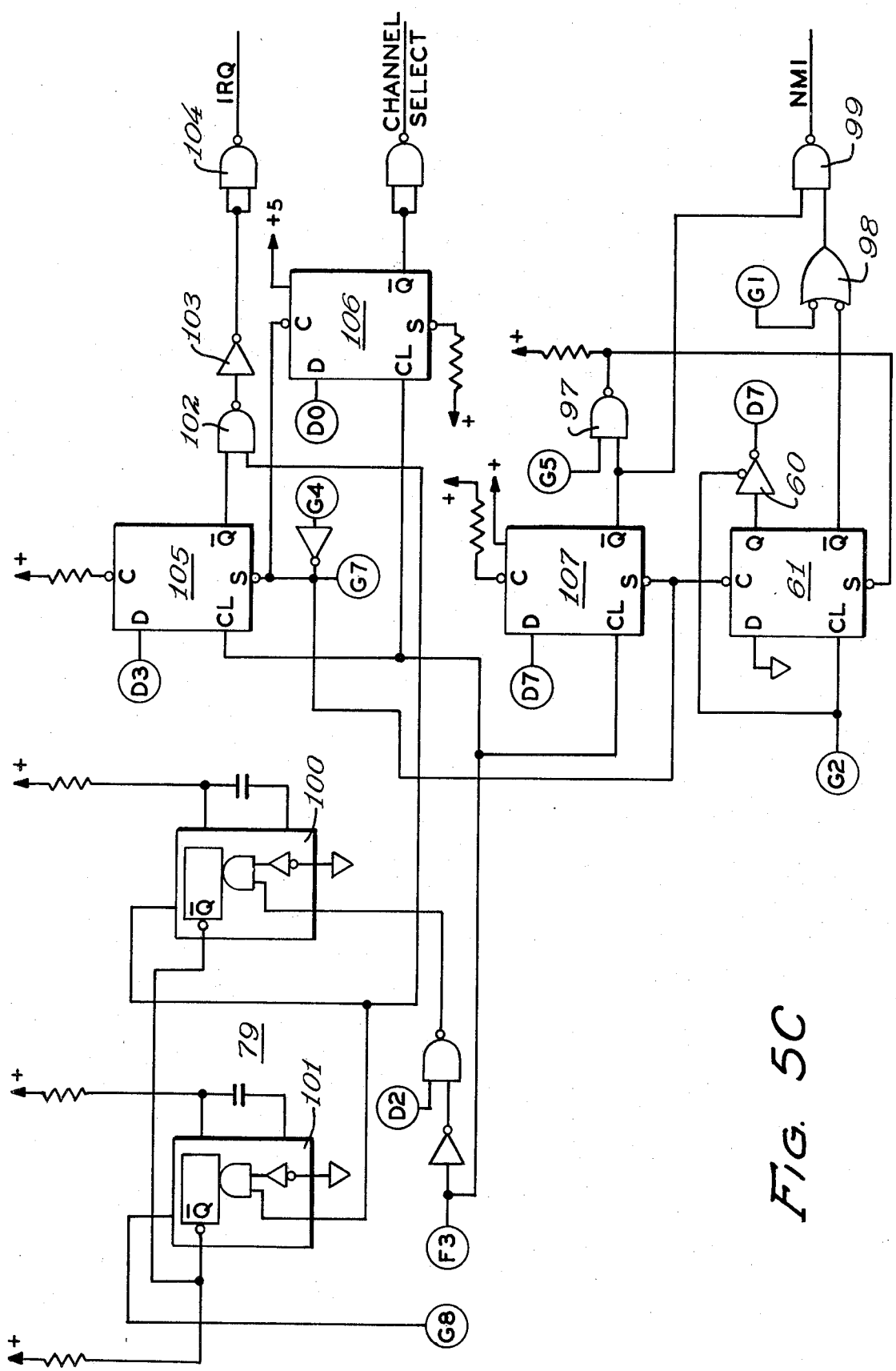
Figure 5D:
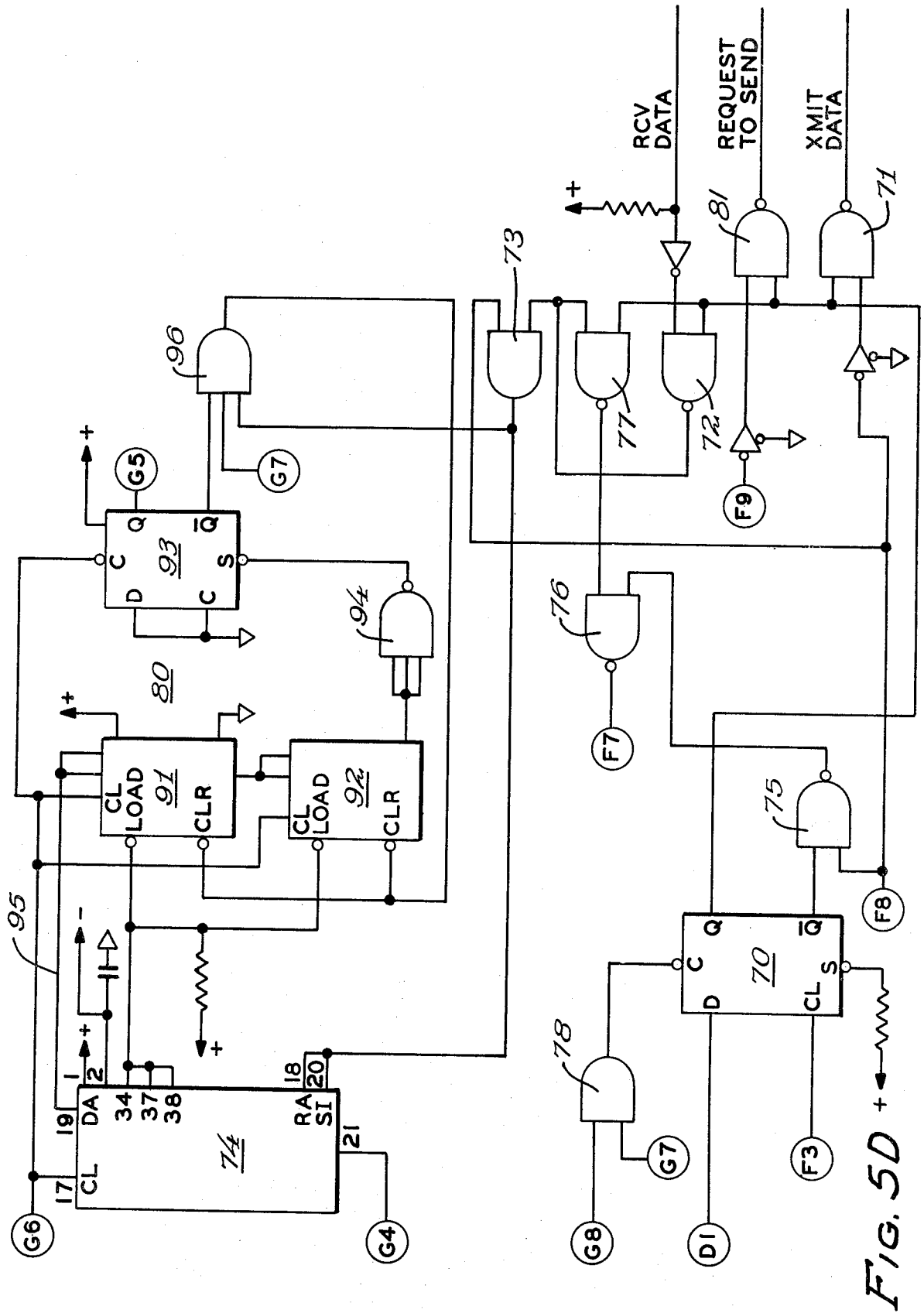

On Line flip-flop 70 shown in FIG. 5D determines whether data can be transmitted between interface 11 and transceiver 12 over RCV DATA and XMIT DATA line. If On Line flip-flop 70 is in its reset state, its Q output is low which precludes the XMIT DATA NAND gate 71 and the RCV DATA NAND gate 72 from allowing the passage of data therethrough. With a zero to the input of NAND gate 72, its output is at a logic level 1 which conditions AND gate 73 to recirculate data from ACIA transmit terminal F8 through AND gate 73 and to universal asynchronous receiver transmiter 74 which may be a Harris 6402 device. Also, with On Line flip-flop 70 in its reset condition, its Q terminal is at a logic level one which conditions NAND gate 75 to allow the data to pass from transmit terminal F8 of ACIA 50 through NAND gate 75 to the input of NAND gate 76. Since one input of NAND gate 77 is connected to the Q terminal of On Line flip-flop 70, that input terminal will be a logic level 0 which dictates that its output is a logic level 1 which conditions NAND gate 76 to pass the data coming from ACIA output terminal F8 through NAND gate 75 to terminal F7 which is connected back to the input or data receive terminal F7 of ACIA 50. In this way, the software of the microprocessing unit can, at any time, disconnect the station from the data bus and run a diagnostic program to check the transmit and receive functions of the ACIA as well as the function of the Bit Time Interrupt Generator 80 to be discussed hereinafter. Terminal C of On Line flip-flop 70 is the reset terminal for this flip-flop as long as terminal S is connected to a high input which, as can be seen in FIG. 5D, it always is. Thus, with terminal C low, On Line flip-flop 70 is in a condition where its Q output is at a logic level 0 and its $\bar{Q}$ output is at a logic level 1 regardless of the D input and the clock input. When the C terminal goes high, the clock input will set the Q output terminal at whatever logic level happens to be on the D input terminal. On Line flip-flop 70 is reset at terminal C through NAND gate 78 which receives a reset signal from terminal G7 which, as shown in FIG. 5C, is connected to the output of an inverter from terminal G4, the RESET B input terminal shown in FIG. 5B. Thus upon power up, flip-flop 70 is reset. At other times it is allowed to be clocked at terminal F3 except when it receives an input at G8 from WATCHDOG TIMER 79 shown in FIG. 5C to be discussed hereinafter. Thus, the address decode terminal F3 clocks On Line flip-flop 70 to control the Q output terminal at a logic level dependent upon the D1 input terminal which is received from the microprocessing unit. When the microprocessing unit desires that interface 11 should be operated in a non-diagnostic mode such that information can be transferred between the bus 20 and microprocessing unit 10, a logic level 1 is supplied to the D input of On Line flip-flop 70 and then it is clocked by addressing code terminal F3 to force the Q output terminal to a logic level 1 which conditions NAND gate 71 to transmit data and NAND gate 72 to receive data.

On Line flip-flop may be device 74LS74 supplied by Fairchild. When the Q output of On Line flip-flop 70 is high, it conditions NAND gate 81 to supply a REQUEST TO SEND signal from terminal F9 ACIA 50 to transceiver 12.

Data is received on the RCV DATA line shown in FIG. 5D and is supplied through NAND gate 72 when the input of that NAND gate which is connected to the Q output of On Line flip-flop 70 is high. This data is supplied through AND gate 73 to the input to Universal Asynchronous Receiver Transmitter 74 and is clocked into that device by the clock terminal connected to G6 which, as shown in FIG. 5A, is the transmit clock line XMIT CLK. At the same time, the intput of NAND gate 75, which is connected to the $\bar{Q}$ terminal of On Line flip-flop 70, is at a logic level 0 which means its output is at a logic level 1 conditioning NAND gate 76 to supply data from NAND gates 72 and 77 to the input terminal F7 to ACIA 50. This data is clocked into the registers of ACIA 50 by the transmit clock line XMIT CLK. Similarly, when data is to be supplied to the transceiver board over terminal XMIT DATA, On Line flip-flop 70 conditions NAND gate 71 to supply this data from the output terminal F8 of ACIA 50 under control of the transmit clock line XMIT CLK connected to the ACIA 50.

The purpose of the Bit Time Interrupt Generator 80 is to generate NMI interrupt signals in a fixed repeating period when there is no transmission present on the data bus. Specifically, if, because of a failure at a station which is suppose to transmit during a particular time slot, interface 11 receives no message for a predetermined length of time, then all remote stations will receive interrupt signals from their Bit Time Interrupt Generators which are counted by the system software to determine the time slot when each station in its turn will transmit. In this way, the failure of one station to transmit does not terminate the transmission of data by all other stations.

Bit Time Interrupt Generator 80 comprises a divide by 16 counter 91 and a counter 92 both of which may be devices 74LS161. Generator 80 also comprises a Set NMI flip-flop 93 which may be of the same type as the flip-flop 70. Flip-flop 93 is connected such that its S terminal connected from NAND gate 94, connected as an inverter, is normally high such that the input from the XMIT CLK terminal G6 connected to terminal C has no effect on the Q and $\bar{Q}$ outputs. As soon as the input to inverter 94 goes high so that the S terminal flip-flop 93 goes low, the next XMIT CLK signal will change the state of the Q and $\bar{Q}$ outputs.

Counter 91 divides the XMIT CLK signal by 16 which essentially establishes the Baud rate for the system. Thus, a bit width is defined as 16 pulses of the transmit clock. Counter 92 divides the output from counter 91 by 8 to establish a time slice which is defined as 8-bit widths. Counters 91 and 92 are enabled to count clock pulses from the transmit clock terminal G6 through line 95 only when device 74 has received a complete data word. Thus, Bit Time Interrupt Generator 80 begins counting each time a word has been completely received by device 74 over the data bus 20 and from transceiver 12. AND gate 96 clears counters 91 and 92 when a new word is received through AND gate 73. Thus, as long as traffic exists on the data bus, AND gate 96 will prevent counters 91 and 92 and flip-flop 93 from generating an interrupt signal. When data is not on the data line, AND gate 96 will not clear counters 91 and 92 and, when counter 92 reaches a count of 8 (the predetermined length of time discussed above), flip-flop 93 will set upon receipt of the next clock signal from terminal G6 to switch its Q and $\bar{Q}$ outputs. When flip-flop 93 is set, counters 91 and 92 are cleared through AND gate 96 and a signal is supplied to terminal G5 which sets flip-flop 61 through NAND gate 97. When counter 92 is reset, the next clock pulse from terminal G6 will reset flip-flop 93. When NMI flip-flop 91 is set, an NMI interrupt is generated through notted input OR gate 98 of FIG. 5C and NAND gate 99. Line NMI is connected to the microprocessor. This interrupt signal, called a quiet interrupt because it was generated by Bit Time Interrupt Generator 80, is then used by the microprocessor in calculating its own time slot. Counters 91 and 92 will begin counting again and will supply further interrupts until traffic resumes on the data bus. Counters 91 and 92 may also be cleared by the RESET B inverted signal supplied through NAND gate 96 by terminal G7.

Watchdog Timer 79 is comprised of retriggerable one-shot multivibrators 100 and 101. Each device may be a 74LS123 with device 100 producing an output five seconds after it receives its input. Multivibrator 101 produces an output 500 nanoseconds after it receives an input from multivibrator 100. Multivibrator 100 is triggered through a combination of an input from terminal F3, which is a composite of the address decode circuit shown in FIG. 5A, the RDWR terminal and a PH2T clock signal, and a signal from terminal D2 of ACIA 50. Thus, each time the interface is properly addressed by the microprocessing software, multivibrator 100 is retriggered. Should a fault in the system occur such that communication between the microprocessing unit and the interface circuit has ceased, Watchdog Timer 79 times out and provides an output through NAND gate 102, inverter 103 and inverter 104 to the IRQ output which is an interrupt supplied to the microprocessing unit. In addition, an output is supplied by multivibrator 101 to terminal G8 which is connected through AND gate 78 to On Line flip-flop 70 of FIG. 5D for resetting this flip-flop and taking the interface apparatus off line.

The output from multivibrator 100 to NAND gate 102 can be masked by Watchdog Timer Mask flip-flop 105 which may be of the same type as On Line flip-flop 70. When the microprocessor wishes to prevent the Watchdog Timer from supplying an interrupt IRQ signal, it places a logic level 1 on the data bus D3B which is connected through a tri-state buffer to terminal D3 of flip-flop 105. A signal from terminal F3 will clock flip-flop 105 to drive the Q output low which precludes the output from multivibrator 100 from passing through NAND gate 102.

Channel Select flip-flop 106, which may be of the same type as On Line flip-flop 70, is configured such that a clock input will invert the D input on the $\overline{Q}$ output. Thus, the microprocessing unit can select which of two channels it desired to transmit data over by placing the appropriate signal on data bus line DOB which is connected through terminal DO to Channel Select flip-flop 106.

Finally, flip-flop 107, which may be of the same type as On Line flip-flop 70, is configured as an NMI mask flip-flop and can be utilized by the microprocessing unit for prohibiting NMI interrupt signals from being generated by the interface circuit to the microprocessing unit. The $\overline{Q}$ output from NMI mask flip-flop 107 is normally high which conditions NAND gate 99 to pass through to the NMI interrupt line any signal from NMI flip-flop 61. When an interrupt signal is generated by Bit Time Interrupt Generator 80 at terminal G5, it is connected through NAND gate 97 to set NMI flip-flop 61 at terminal S. This causes the $\overline{Q}$ terminal of NMI flip-flop 61 to go low which, because of the notted input terminal of OR gate 98, raises the output of OR gate 98 and produces an NMI interrupt on the NMI line. If the microprocessing unit decides to mask the NMI interrupt line, it provides an appropriate signal over data bus line D7B which is connected through terminal D7 to the input of NMI Mask flip-flop 107. Thus, upon the next clock signal, the $\overline{Q}$ output from flip-flop 107 goes low which prevents any signal passing through either NAND gate 97 or NAND gate 99.

When the microprocessing unit wishes to transmit data out on the data bus, it supplies data on data bus lines DOB-D7B which are entered into ACIA 50. When ACIA has received a complete word, it generates an IRQ output through notted input OR gate 98 to provide an NMI interrupt, called a transmit interrupt because of the transmit mode, informing the microprocessing unit that the ACIA is now in condition for transmitting data. The microprocessor unit will then address ACIA 50 and supply transmit clock signals to it to transmit the data out of the ACIA line at terminal F8.

When ACIA 50 has received data at its input terminal F7, an interrupt is generated at G1 indicating that a complete word has been received in ACIA 50. This interrupt, called a receive interrupt, is then connected through OR gate 98 to NMI interrupt line which is received by the microprocessing unit to then read the data stored in ACIA 50.

Therefore, three types of interrupts are generated over line NMI. A quiet interrupt which is generated by the Bit Time Interrupt Generator when no messages have been received by the interface for a predetermined length of time or count, a receive interrupt when data is being received and a transmit interrupt when data is to be transmitted from ACIA 50. Microprocessor 10 is capable of deciphering these three interrupts. Thus, if it is transmitting data and receives an interrupt, it knows that the interrupt is a transmit interrupt. To distinguish between a quiet interrupt generated by the Bit Time Interrupt Generator and a receive interrupt generated by ACIA 50, it scans the data bus lines DOB-D7B. If no data appears on the line, the interrupt is a quiet interrupt. If data does appear on the line, the interrupt is a receive interrupt. These interrupts and the ability of the microprocessing unit to distinguish between the types of interrupts it receives become important when considering the way in which the microprocessing unit determines its time slot for transmitting data.

Figure 6A:
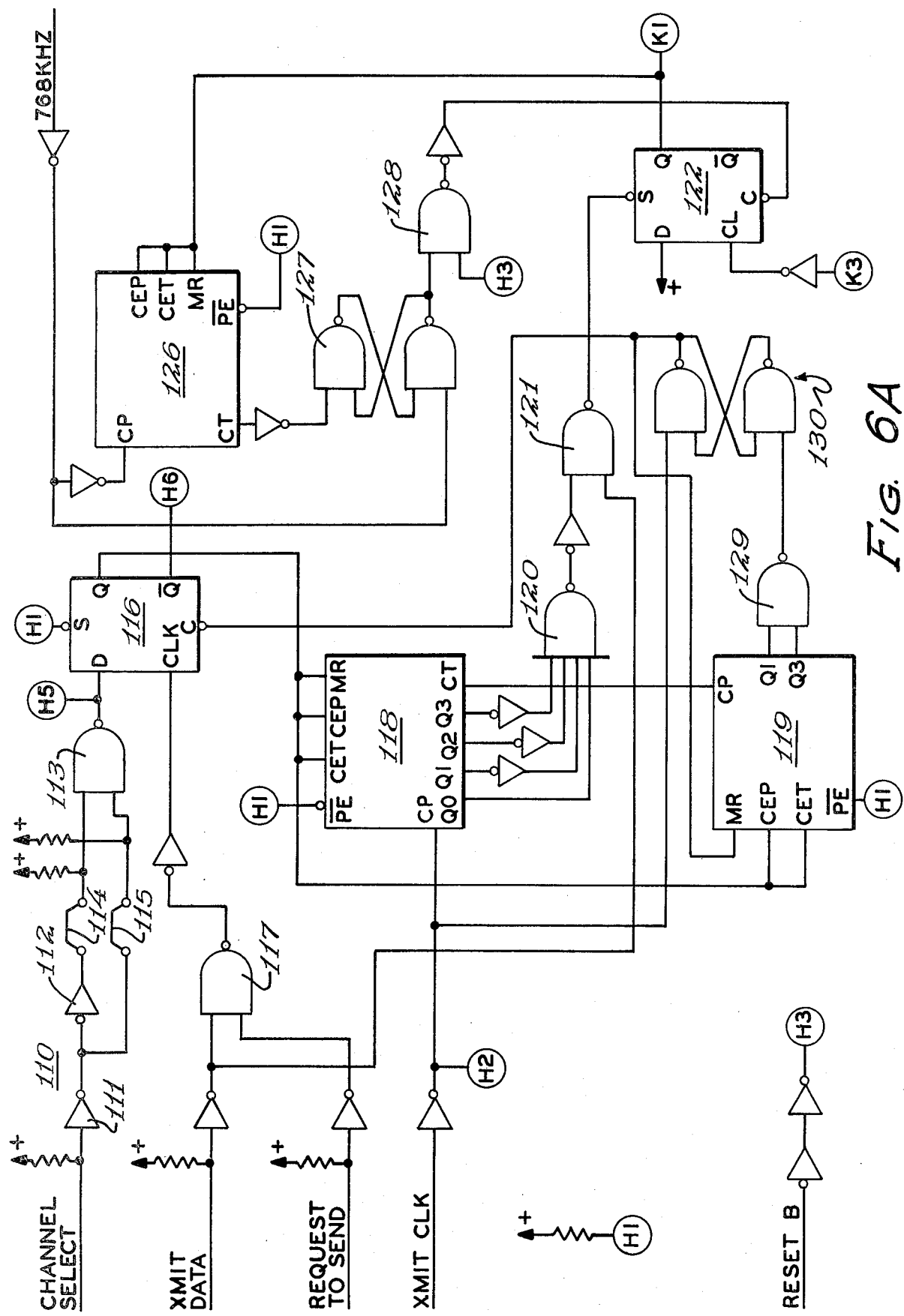
FIGS. 6A–6E show the transceiver circuit shown in block form in FIGS. 1 and 4.
Figure 6B:
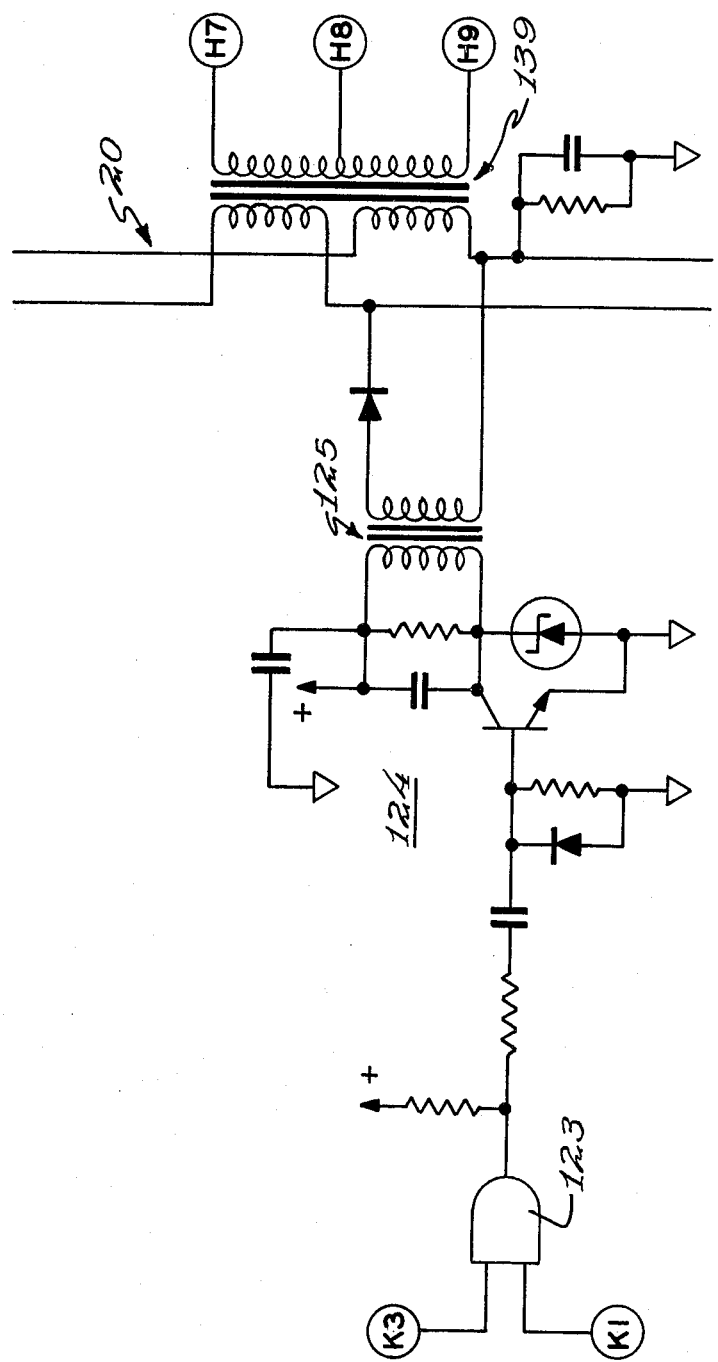

The transceiver circuit which connects interface 11 to data bus 20 is shown in more detail in FIGS. 6A-6E. Again, the interconnection between these figures is shown by circles letter-number reference numerals such as H1 and K3. The connection between the transceiver circuit and the data bus is shown in FIG. 6B and the connection between transceiver circuit 12 and interface circuit 11 is shown by appropriate terminals in FIGS. 6A and 6E.

The primary functions performed by the transceiver circuit are to receive and transmit data in serial form between interface 11 and data bus 20 and to convert the non-return to zero level (NRZ-L) serial data received from the ACIA of the interface circuit to pulse-no pulse (PNP) serial data form which is used on the data line. FIG. 6G shows the difference between the form of the data transmitted between transceiver 12 and interface 11 and the data transmitted between transceiver 12 and data bus 20. The non-return to zero level signal is shown by the NRZ-L diagram of FIG. 6G. A high level indicates a data bit 0 and a low level indicates a data bit 1. This diagram shows a 1 start bit and then 8 data bits having various values. Data bits 1 and 2 are 0 bits, data bit 3 is a 1 data bit, data bit 4 is a 0 data bit, data bits 5 and 6 are 1 data bits, data bit 7 is a 0 data bit, and data bit 8 is a 1 data bit. When the transceiver circuit 12 is transmitting data from microprocessing unit 10 to data bus 20, it receives the NRZ-L data and converts it to PNP data. Thus, pulses are supplied to the data bus for the start bit and data bits 3, 5, 6 and 8. Conversely, as data bits are received on data bus 20 into transceiver 12, transceiver 12 converts the pulse-no pulse data bits into NRZ-L data information.

When the microprocessing unit 10 wishes to transmit data on data bus 20, it supplies data to the interface circuit as discussed above and also transmits a signal out through the interface circuit to be placed upon the channel select input line in FIG. 6A. This signal is supplied through a circuit 110 which comprises an inverter 111, a buffer-inverter 112 and a NAND circuit 113 connected as shown. A pair of straps 114 and 115 are also included in this circuit. If two data buses are used for redundancy, two transceivers are required. One of the straps 114 and 115 is disconnected in the other transceiver board. Thus, if the channel select signal is low, one transceiver board is selected and, if the channel select signal is high, the other transceiver board is selected. When the proper channel select input is received for the transceiver circuit shown in FIGS. 6A-6E, an input will be supplied to the D input of Transmit flip-flop 116 to enable it into operation.

When the data to be transmitted over the data bus has been accepted in ACIA 50, a REQUEST TO SEND signal is generated by the interface circuit and supplied to the transceiver to enable NAND gate 117. When the XMIT DATA line in FIG. 6A falls low due to the start bit as shown in FIG. 6G, Transmit flip-flop 116, which may be of the same type as On Line flip-flop 70, is clocked which drives its Q output terminal high and its $\overline{Q}$ output terminal low. When the Q terminal of Transmit flip-flop 116 goes high, Position Counter 118 and Character Counter 119, which may be devices 74LS161, are enabled. The operation of this circuit may be followed with the aid of the timing charts in FIG. 6F.

Position Counter 118 counts transmit clock pulses on line XMIT CLK. Position Counter 118 divides the transmit clock signal by 16 to establish the Baud rate. Therefore, for each 16 transmit clock pulse, an output is placed on its output line CT for clocking Character Counter 119. Once Position Counter 118 has been enabled, the next clock pulse will step its output Q0–Q3 to a 1,0,0,0 condition which, because of the buffer-inverters, will provide an output from NAND gate 120, which enables NAND gate 121. Thus, there is a 1/16 bit delay between the receive of the start bit and the transmission of a PNP bit as shown in FIG. 6G. Once NAND gate 121 has been enabled, a 0 XMIT DATA bit will set PNP flip-flop 122, which may be of the same type as On Line flip-flop 70, to drive output terminal K1 high. As shown in FIG. 6B, terminal K1 is connected to AND gate 123. When AND gate 123 receives a pulse from terminal K1, it transmits the pulse through Bus Line Drive Circuit 124 to supply the bit to pulse transformer 125 and then on data bus 20. Terminal K3 is connected to AND gate 123 and is connected at its other end to the receive portion of the transceiver circuit to inhibit the transmitter part of the transceiver circuit when data is being received. However, when data is not being received, terminal K3 is high allowing the bits on terminal K1 to be transmitted through AND gate 123.

At the same time, when the Q output of PNP flip-flop 122, which may be of the same type as counters 118 and 119, goes high, PNP Counter 126 of FIG. 6A is enabled and begins to count pulses from a 768 KHz supply. PNP Counter 126 divides the 786 KHz signal by 16 and supplies an output through PNP Reset Circuit 127 which is supplied through NAND gate 128 to reset PNP flip-flop 122. Thus, 20 microseconds after PNP flip-flop 122 has been set, it will be reset resulting in an output pulse supplied to data bus 20 of 20 microsecond duration.

After Position Counter 118 has reached a count of 16, it will supply a pulse to Character Counter 119 to step this counter. The next transmit pulse, which is a 0 as shown by FIG. 6G, will inhibit NAND gate 121 from supplying a set signal to PNP flip-flop 122. Therefore, flip-flop 122 will not supply a pulse to the bus drive 124 and no pulse is supplied to the data bus. Since data bit 2 is also a 0, no pulse is applied to the data bus. When data bit 3 is transmitted, the XMIT DATA line drops low which enables NAND gate 121 to supply the next pulse from Position Counter 118 to set PNP flip-flop 122 to provide another 20 microsecond pulse to the data bus. This operation continues until Character Counter 119 has indicated that a complete word is transmitted at which time it supplies an output through NAND gate 129 to the Transmit Flip-Flop Reset Circuit 130. This circuit resets the Transmit flip-flop 116 which clears counters 118 and 119 and the transceiver circuit waits for a new word to be transmitted from the microprocessor through the interface circuit.

Data can be received by the transceiver from either direction on data bus 20. As shown in FIG. 6B, a pickup or pulse transformer 139 is connected to data bus 20 and to terminals H7, H8 and H9. As mentioned hereinabove, when data is being received over the transmission line, terminal K3 to NAND gate 123 in FIG. 6B and to PNP flip-flop 122 of FIG. 6A will prevent any data from being transmitted by the transceiver circuit. Furthermore, the stop bit is always a level 1 such that, when Character Counter 119 reaches a count of 10, which includes the start bit, 8 data bits and the parity bit, it resets Transmit flip-flop 116. As shown in FIG. 6F, the 0 start bit sets the transmit flip-flop which enables the Position and Character Counters to begin counting based upon the transmit clock. The start bit also sets the PNP flip-flop which in turn enables the PNP Counter. When the output of the PNP Counter reaches a count of 16, it provides an output pulse which is used to reset the PNP flip-flop. The Transmit flip-flop is set during the transmission of the entire word so that the Position and Character Counters remain enabled. The next 0 data bit to be supplied from the interface circuit will again set the PNP flip-flop which will be reset through the PNP Counter and Reset Circuit 127. When the parity bit is received from the interface circuit, the PNP flip-flop is set and supplies a 20 microsecond pulse to the Bus Driver. This parity bit is the tenth character and at the end of this character, Position Counter 118 supplies an output over line CT to Character Counter 119 which resets the Transmit flip-flop through Reset Circuit 130.

Figure 6C:
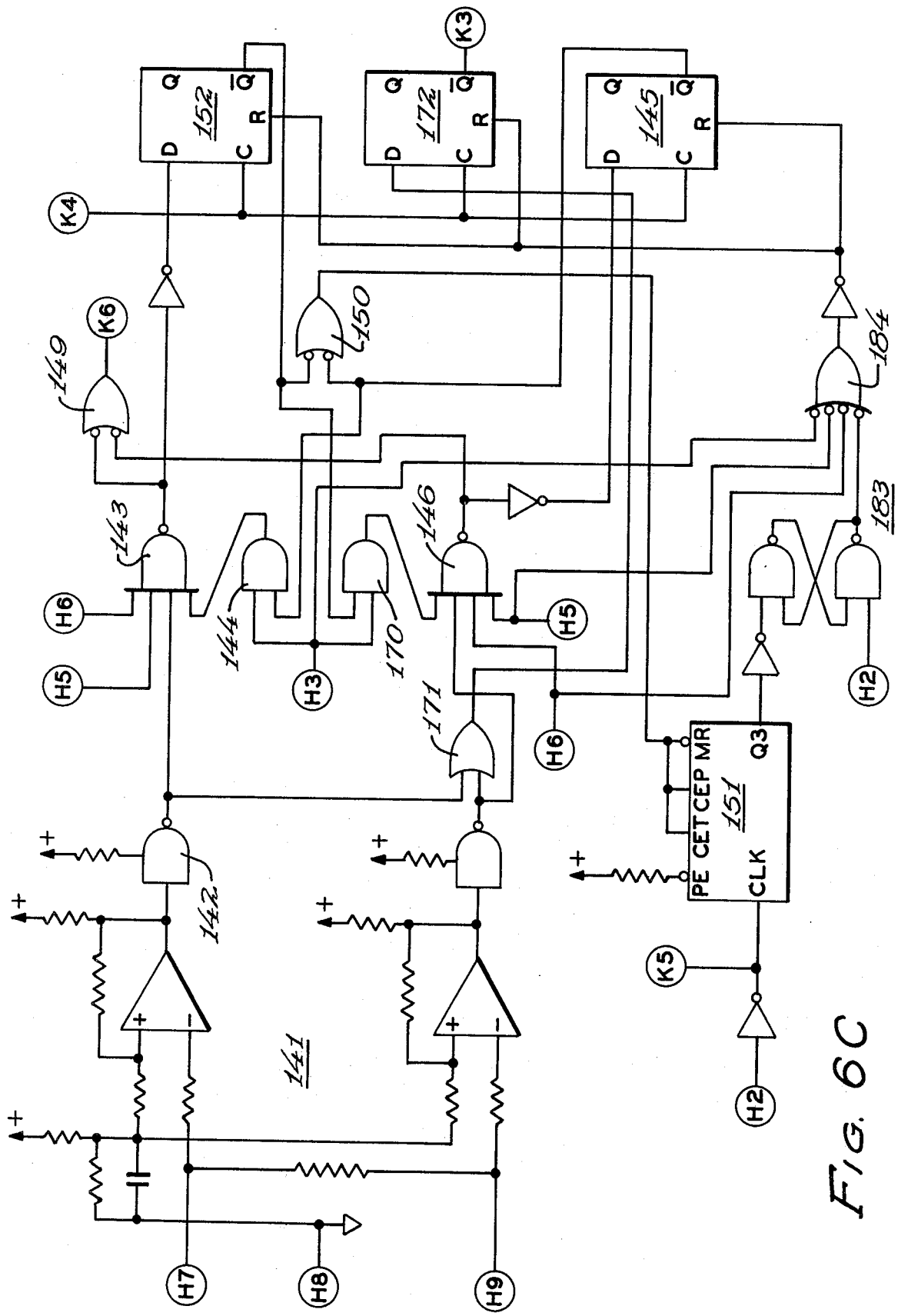

Terminals H7, H8 and H9 are shown in FIG. 6C connected to circuit 141. Circuit 141 receives pulses from the data bus and distinguishes between negative and positive signals. Specifically, data being transmitted in one direction over data bus 20 is considered a positive signal and data transmitted over the other direction on the data bus 20 is considered a negative signal. Circuit 141 responds to each of these signals. The amplifiers in circuit 141 are biased so that on positive pulses the top most amplifier will switch and for negative pulses the bottom most amplifier will switch. Assuming that positive pulses are coming in through terminal H7, these pulses are supplied through NAND gate 142 to the input of NAND gate 143. NAND gate 143 also receives inputs from terminal H6 which is the $\overline{Q}$ output of Transmitted flip-flop 116. Thus, if Transmit flip-flop 116 is in a transmit mode, its $\overline{Q}$ output will be low which will block pulses from being supplied by terminal H7 through NAND gate 143. However, during a receive mode, terminal H6 will be high enabling NAND gate 143. Also, NAND gate 143 receives an input through terminal H5 from the Channel Select circuit which will designate this transceiver circuit to receive data on the line. The fourth input to NAND gate 143 is derived from AND gate 144 which has one input from the $\overline{Q}$ terminal of flip-flop 145, which is normally a high level to enable NAND gate 144, and a second input from terminal H3 which is a normally high RESET B signal. Thus, the fourth input to NAND gate 143 is normally high. Since all of the inputs to NAND gate 143 are normally high except for the input connected from NAND gate 142, it is in a condition to pass through data bits supplied by terminal H7. Likewise, NAND gate 146 will be in a condition to supply negative pulses from terminal H9 through it. Notted input OR gate 149 will produce a positive going pulse at terminal K6 when either a positive pulse is received at terminal H7 or a negative pulse is received at H9. Similarly, notted input OR gate 150 will produce a positive going pulse to enable counter 151 whenever flip-flop 145 or flip-flop 152 has been set.

Figure 6D:
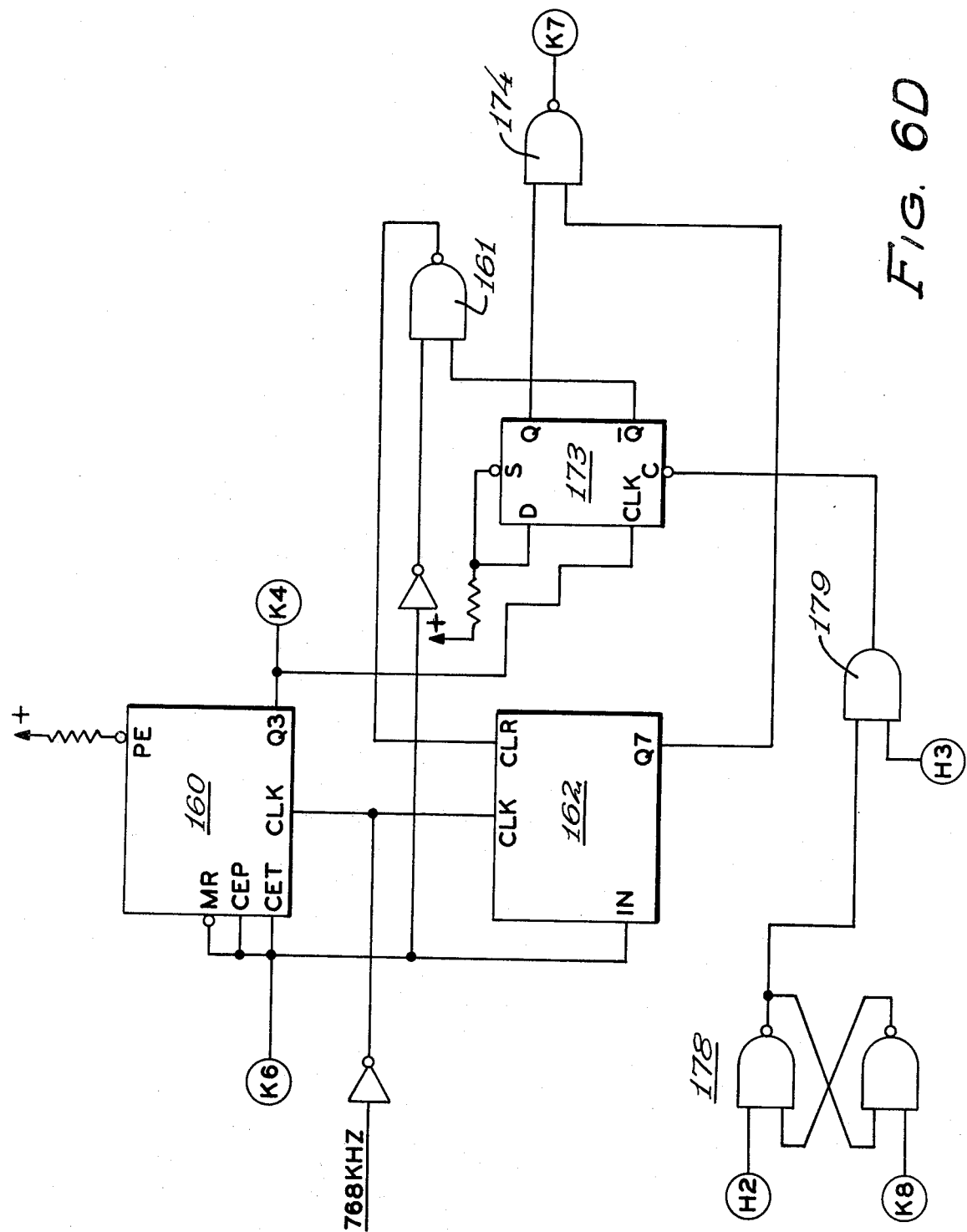
Figure 6E:
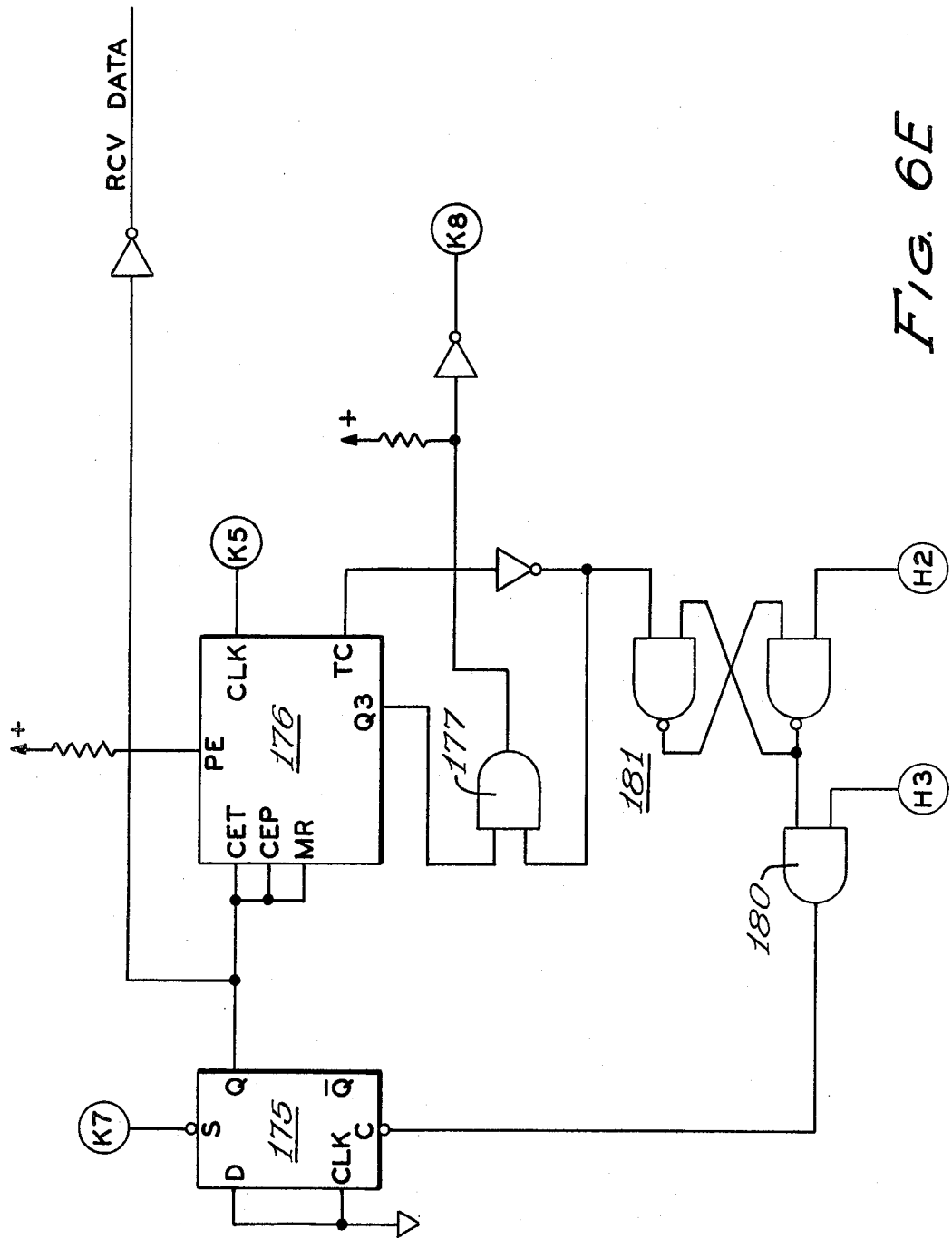
Figure 6F:
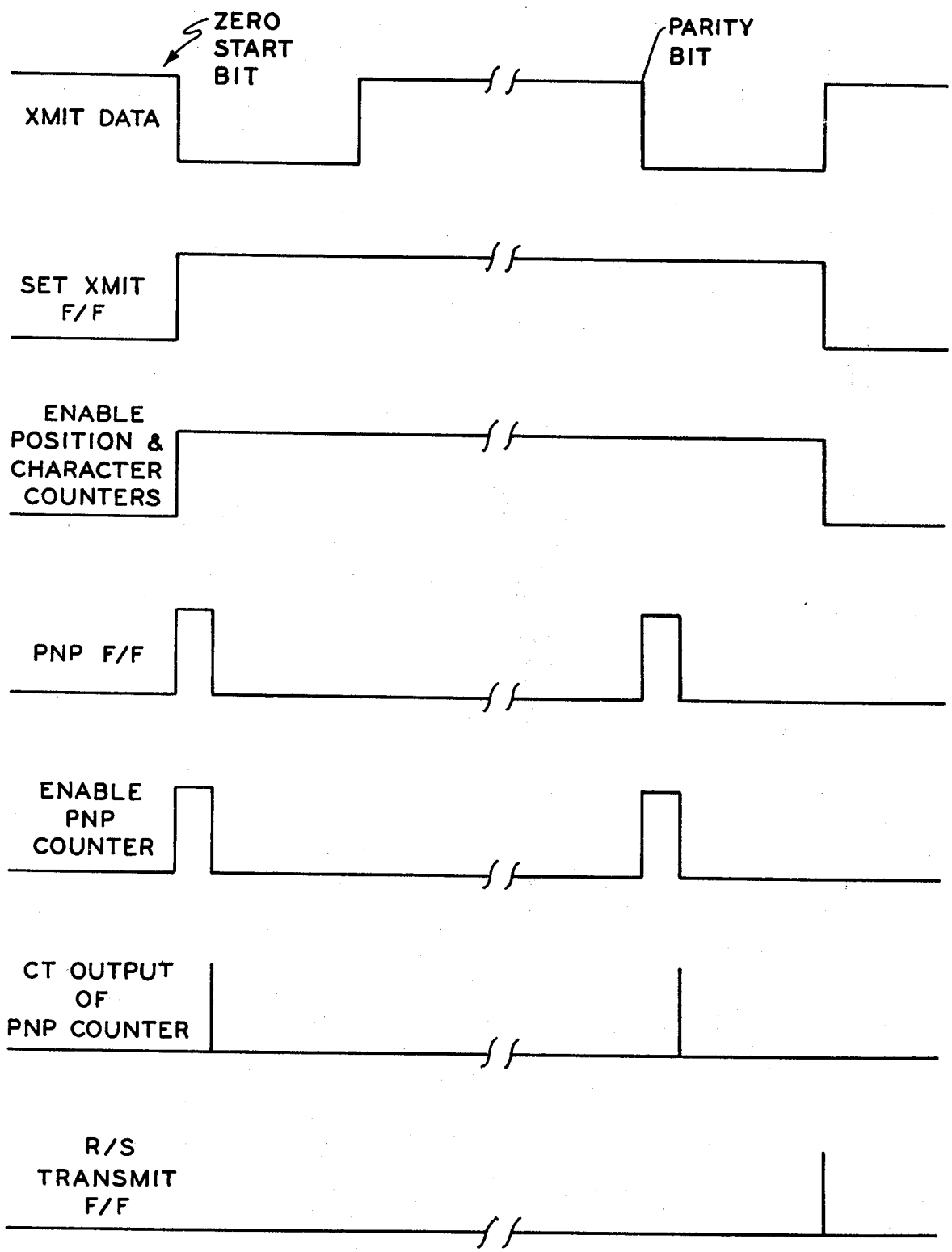
FIGS. 6F–6H show the timing diagrams for the transceiver circuit shown in 6A–6E.
Figure 6G:
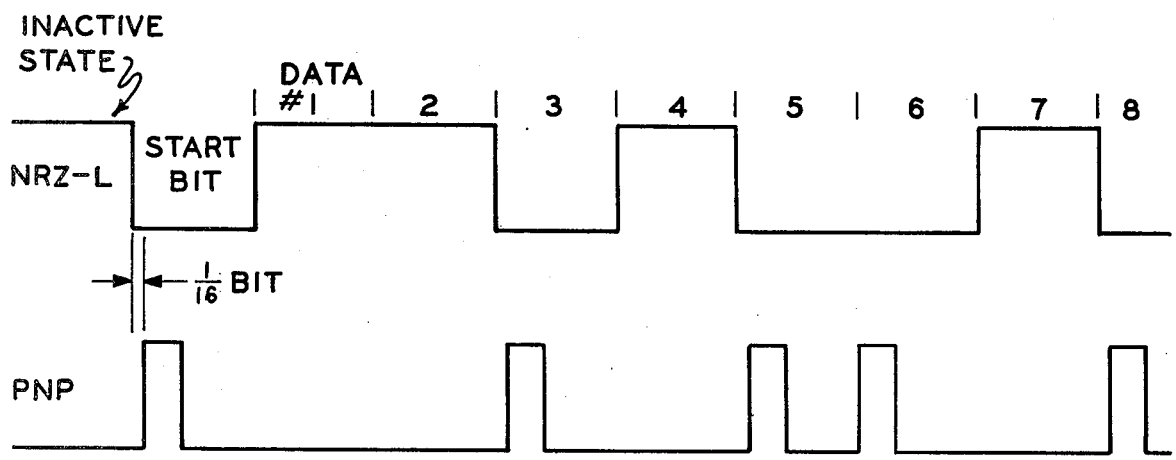

When notted input OR gate 149 has received an input from either the positive pulse detection circuit or the negative pulse detection circuit, it will supply the bit to terminal K6 to enable Half-bit Counter 160, which may be a 74LS161 counter, in FIG. 6D, to enable NAND gate 161 and to supply an input to Delay Shift Register 162, which may be a 74LS164 register. The purpose of the circuit shown in FIG. 6D is to detect that a valid bit has been received by the pulse transformer receiver circuit. The requirement of this circuit is that the bit (or pulses received) must be at least a half bit wide. When the first bit at terminal K6 enables counter 160 and NAND gate 161 and provides an input to register 162, counter 160 and register 162 begin to count the 768 KHz clock. When counter 160 has counted 8 of these clock signals indicating half a PNP pulse, it produces an output at terminal K4 which clocks the valid data bit through flip-flop 152 or flip-flop 145 depending upon whether a positive or negative data bit had been received. When either one of these flip-flops switches, an output is produced by OR gate 150 to enable counter 151, which may be a 74LS161 counter. Also, when a positive bit has been received, flip-flop 152 will switch to inhibit NAND gate 146 through AND gate 170 to prevent negative going pulses from going through the circuit. This is a safeguard against noise being generated in the other direction and being accepted by the transceiver as a valid data bit. On the other hand, if a negative data bit had been received, then flip-flop 145 switches to inhibit NAND gate 143 through AND gate 144 from allowing positive pulses being supplied through it. Also, the D input of flip-flop 172 receives the output from OR gate 171. OR gate 171 will pass through either a positive or negative pulse such that, when the output at K4 clocks flip-flop 172, an output is provided at terminal K3 which is used in FIGS. 6A and 6B at flip-flop 122 and AND gate 123, respectively, to prevent the transmission of pulses on the data line.

If a valid data bit has been received, half-bit counter 160 will time out and provide an output at K4. This output essentially then takes two paths. The first path is to the clock input of Valid Bit flip-flop 173 which may be a 74LS74 flip-flop. At the same time, the bit input to delay shift register 162 is being shifted through the same clock which is driving Half-bit Counter 160 and provides an output at Q7 at the same time Half-bit Counter 160 provides its output to the clock input of Valid Bit flip-flop 173. The Q output of Valid Bit flip-flop 173 and the Q7 output of Delay Shift Register 162 go high at the same time which causes NAND gate 174 to supply a low signal to terminal K7. Terminal K7 is connected to the NRZ-L flip-flop 175, which may be a 74LS74 flip-flop, shown in FIG. 6E which changes its Q output to supply the data bit over line RCV DATA. At the same time that NRZ-L flip-flop 175's Q output goes high, Bit Counter 176, which may be a 74LS161 counter, is enabled to begin counting inverted transmit clock pulses at terminal K5. After it reaches a count of 8, it supplies an output over Q3 to NAND gate 177 for providing a signal to terminal K8 which sets flip-flop 178 for providing an output through AND gate 179 to reset Valid Bit flip-flop 173. After counter 176 of FIG. 6E reaches a count of 16, the equivalent of one bit width of an NRZ-L bit, it provides an output at TC for setting the flip-flop 181 which provides an output through NAND gate 180 to reset NRZ-L flip-flop 175. When flip-flops 178 and 181 receive the next transmit clock signal at terminal H2, they are reset. In this manner, a 20 microsecond PNP data bit on the data bus is converted to the NRZ-L bit as shown in FIG. 6G.

When Half-bit Counter 160 provides its output at terminal K4, this output is connected to the clock terminals of flip-flops 152, 172 and 145 of FIG. 6C. Thus, the positive signal at terminal H7 will be clocked through flip-flop 152 or the negative signal at terminal H9 will be clocked through flip-flop 145 and either signal will be clocked through flip-flop 172. When flip-flop 145 or flip-flop 152 has been switched, an output is provided through OR gate 150 to enable Inhibit Counter 151. Inhibit Counter 151 begins counting transmit clock pulses and, at the count of 8, will set flip-flop 183. When flip-flop 183 sets, it provides an output through OR gate 184 to reset flip-flops 152, 172 and 145.

If the pulse at K6 does not last for at least 8 counts of the 768 KHz signal, Half-bit Counter 160 will automatically reset at the notted MR terminal. Also, the loss of the signal at terminal K6 provides an output through NAND gate 161 to reset Delay Shift Register 162. Since no output will be provided at terminal K4, flip-flops 152, 172 and 145 are not switched and no signal is supplied by the Valid Bit flip-flop 173 to the NRZ-L flip-flop 175 to prevent the supply of a pulse on the RCV DATA line.

Figure 6H:
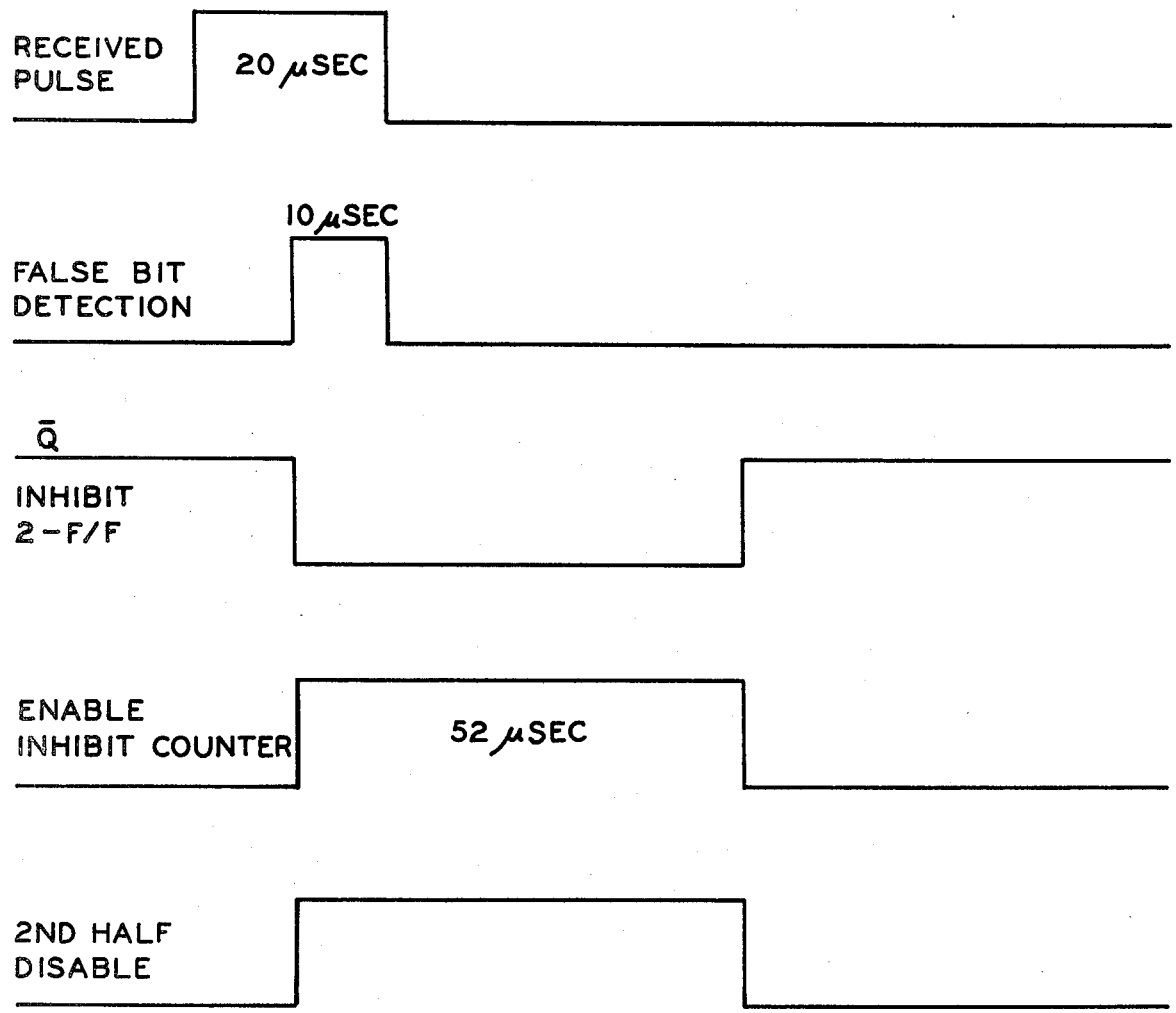

It is to be noted that PNP Counter 126 on the transmitting portion of the circuit shown in FIG. 6A is counting the 768 KHz pulses until a total of 16 is reached to insure that the PNP pulse on the data bus is 20 microseconds wide. Half-bit Counter 160 counts only 8 of the 768 KHz pulses to insure that the PNP pulse received is at least 10 microseconds long. The timing chart for the received pulses is shown in FIG. 6H. When a 20 microsecond PNP pulse is received from the data bus, Half-bit Counter 160 and Delay Shift Register 162 provide their outputs for only 10 microseconds which is the last 10 microseconds of the received pulse. When Valid Bit flip-flop 173 is set, the output from Half-bit counter 160 clocks either flip-flop 152 or flip-flop 145 to provide an output through OR gate 150 to enable Inhibit Counter 151. These two signals last for 52 microseconds due to the output from Inhibit Counter 151 resetting flip-flops 152 and 145. It is to be noted that the signal to the set terminal of NRZ-L flip-flop 175 can only last ten microseconds since Delay Shift Register 162 is reset after ten microseconds to disable NAND gate 174.

Figure 7:
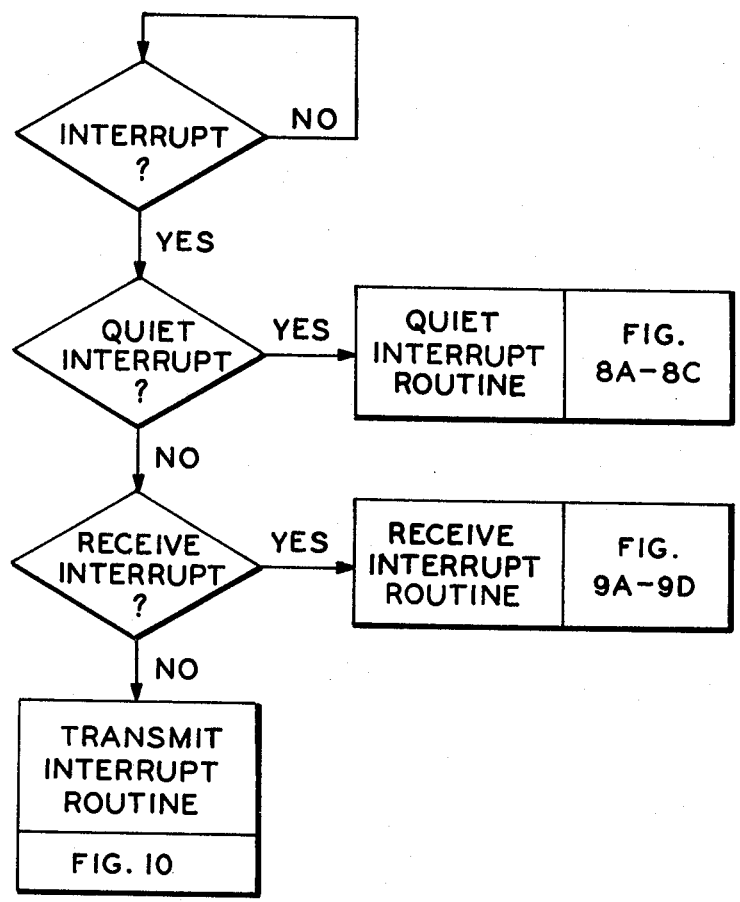
FIG. 7 shows the general software routines which are used by the microprocessor of FIGS. 1 and 4 to control the protocol hardware.

FIG. 7 shows the generalized flow chart for the software which controls microprocessor 10 and a program listing for this flow chart is included as an appendix hereto. According to the flow chart of FIG. 7, the microprocessor waits for an interrupt from the interface circuit. Once it does receive an interrupt, the microprocessor must determine what type of interrupt it has received. As previously discussed the miroprocessor can easily determine if the interrupt is a transmit interrupt if it is in the transmit mode. If it is not a transmit interrupt and a look at the data lines indicates that there is no received data, the interrupt must be a quiet interrupt. If there is data, the interrupt must be a receive interrupt.

Therefore, according to FIG. 7, if the interrupt is a quiet interrupt, i.e., an interrupt generated by the Bit Time Interrupt Generator of the interface circuit, the program proceeds to the flow chart shown in FIGS.

Figure 8A:
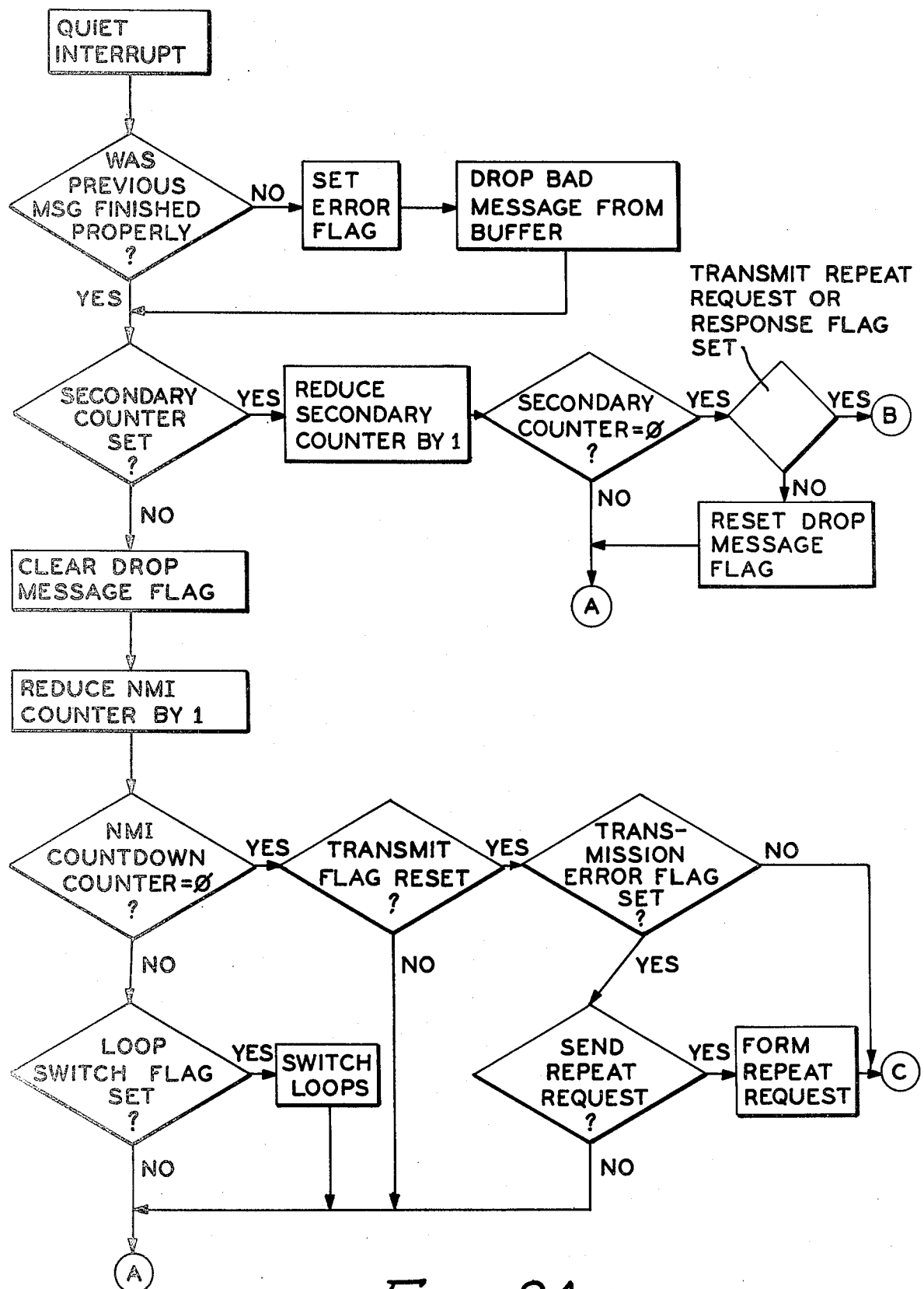
FIGS. 8A–8C show the quiet interrupt routine.
Figure 8B:
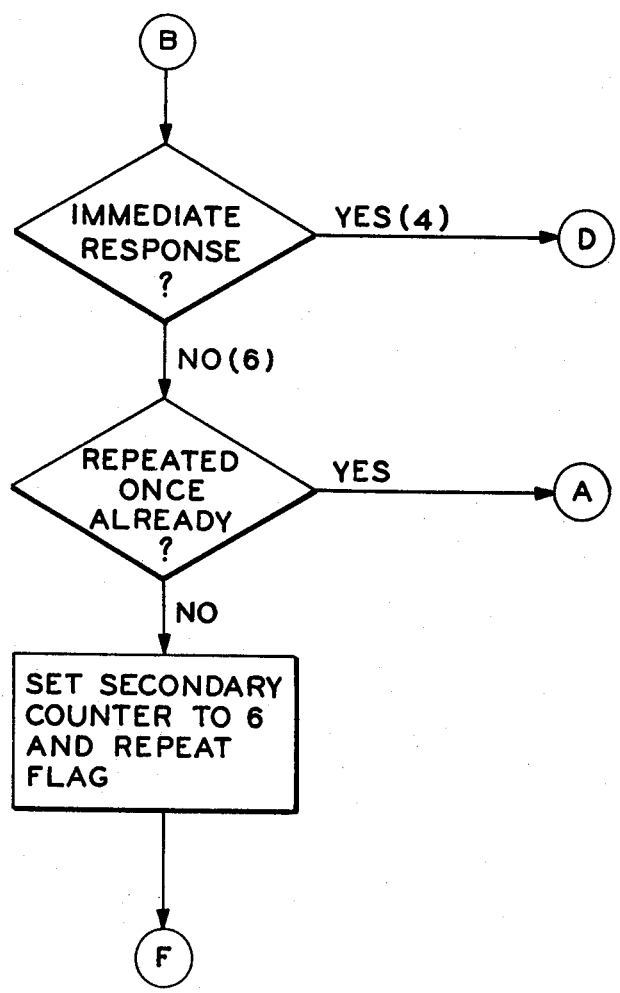

8A-8C. Upon entering the quiet interrupt routine, a test is made to establish if the previous message was properly completed. It does this by looking at the last word received to see if it has its full complement of bits and that there had been no error in transmission. If the last message was not properly finished, an error flag is set and the bad message is dropped from the storage buffer in the microprocessor. If the message was properly finished or after the bad message had been dropped from the storage buffer, a test is made to determine whether the secondary counter has been set. This counter is a memory location which is set to 6 when this station initiates a direct message and is expecting a response from another remote station, or if a direct message has appeared on the line but is not directed to this station. The secondary counter will be set to four if the direct message was for this station. Thus, this counter will wait for 6 interrupt signals to be generated before it takes action. In FIG. 8A, if the secondary counter has been set, it is reduced by 1 and a test is performed to see if the secondary counter has reached 0 yet. If it has not, we go to point A and wait for another interrupt. If it has reached 0, a test is performed to determine whether the transmit repeat request flag or response flag have been set. If neither flag has been set, the drop message flag is reset and the system waits for another interrupt. If the transmit repeat request flag or response flag has been set, the system proceeds to FIGS. 8B where the original setting of the secondary counter is checked. If the original setting was a 4, then a response is expected to be transmitted by this station. If a response is expected to be transmitted by this module, the program enters point D in FIG. 8C to begin transmission, which operation will be discussed hereinafter. If the secondary counter had originally been set to 6, a direct message had previously been transmitted by this remote station and it is awaiting an answer or this station has detected a direct message on the bus but directed to another station. Thus, if the secondary counter had originally been set to 6, and if the direct message had been repeated by this remote station and still no answer had been received back, the program proceeds to point A where it again waits for some type of interrupt. If the message had not been repeated, the secondary counter is set to 6, the repeat flag is set and the program enters FIG. 8C at point F to begin transmitting the direct message again. After the direct message is transmitted, and no message is received, the program again waits for 6 quiet interrupts and then proceed to point A to wait for some type of interrupt.

Upon receipt of a quiet interrupt, if the secondary counter had not been set, indicating that the secondary counter was equal to zero after the last message was tested to see if it was properly finished, the drop message flag is reset and the NMI counter is reduced by 1. The NMI counter is the transmit turn counter which is a memory location set to the number of time slots in the protocol system. As mentioned before, if the remote station does not have a pseudo time slot, the countdown counter is originally set to 256 after it has transmitted. Each time a subsequent station transmits, the remote station calculates a new count by subtracting the address of the subsequent station from its address and multiplying by 2. This new count is stored in the countdown counter. If no other station transmitted, the countdown counter would be decremented by one for each generated quiet interrupt. When the counter reaches 0, the remote station may transmit again. After available data is again transmitted, the NMI counter is again set to 256. After the NMI counter has been reduced by one, a test is made to determine if the counter has been reduced to zero. If the counter is at zero, this station's transmit time slot is now available. At this point, a test is made to determine whether the transmit flag has been reset. If it has not, the system proceeds to point A where it waits for another interrupt. If it has been reset, the transmission error flag is tested to see if it has been set. If it has, and if a repeat request has been received, the program proceeds to point A and waits for another interrupt. If the transmission error flag has been set and a repeat request has not been received, the repeat request is formed and the station proceeds to point C. The station also proceeds to point C if the error flag has not been set.

Figure 8C:
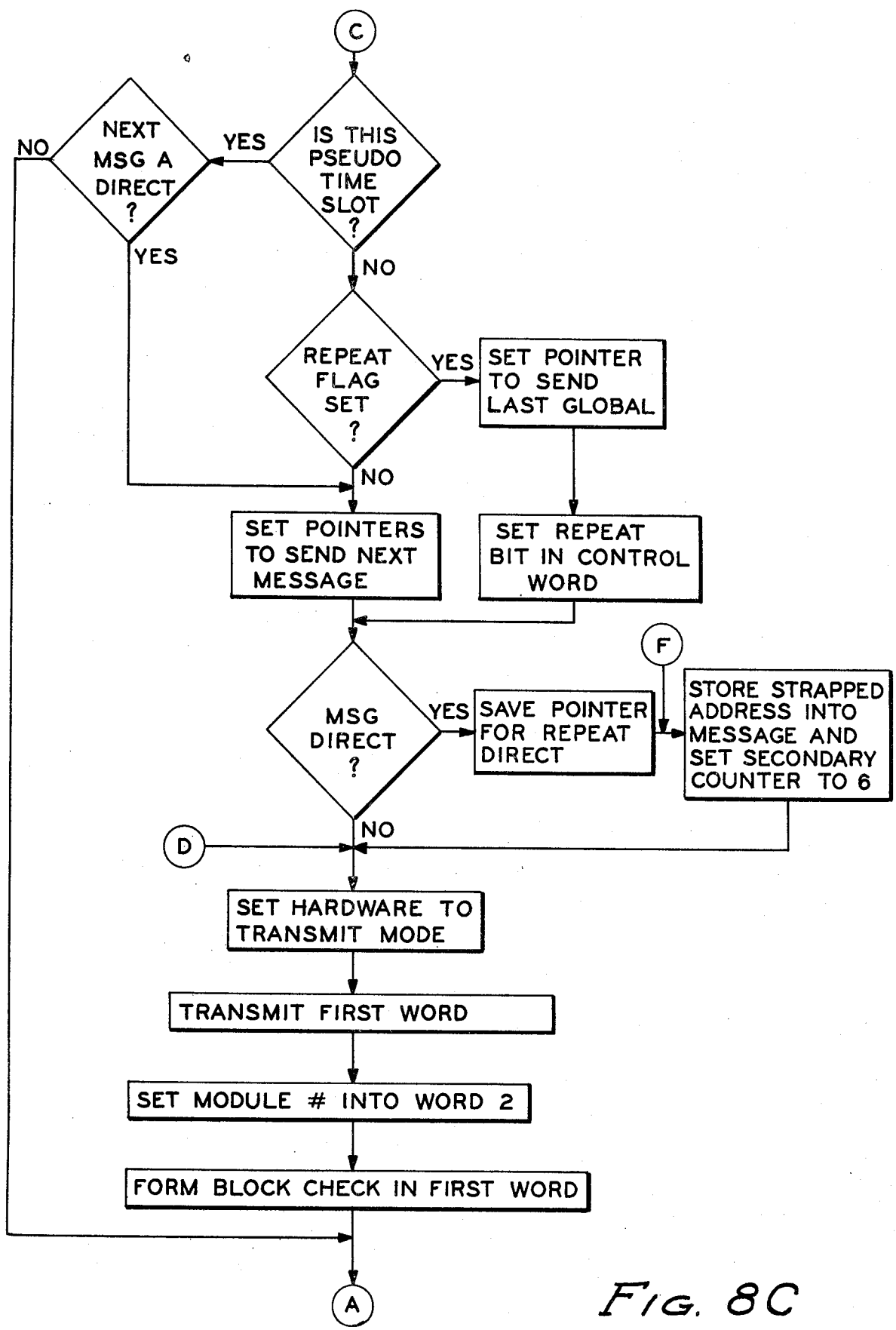

Upon arrival at point C in FIG. 8C, several conditions must be ascertained about the nature of the message to be transmitted. First, a test is made to determine whether this is a pseudo time slot. A pseudo time slot is one of the extra time slots discussed above. If this is a pseudo time slot but the next message to be sent is not a direct message, control is passed to point A where an interrupt is awaited. If the message to be sent next is not a direct message, then it must be a global message and global messages cannot be sent during pseudo time slots although direct messages can be sent in either. Therefore, the regular time slot of the remote station must be awaited in order to send this message. However, if there is a pseudo time slot and if the next message to be sent is a direct message or if this is not a pseudo time slot and the repeat flag has not been set, the pointers are set to send the next message. If the repeat flag has been set and this is not a pseudo time slot, then the pointer is set to send the last global message again since this is a non-pseudo time slot. Once the repeat bit in the control word has been set or the pointers have been set to send the next message, another test is made to determine if the message to be sent is a direct message and, if it is, the message buffer address pointer is saved in case of a repeat. Once this pointer has been saved or, looking at FIG. 8B, the secondary counter has been set to 6 and the message has not been repeated, the strapped address in switches S1-S7 of the interface circuit are stored into the message and the secondary counter is set to 6 indicating that this is a direct message and that we will wait six time slots for an answer. If the message to be sent is not a direct message or once the strapped address is stored into the message and the secondary counter is set to 6 or the program has come from point D in FIG. 8B indicating that this message is a response to a direct message received from another station, the hardware is set to the transmit mode, the first word is transmitted (the control word) and the station address number is inserted into the second word. Next, the block check calculation is made according to FIG. 11 for words 1 and 2. The program then proceeds to point A where it waits for another interrupt. Thus, when quiet interrupts are received and the secondary counter has not been set, indicating that a response is not expected from this station or a direct message which can be transmitted during the pseudo time slot is not to be sent, the NMI counter or time-to-transmit counter is decremented by 1 for each quiet interrupt produced. When this count has been reduced to zero, this station can transmit. If the secondary count has been set to a 4, a response from this station is expected to a previously sent direct message from another remote station. In this case, the response is transmitted. If the secondary counter had been set to 6 indicating that a direct message is to be sent, and a direct message has not been repeated, the system sets the secondary counter and sends this message. If the message has been repeated, the system proceeds to wait for the next interrupt of any type. If the NMI countdown counter (or the time-to-transmit counter) has reached zero but this is a pseudo time slot such that a global message cannot be sent, the system must now reset its NMI countdown and again wait for a time slot during which a global message can be transmitted. If this is a pseudo time slot, a direct message can be sent.

At point A the next interrupt must be investigated to determine what kind of interrupt it is. If this interrupt is not a quiet interrupt but it is a receive interrupt, the receive interrupt routine is entered and is shown in FIGS. 9A-9D. A receive interrupt is generated by the interface and interpreted as such by the microprocessor when transmission has been received over the data bus and is now available in the ACIA 50. The received word is first checked for a hardware error and, if there is a hardware error, the error flag is set and the drop-message flag is set and the program proceeds to point A to wait for another interrupt. If there is no hardware error but the drop-message flag has been set, the secondary counter, which was mentioned in the previous routine, is cleared and the system proceeds to point A to wait for another interrupt. In this way, a message containing any word error is rejected. After the message is ended, a quiet interrupt executes the quiet interrupt routine resetting the drop-message flag. If no hardware errors are detected, the received word is loaded into a character receive buffer. As each correct word is placed in the buffer, a receive word counter is incremented and a block check calculation is performed as shown in FIG. 11. This block check routine determines both whether there is an error and if the last word received is the end of message. Thus, an end-of-message test is performed. If the last word received is the last of the message, the routine proceeds to point E.

Since each word position in a message has a specific meaning, a means of identifying these positions is necessary. If the word received is not an end-of-message, a check is made to determine if it is the first word in a message. To do this, the word counter is examined. If it is the first word, another test is performed to determine if the message is an "I'm OK" message. If the control character word in the receive buffer indicates it is an "I'm OK" message, the routine is told to expect a message length of two characters. If it is an "I'm OK" message and the routine is told to expect a message length of two characters or if it is not an "I'm OK" message, an exit is made to point A where another interrupt is awaited. If this word was not the first word, a test is made to determine whether it is the second word. The second word position of a message is the sender's address. If the character is the second word, a calculation of the transmit turn time is performed, by subtracting the sender's address from this station's address and multiplying by 2, and saved and an exit is made to point A. If the word is the third word, which contains the message length, it is stored in the receive buffer and is also used for comparison to the word counter count at the end of the message.

Word four can be either the control extension word or a receive address word. A control extension indicates it is a global message. A receiver address word indicates it is a direct message. If it is a global message or a direct response message, an exit is made at A. If the message is a direct request message, the secondary counter is set to either a 4 indicating that it must respond after four quiet interrupts or a 6 for those stations which are not addressed. Thus, only the station which has been required to respond to the direct message on the data bus sets its secondary counter to 4. All other stations will set their secondary counters to 6. At the end of 4 time slices, this station will respond. None of the other stations will respond because their secondary counters have been set to 6. For each word received, an interrupt is generated which causes the program to enter the receive interrupt routine. Each word is checked and the block check is performed. When an end-of-message has been detected, the program proceeds to point E.

Figure 9A:
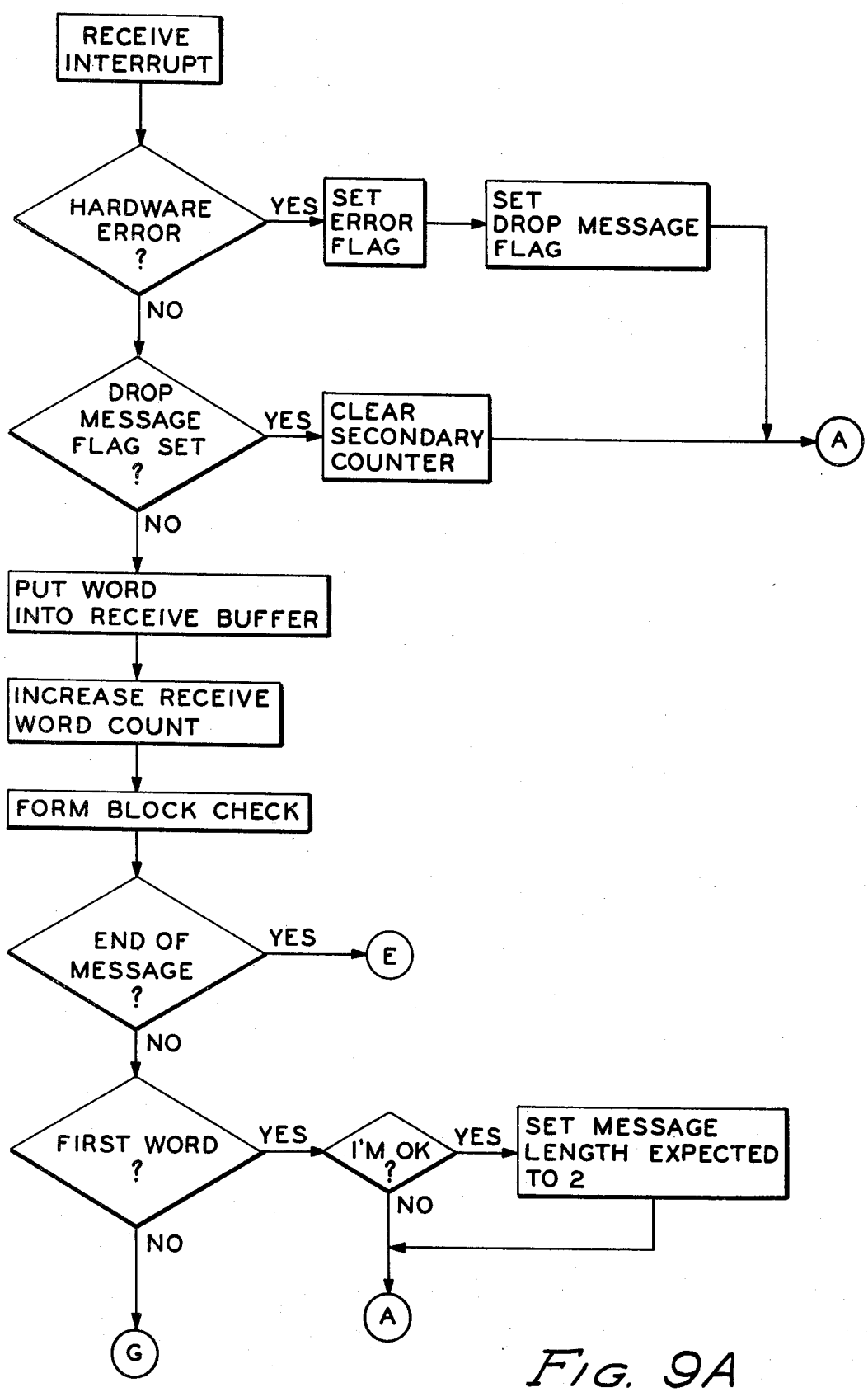
FIGS. 9A–9D show the receive interrupt routine.
Figure 9B:
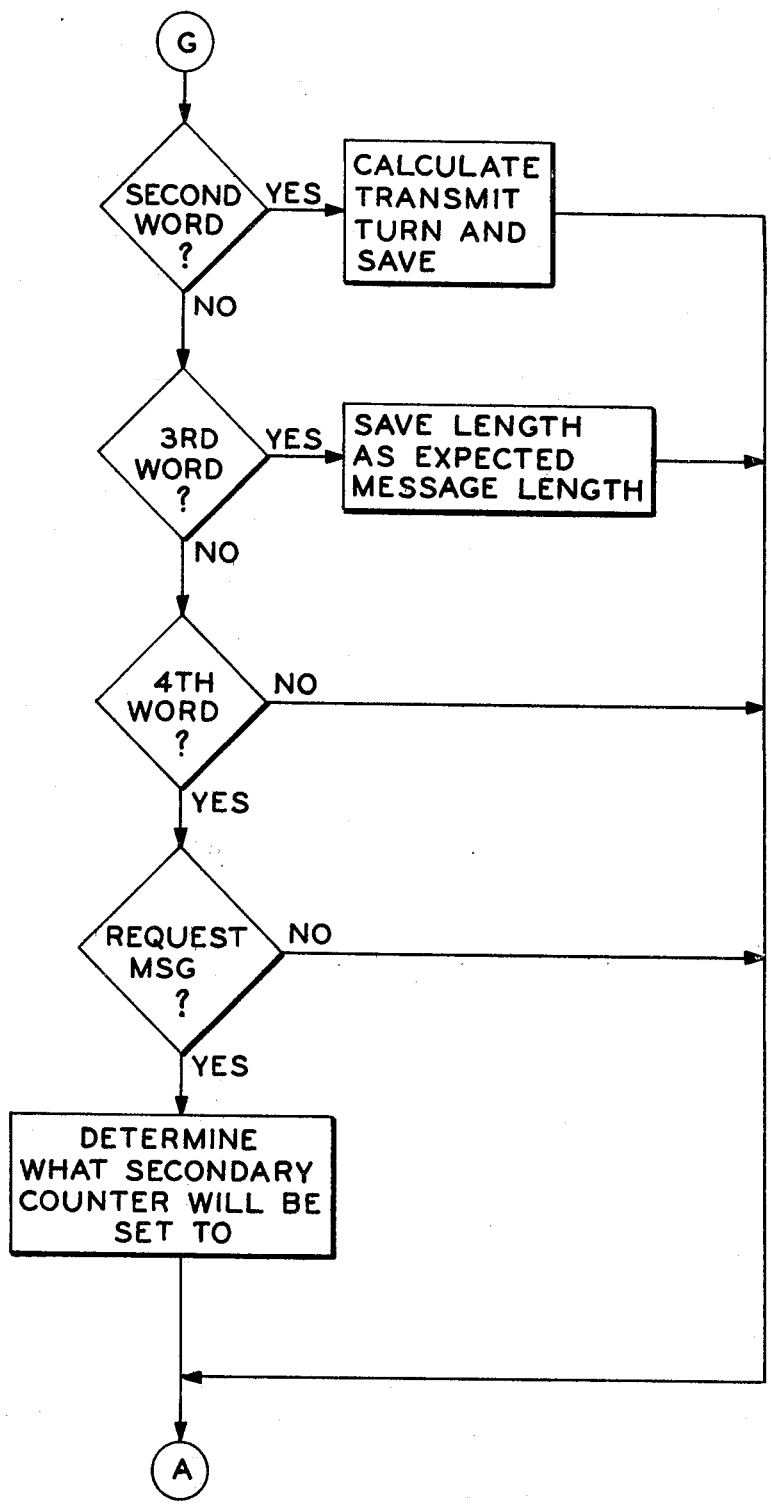
Figure 9C:
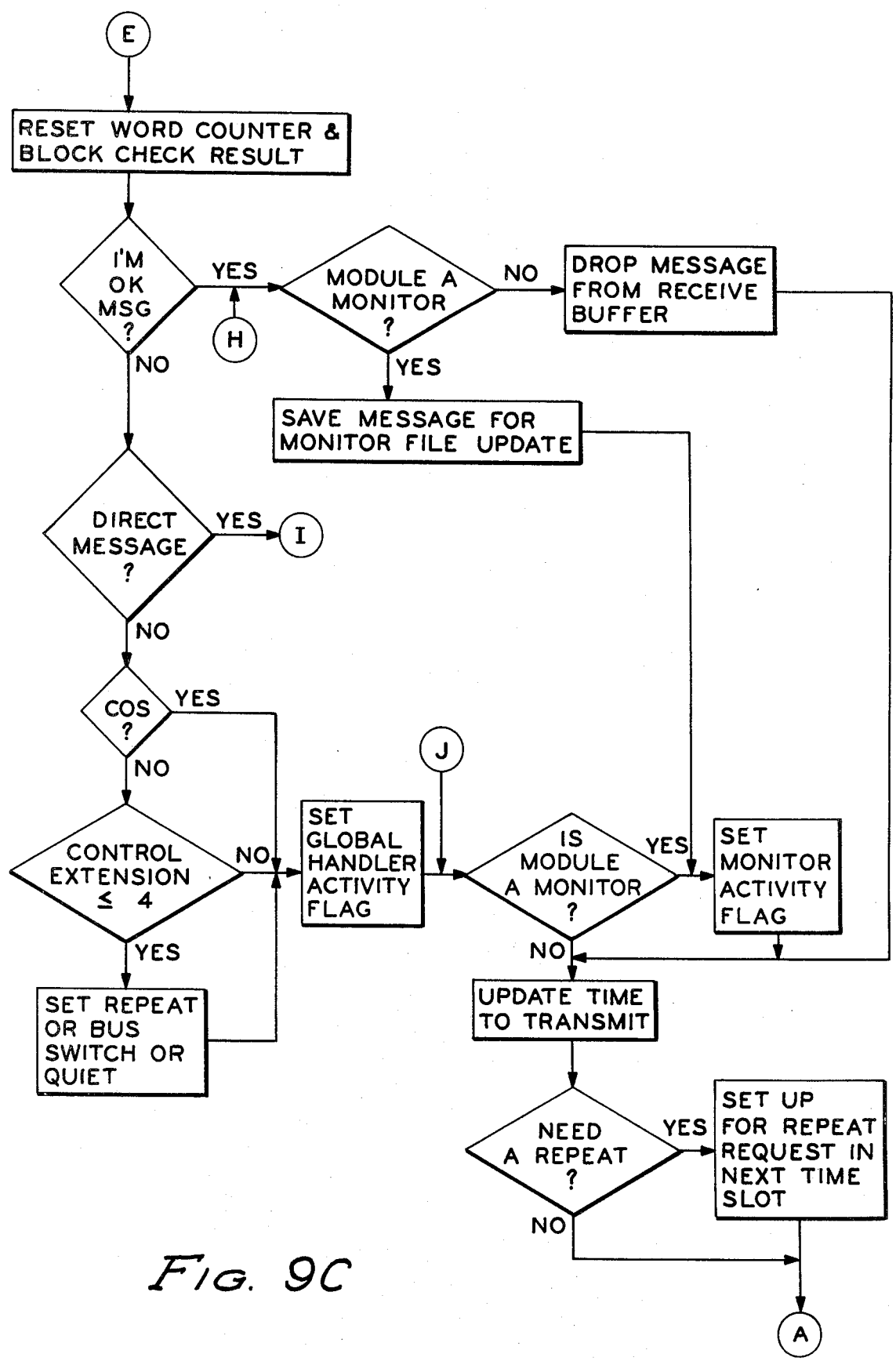
Figure 9D:
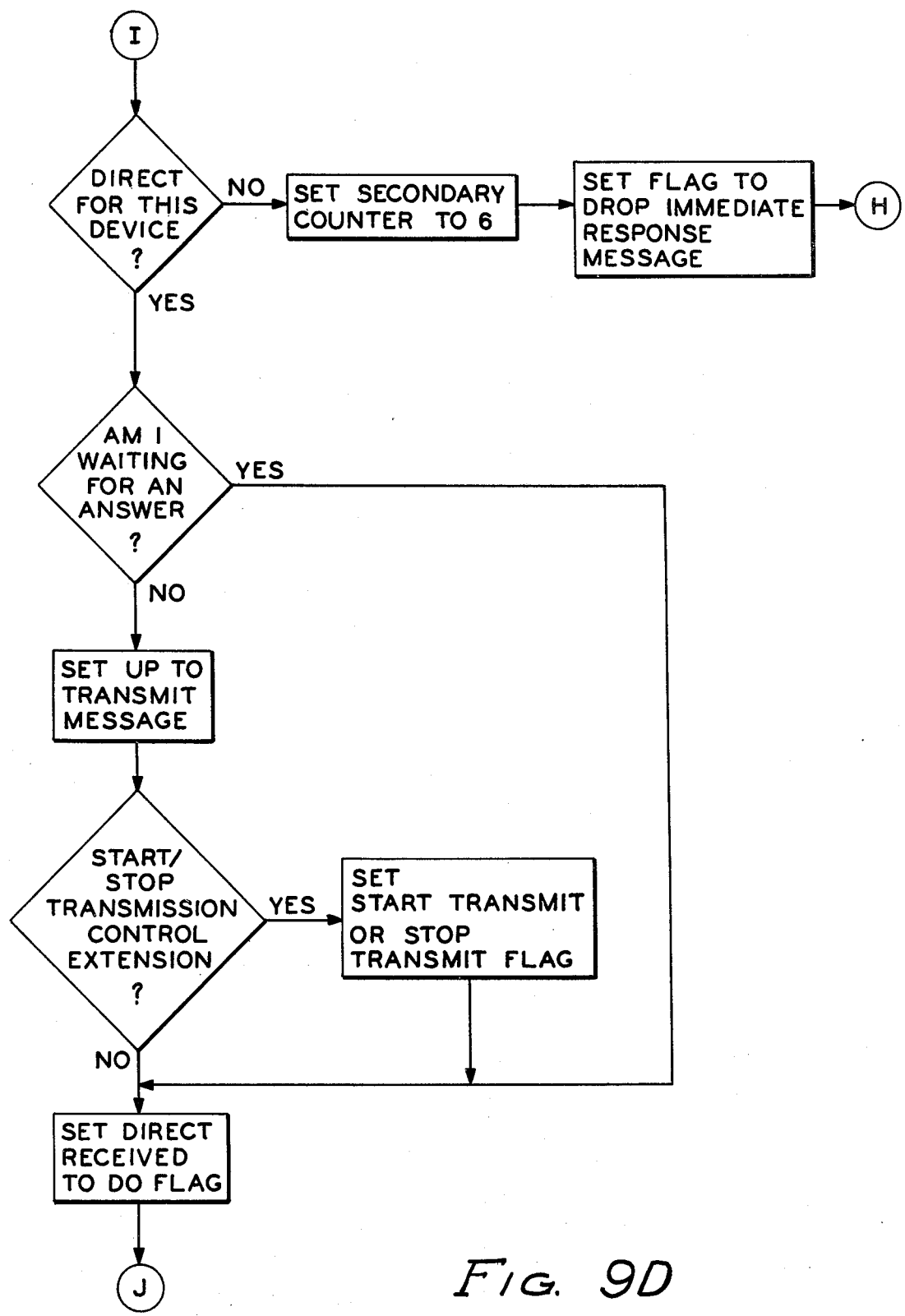

As shown in FIG. 9A, when a message has been received in its entirety, an end-of-message is detected and the program enters point E in FIG. 9C. FIGS. 9C and 9D show the end-of-message routine. The end-of-message routine first resets the word counter and block check result in the main receive routine and then examines the control word in the receive buffer to determine if the message is an "I'm OK." If the message is an "I'm OK" message and if this module is not a bus monitor, the "I'm OK" message is deleted from the receive buffer. If this station is a bus monitor, it saves the "I'm OK" message in order to update the bus monitor data file. The saved calculated transmit turn is now set into countdown counter. A test is made to determine if a repeat request message is needed due to an error flag or other conditions. If a repeat message is necessary, a repeat request is set up for transmission during the next time slot and the program proceeds to point A. If a repeat message is not needed, the program proceeds directly to point A.

If the message is not an "I'm OK" message, the control word in the receive buffer is examined to determine if it is a direct message. If it is, a further test is made to determine if the direct message is intended for this station as shown in FIG. 9D. If the direct message is intended for this station, it is next determined whether the message is a request for which an answer is necessary or a response to a previous request by this station. If it is a response message, the direct received-to-do flag is set and the module is tested to see if it is bus monitor in FIG. 9C. If the direct message is a request, a response message is prepared. The control extension word is checked for a start or stop transmitting directive. In either case, the appropriate transmit flag is set and then the direct received-to-do flag is set and the program is returned to point J in FIG. 9C.

If the message was not a direct message, then it must be a global message and is tested for a change of state. If a change of state has occurred, the global handler activity flag is set and the bus monitor test is performed. If the global message is a monitor directive such that there will be no change of state indication, the control extension word is tested to see if it is a code 1, 2, 3 or 4 message. A code 1 message is a message to switch bus loops, a code 2 message is a message to set a flag to repeat the last global message, a code 3 message is a message to switch loops and repeat the message, and a code 4 message is a message to wait for a repeat directive. From this point, the global handler activity flag is set and the routine proceeds to the bus monitor where the program eventually proceeds to point A to wait for the next interrupt. Thus, the NMI countdown counter is decremented either by a quiet interrupt or reset by receiving a senders address.

Figure 10:
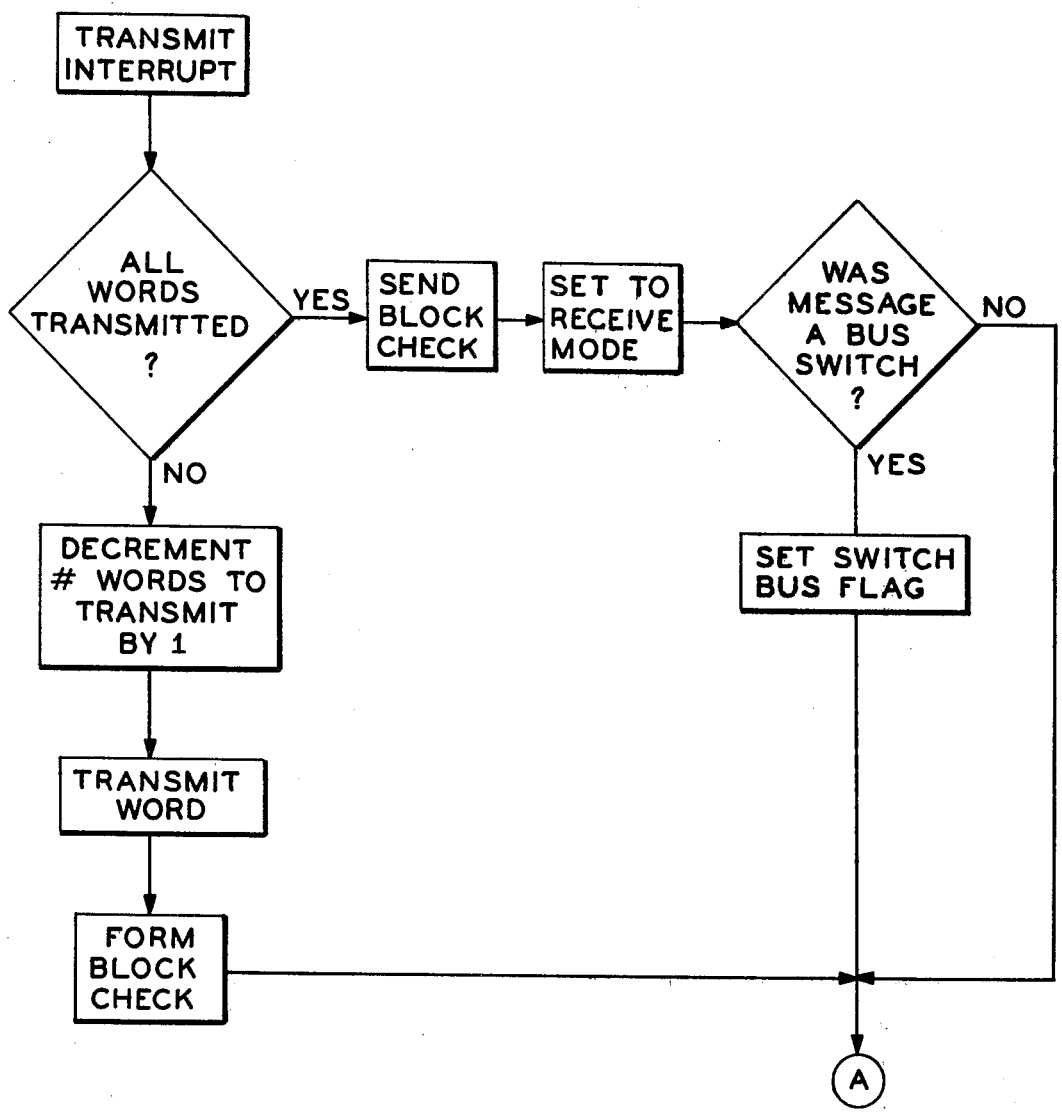
FIG. 10 shows the transmit interrupt routine.

If the interrupt, according to FIG. 7, is neither a quiet interrupt nor a receive interrupt, it must be a transmit interrupt and the transmit interrupt routine in FIG. 10 is entered. Thus, once a message transmission begins, a hardware-generated interrupt is provided by the ACIA when it is ready to receive another word for transmission. The transmit interrupt causes execution of the transmit's second through last word. Immediately upon entering the transmit routine, a test is made of the transmit word counter to determine if all words have been sent. If they have not all been sent, the transmit word counter is decremented by 1, the next word is transmitted, and the block check calculation is updated. The system waits for the next transmit interrupt and this process is repeated.

Once the entire message is sent, i.e., all characters have been transmitted, the result of the last block check calculation is now complemented and then transmitted as the block check word, and the hardware is reset to the receive mode. If this station is a bus monitor, a check is performed to determine if the message was a bus switch directive. If it was, the bus switch flag is set prior to its exit to point A. If not, the program exits directly to point A to await the next interrupt.

The block check word routine, where a block check word is sent with each message having more than two words or where the control word and the sender's address in an "I'm OK" message must satisfy the routine, is shown in FIG. 11. The first word to be transmitted is obtained and rotated one place to the right. The next word is obtained and is added to the first word. A test is made to determine whether or not the sum of these two words results in all ones. If the result is all ones and the least significant bit of the first word before rotation was a one, the algorithm detects a two-word message. Assuming that all ones did not exist after the first two words, the previous result of the addition step is then rotated to the right one bit and the next word is obtained and added to the rotated addition of the first two words. A test is made to determine whether all ones exist. If not, this result is rotated to the right, the next word is obtained and added to it. When all ones are detected in the result, the number of words accumulated to that point is totaled. If the number of words transmitted when all ones exist is equal to the number of words designated for that particular transmission by the third word, an end-of-transmission has been detected. If all ones have been detected but the number of words accumulated to that point is not the same as the number of words designated in the message length third word, the next word is obtained and the process repeats until all of the words have been tested. If all of the words have been tested and the result is still not all ones, a system error has resulted.

In the special case of a two-word message where the two words are the control word and the address word, this check routine still must exist. A two-word message will satisfy this routine by first specifying that the most significant bit of the sender's address must be a zero. When the sender transmits his address, he first rotates the address word to the left by one bit and then complements the word. This result is sent as a first word or control word. By nature of the arithmetic, the least significant bit of the transmitted control word contains a 1. This bit is reserved to be a 1 only for a two-word message. When the check word algorithm is applied to this two-word message, the condition of all ones will exist after the second word is added to the first transmitted word with rotation.

If words 1, 2 and 3 had been transmitted, word 1 is rotated, then word 2 is rotated and added to rotated word 1. This result is added to rotated word 3. The final result is complemented and transmitted as the block check word.

```
                = ,0001, ACTIVITY # = 01, REPORT CODE = 06, RECORD COUNT = 001564
         MOTOROLA M6800 CROSS-ASSEMBLER

00001                    NAM    EGS    EXEC
00002           *
00003           * THIS PROGRAM RESIDES IN PROM MEMORY.
00004           * IT IS WRITTEN IN MOTROLA M6800 ASSEMBLY LANGUAGE.
00005           * IT EXECUTES IN A HONEYWELL DELTA DCC MODULE WHICH
00006           * USES A MOTOROLA M6800 MICROPROCESSOR AS THE CPU.
00007           *
00008           *
00009           *    ****   12/20/77   ****
00010           *
00011           *
00012           *    EQUATES
00013    0014   CASINT  EQU    $F4       TEMP CASSETTE VECTOR LOC.
00014    00F6   NMIINT  EQU    $00F6     TEMPORY FOR USE DEBUG
00015    00F8   IRQINT  EQU    $00F8     TEMPORY FOR USE WITH DEBUG
00016           *
00017    F000   JBUG    EQU    $F00C     JBUG ENTRY
00018    1878   JCLL    EQU    $F87C     CASSETTE ENTRY
00019    4000   IO      EQU    $4000     I/O INTERFACE LOC.
00020           *
00021    4070   ACIAST  EQU    $4070     ACIA STATUS REGISTER
00022    4071   ACIARG  EQU    $4071     ACIA DATA REGISTER
00023    4078   NMICON  EQU    $4078     NMI CONTROL REGISTER
00024    4079   NMIST   EQU    $4079     NMI STATUS REGISTER
00025    40LE   INTCON  EQU    $40LE     INTERRUPT CONTROLLER ENABLE W
00026    40LF   SYSWD   EQU    $40LF     SYSTEM WATCHDOG WORD
00027           *
00028    44L0   PIAHAD  EQU    $44L0     DATA PIA A
00029    44L1   PIAHAC  EQU    $44L1     CONTROL PIA A
00030    44L2   PIANBD  EQU    $44L2     DATA PIA B
00031    44L3   PIANBC  EQU    $44L3     CONTROL PIA B
00032           *
00033    40L6   TIRQ    EQU    $40L6     IRQ INT. FOR D1000 XMIT
00034           *
00035           *
```

```
00035                   * TO DO FLAG TABLE
00036                           ORG      $24
00037 0024 0004   AWS      RMB      4         MEMORY END=AWS  AND MEMORYST
00038 0028 0020   BASE     RMB      32
00039           *
00040           * WORKING STORAGE
00041 0048 000E   BWS      RMB      14        BASE LOOP WORK SPACE
00042 0056 0002   CLCK     RMB      2         NMI INTERRUPT CLOCK
00043 0058 0002   MPTR     RMB      2         LAST MSG PTR OR START OF CURR
00044 005A 0002   CRPTR    RMB      2         CURRENT RECEIVE PTR
00045 005C 0001   RWDCNT   RMB      1         RECEIVE WORD CNT
00046 005D 0001   BINOKM   RMB      1         IM OK CONTROL WORD
00047 005E 0001   DIVNO    RMB      1         DEVICE NO. STRAPPED
00048 005F 0001            RMB      1         PSEUDO DEVICE NO.
00049 0060 0001   LISTF    RMB      1         BUS HANDLER FLAGS
00050           * BIT0=DON'T TRANSMIT UNTIL DIRECTED.
00051           * BIT1=ERROR, STOP TRANSMITTING
00052           * BIT2=RECEIVE CHANGE IN TRANSMISSION
00053           * BIT3=LINE QUIET INTERRUPT
00054           * BIT4=BYPASS INPUT
00055           * BIT5=SPARE
00056           * BIT6=NEED QUIET MSG. OR REPEAT
00057           * BIT7=ACTIVE MONITOR
00058
00059 0061 0001   NMICTR   RMB      1         COUNTER TO XMIT TURN
00060 0062 0001   NMISEC   RMB      1         NMI SECONDARY COUNTER
00061 0063 0001   NMICTA   RMB      1         TURN COUNTER HOLD
00062 0064 0001   NMICTB   RMB      1         SECONDARY COUNTER HOLD
00063 0065 0001   PARITY   RMB      1         PARITY WORD
00064 0066 0001   NMICWD   RMB      1         NMI LOOP CONTROL
00065 0067 0001   BMSGLW   RMB      1         EXPECTED MSG LENGTH
00066 0068 0001   BADDRA   RMB      1         NEXT ADDR HOLD
00067 0069 0001   BADDR    RMB      1         NEXT XMIT ADDRESS
00068           *
00069 006A 0009   BXWS     RMB      9         WORK SPACE FOR XMIT PTRS
00070 0073 0001   MONFLG   RMB      1         MONITOR CONTROL FLAG
00071           * BIT0=REPEAT
00072           * BIT1=SEND NO MORE COS
00073           * BIT2=SEND NO MORE FIRE COS
00074           * BIT3=SPARE
00075           * BIT4=SPARE
00076           * BIT5=BUS SWITCH PREP
00077           * BIT6=SWITCH BUS
00078           * BIT7=DEVICE IS A MONITOR
00079           *
00080 0074 0001   BXW      RMB      1         SPARE MONITOR FLAG
00081 0075 0001   TFLAG    RMB      1         TRANSLATOR IRQ FLAG
00082           *
00083 0076 0003   BCLOK    RMB      3         NMI CLOCK VARIABLES
00084 0079 0002   JDIR     RMB      2         JBUG DIRECT PTR.
00085           *
00086           *    POINTERS AND CONSTANTS
00087 00FF              ORG      $FF
00088 00FF 0001            RMB      1         START AT END AND WORK BACKWAR
00089           *
00090           *
00091           *
00092           *
00093           *
00094           *    RECEIVE BUFFER
00095 0100              ORG      $100
00096 0100 0100   RECV     RMB      $100      RESERVE 256 WORDS
00097           *
00098           *
00099           *
00100           *
00101           *
00102 0200              ORG      $200
00103 0200 0040   LPTR     RMB      64        RESERVE 64 BYTES FOR TO DO PO
00104           *
00105 0240 0006   BMRMG    RMB      6         MSG RECVD AND DIRECT REPEAT
00106 0246 0086   SEND1    RMB      134       FIRST SEND BUFFER
00107 02CC 0086   SEND2    RMB      134       SECOND SEND BUFFER
00108 0352 0086   SEND3    RMB      134       THIRD SEND BUFFER
00109 03D8 0060   BSQ      RMB      96        SEND REQ. QUEUE
00110 0438 0020   BNCT     RMB      32        NMI CLOCK TABLE
00111
00112           *
00113           *  THIS IS THE FIRST AVAILABLE DATA
00114           *  FILE SPACE FOR APPLICATION PROGRAMS.
00115           *
00116           *  THIS SPECIFIED AREA WILL BE FOR
00117           *  A TABLE OF POINTERS TO DIRECTORIES OR
00118           *  SUB-DIRECTORIES.
00119           *
00120 0458 0060   BPTRTB   RMB      96        GROSS POINTER TABLE
00121           *  BPTRTB+0 JBUG
00122           *  BPTRTB+2 MONITOR
00123           *  BPTRTB+8 START OF USER SUBR. GROSS PTR'S.
00124           *
00125           *
00126           *   CANNED BE QUIET MESSAGE FOR XMISSION ERROR
00127           *   CASE WHERE A GOOD MESSAGE IS RECEIVED
00128           *   AFTER AN ERROR IS RECEIVED AND THIS DEVICE
00129           *   HAS A HIGHER DEVICE NO.
00130           *
00131 04B8 0004   BMSQ     RMB      4         DEVICE ERROR, WAIT FOR REPEAT
00132           *
00133           *
00134           *   REAL TIME CLOCK VARIABLES
00135           *
00136           *   VALUES STORED IN BCD
00137 04BC 0001   MCMS     RMB      1         MILLISECOND COUNTER
00138 04BD 0001   MCSEC    RMB      1         SECONDS
00139 04BE 0001   MCMIN    RMB      1         MINUTES
00140 04BF 0001   MCHRS    RMB      1         HOURS
00141 04C0 0001   MCDAY    RMB      1         DAY
00142 04C1 0001   MCMON    RMB      1         MONTH
00143 04C2 0001   MCYEAR   RMB      1         YEAR
00144 04C3 0001   MCDAYW   RMB      1         DAY OF WEEK
00145           *
00146           *
00147           **   LABEL AWS IS AVAILABLE FOR THE
00148           *   WORK STORAGE BEGINNING AND LABEL AWS+4
00149           *   IS THE END OF WORK STORAGE.
00150           *
```

```
00151                    *
00152 04C4 0001    MEMST  RMB    1              FIRST USABLE MEMORY LOC FOR F
00153                    *
00154 FA00               ORG    $FA00
00155                    *
00156                    * INITIALIZATION
00157 FA00 86 03   START LDA A  #3              ACIA CONTROL
00158 FA02 B7 4070       STA A  ACIAST          MASTER RESET
00159 FA05 86 9D         LDA A  #$9D            SET ACIA TO RECEIVE
00160 FA07 B7 4070       STA A  ACIAST
00161 FA0A B7 4071       STA A  ACIARG          SEND ONE CHAR.
00162                    *
00163 FA0D CE 0028       LDX    #AWS+4          START OF BASE
00164 FA10 4F            CLR A
00165 FA11 A7 00   BS3   STA A  0,X
00166 FA13 08            INX
00167 FA14 8C 0458       CPX    #BPTRTB
00168 FA17 26 F8         BNE    BS3
00169                    *
00170                    *
00171                    *  MOVE 'TO DO' PTRS.
00172                    *
00173 FA19 CE 0200       LDX    #LPTR           PTR. TO PROM TABLE
00174 FA1C DF 4C         STX    BWS+4           SAVE FOR BLOCK MOVE
00175 FA1E CE FALE       LDX    #LTPR           FROM PTR.
00176 FA21 86 40         LDA A  #64             MOVE 64 BYTES
00177 FA23 BD FFC3       JSR    BBMV            GO DO BLOCK MOVE
00178                    *
00179                    * CLEAR MEMORY IF POWER UP ELSE JUST INITIALIZE.
00180                    *
00181 FA26 CE 04C4       LDX    #MEMST          WHERE TO START CLEARING
00182 FA29 BC 0458       CPX    BPTRTB          MEMORY INITIALIZED OR POWER U
00183 FA2C 27 21         BEQ    BSTK            NOT POWERED UP
00184 FA2E DF 24         STX    AWS             SAVE MEMSTRT FOR DATA FILES
00185 FA30 5F            CLR B
00186 FA31 CE 0458       LDX    #BPTRTB         START CLEARING FROM HERE
00187 FA34 86 FF         LDA A  #$FF            ALL ONES TO TEST END
00188 FA36 A7 00   BMC   STA A  0,X             STORE ONES
00189 FA38 A1 00         CMP A  0,X             MATCH
00190 FA3A 26 08         BNE    BEOM            NO, END OF MEMORY
00191 FA3C E7 00         STA B  0,X             CLEAR
00192 FA3E 08            INX
00193 FA3F 8C 4000       CPX    #IO             END OF MEMORY
00194 FA42 26 F2         BNE    BMC             LOOP
00195 FA44 35      BEOM  TXS                    FORM STACK AT END
00196 FA45 86 40         LDA A  #64             DECREASE BY 64
00197 FA47 09      BDX   DEX                    REDUCE X-REG
00198 FA48 4A            DEC A                  LOOP DEC.
00199 FA49 2E FC         BGT    BDX             NOT DONE
00200 FA4B DF 26         STX    AWS+2           STORE END OF MEMORY
00201 FA4D 20 08         BRA    BEOM1           CONTINUE INITIALIZATION
00202 FA4F DE 26   BSTK  LDX    AWS+2           END OF MEMORY
00203 FA51 C6 40         LDA B  #64             LOOP CTR.
00204 FA53 BD FLDB       JSR    BADDX1          INCREASE FOR STACK PTR.
00205 FA56 35            TXS                    TRANSFER TO STACK
00206                    *
00207       FA57   BEOM1 EQU    *
00208                    *
00209 FA57 86 01   BEOM2 LDA A  #1
00210 FA59 97 60         STA A  LISTEN          SET QUIET BIT
00211 FA5B 97 58         STA A  MPTR            RECEIVE MESSAGE PTR
00212 FA5D 97 59         STA A  MPTR+1          WORD 0 INVALID
00213 FA5F 97 5A         STA A  CRPTR
00214 FA61 97 5B         STA A  CPPTR+1
00215                    *
00216                    *
00217                    *
00218                    *  INITIALIZE FOR CASSETTE CARD.
00219                    *
00220 FA63 86 12         LDA A  #$12            SELECT DATA DIRECTION
00221 FA65 B7 44D1       STA A  PIANAC          ON PIA A
00222 FA68 86 1F         LDA A  #$1F            O/P= B(0,4)
00223 FA6A B7 44D0       STA A  PIANAD
00224 FA6D 86 1C         LDA A  #$1C            ENABLE INT. FOR 60HZ CLOCK
00225 FA6F B7 44D1       STA A  PIANAC
00226 FA72 7F 44D0       CLR    PIANAD          RESET A DATA
00227 FA75 7F 44D3       CLR    PIANBC          SELECT DATA DIR. ON B
00228 FA78 86 FC         LDA A  #$FC            O/P= B(2,7)
00229 FA7A B7 44D2       STA A  PIANBD
00230 FA7D 86 05         LDA A  #5              ENABLE POWER FAILURE INT.
00231 FA7F B7 44D3       STA A  PIANBC
00232 FA82 86 E0         LDA A  #$E0            TURN OFF CASSETTE LITES
00233 FA84 B7 44D2       STA A  PIANBD
00234                    *
00235                    *
00236                    *
00237                    *  ENABLE INTERRUPTS
00238                    *
00239 FA87 B6 4079       LDA A  NMIST           DEVICE NO.
00240 FA8A 84 7F         AND A  #$7F            MASK D7
00241 FA8C 97 5E         STA A  DEVNO           SAVE STRAPPED DEVICE NO.
00242 FA8E B7 04B9       STA A  BMSU+1          SET ERROR MESG.
00243 FA91 B7 0244       STA A  BMRMG+4         STORE DEVICE NO
00244 FA94 48            ASL A
00245 FA95 43            COM A
00246 FA96 97 5D         STA A  BIMOKM          STORE CONTROL WORD
00247 FA98 CE 005D       LDX    #BIMOKM         IM OK PTR
00248 FA9B DF 6E         STX    BXWS+4          INTO NEXT
00249 FA9D 86 04         LDA A  #4              ERROR CONTROL EXTENSION
00250 FA9F B7 04BA       STA A  BMSU+2          INTO MESSAGE.
00251 FAA2 B7 0240       STA A  BMRMG           MSG. REC. CONTROL WORD
00252 FAA5 B7 0245       STA A  BMRMG+5         MSG. REC. CONTROL EXT.
00253 FAA8 86 06         LDA A  #6              CHANNELA/ON-LINE/WATCH DOG
00254 FAAA B7 0242       STA A  BMRMG+2         MSG. REC. LENGTH
00255 FAAD B7 04B8       STA A  BMSU            ALSO CONTROL WORD FOR ERROR M
00256 FAB0 B7 4078       STA A  NMICON          SET NMI CONTROL
00257 FAB3 97 66         STA A  NMICWD          SAVE FOR LATER MOD.
00258 FAB5 CE 0005       LDX    #5              RESART LOOP
00259 FAB8 A7 28   BIL   STA A  BASE,X          SET RESTART FLAG
00260 FABA 08            INX
00261 FABB 8C 0020       CPX    #32             DONE
00262 FABE 26 F8         BNE    BIL             NO
00263 FAC0 B6 4071       LDA A  ACIARG          READ ONE WORD TO CLEAR
00264 FAC3 B6 4070       LDA A  ACIAST          ACIA STATUS WORD
00265 FAC6 7F 40DE       CLR    INTCON          CLEAR INTERRUPT CONTROL MASK
```

```
00266                    *
00267                    *BASE LOOP
00268                    *
00269 FAC9 DE 48    AL    LDX    BWS            LOOP CNTR
00270 FACB 08       AL2   INX                   TO NEXT FLAG
00271 FACC A6 28    AL1   LDA A  BASE,X         GET FLAG
00272 FACE 27 FB          BEQ    AL2            NO HIT,GO TO NEXT FLAG
00273 FAD0 6F 28          CLR    BASE,X         CLEAR FLAG BUT LEAVE IN A
00274 FAD2 DF 48          STX    BWS            SAVE LOOP PTR
00275 FAD4 DF 4A          STX    BWS+2          FORM PTR
00276 FAD6 C6 02          LDA B  #2             LEFT HALF OF ADDR
00277 FAD8 D7 4A          STA B  BWS+2          INTO POINTER
00278 FADA 78 004B        ASL    BWS+3          TIMES 2
00279 FADD DE 4A          LDX    BWS+2          RESET X
00280 FADF EE 00          LDX    0,X            GET ROUTINE PTR
00281 FAE1 6E 00          JMP    0,X            TO ROUTINE
00282                    *
00283                    * RESTART LOOP ROUTINE
00284 FAE3 DE 48    RS    LDX    BWS            GET LOOP PTR
00285 FAE5 A7 28    RS1   STA A  BASE,X         RESET FLAG
00286 FAE7 CE 0000  RS2   LDX    #$0            TO TOP
00287 FAEA DF 48          STX    BWS            TO LOOP PTR
00288 FAEC 20 DE          BRA    AL1
00289                    *
00290                    *
00291                    *
00292                    *  'TO DO' TABLE PTRS
00293                    *
00294 FAEE FAC9    LTPR   FDB    AL             +0 MONITOR REAL TIME CLOCK
00295 FAF0 FE18           FDB    NCLOCK         +1 NMI CLOCK
00296 FAF2 FAC9           FDB    AL             +2 GLOBAL HANDLER
00297 FAF4 FAC9           FDB    AL             +3 MONITOR HANDLER
00298 FAF6 FAC9           FDB    AL             +4 DIRECT HANDLER
00299 FAF8 F000           FDB    JBUG           +5 JBUG ON-LINE ENTRY
00300 FAFA FF65           FDB    EXSCH          +6 MESSAGE SCHEDULER
00301 FAFC FAE3           FDB    RS             +7 SPARE
00302 FAFE FAE3           FDB    RS             +8 SPARE
00303 FB00 FAE3           FDB    RS             +9 SPARE
00304 FB02 FAE3           FDB    RS             +10 SPARE
00305 FB04 FAE3           FDB    RS             +11 SPARE
00306 FB06 FAE3           FDB    RS             +12 SPARE
00307 FB08 FAE3           FDB    RS             +13 SPARE
00308 FB0A FAE3           FDB    RS             +14 SPARE
00309 FB0C FAE3           FDB    RS             +15 SPARE
00310 FB0E FAE3           FDB    RS             +16 SPARE
00311 FB10 FAE3           FDB    RS             +17 SPARE
00312 FB12 FAE3           FDB    RS             +18 SPARE
00313 FB14 FAE3           FDB    RS             +19 SPARE
00314 FB16 FAE3           FDB    RS             +20 SPARE
00315 FB18 FAE3           FDB    RS             +21 SPARE
00316 FB1A FAE3           FDB    RS             +22 SPARE
00317 FB1C FAE3           FDB    RS             +23 SPARE
00318 FB1E FAE3           FDB    RS             +24 SPARE
00319 FB20 FAE3           FDB    RS             +25 SPARE
00320 FB22 FAE3           FDB    RS             +26 SPARE
00321 FB24 FAE3           FDB    RS             +27 SPARE
00322 FB26 FAE3           FDB    RS             +28 SPARE
00323 FB28 FAE3           FDB    RS             +29 SPARE
00324 FB2A FAE3           FDB    RS             +30 SPARE
00325 FB2C FAE3           FDB    RS             +31 RESTART FLAG
00326                    *
00327                    * SEND REPEAT REQUEST TO BUS
00328                    *
00329 FB2E CE 04B8  BMSSR LDX    #BMSU          BUFFER PTR.
00330 FB31 DF 70          STX    BXWS+6         TO WORKING
00331 FB33 85 20          BIT A  #$20           ACTIVE MONITOR
00332 FB35 27 13          BEQ    BMSSR2         NO,SEND REQ REPEAT.
00333 FB37 C6 01          LDA B  #1             SET NMI COUNTER TO ONE.
00334 FB39 D7 61          STA B  NMICTR         FOR IMMEDIATE REPEAT
00335 FB3B DA 73          ORA B  MONFLG         SET REPEAT BIT
00336 FB3D D7 73          STA B  MONFLG
00337 FB3F 86 BD          LDA A  #$BD           CLEAR REPEAT AND ERROR
00338 FB41 94 60   BMSSR1 AND A  LISTEN         MASK OUT
00339 FB43 97 60          STA A  LISTEN
00340 FB45 E6 00          LDA B  0,X            FIRST WORD
00341 FB47 7E FBF8        JMP    BXM            GO XMIT
00342 FB4A 86 04   BMSSR2 LDA A  #4             SET QUIET REQ. TO
00343 FB4C A7 03          STA A  3,X            CONTROL EXTENSION
00344 FB4E 86 BF          LDA A  #$BF           CLEAR REQ. QUIET BIT.
00345 FB50 20 EF          BRA    BMSSR1         GO MASK LISTEN
00346                    *
00347                    * COUNTDOWN SECONDARY COUNTER
00348                    * COUNT IN B   LISTEN IN A
00349 FB52 5A     BDSEC   DEC B                 REDUCE COUNT
00350 FB53 D7 62          STA B  NMISEC         RESAVE
00351 FB55 26 50          BNE    BQC            NOT ZERO , CONTINUE
00352 FB57 85 11          BIT A  #$11           REPEAT DIR. OR IMM. RESP.
00353 FB59 27 06          BEQ    BTIR           YES,GO SEND REPEAT IF NECASSA
00354                    *
00355 FB5B 84 EF          AND A  #$EF           CLEAR BYPASS FLAG
00356 FB5D 97 60          STA A  LISTEN
00357 FB5F 20 46          BRA    BQC            RESUME NORMAL COUNTDOWN
00358                    *
00359 FB61 DE 6C   BTIR   LDX    BXWS+2         IMM. RESP. BUFFER PTR
00360 FB63 E6 00          LDA B  0,X            FIRST WORD
00361 FB65 96 64          LDA A  NMICTB         TEST IF IMM. RESP.
00362 FB67 81 04          CMP A  #4
00363 FB69 27 7D          BEQ    BNTP2          YES, SEND IMM. RESP.
00364 FB6B C5 20          BIT B  #$20           REPEAT BIT SET
00365 FB6D 26 3B          BNE    BQC            YES ALREADY REPEATED.
00366 FB6F CA 20          ORA B  #$20           SET REPEAT BIT
00367 FB71 E7 00          STA B  0,X            SAVE FOR TEST OF DOUBLE REPEA
00368 FB73 DF 70          STX    BXWS+6         WORKING
00369 FB75 7E FC50        JMP    BSDIR+2        GO SET FOR REPEAT CNT.
00370                    *
00371                    * NMI INTERRUPT
00372                    *
00373 FB78 B6 4079  NMI   LDA A  NMIST          CLEAR NMI INT. MASK
00374 FB7B B6 4070        LDA A  ACIAST         GET ACIA STATUS REG.
00375 FB7E 2A 03          BPL    NMIA           QUIET INTERRUPT
00376 FB80 7E FC63        JMP    BNGSUT         DATA INTERRUPT
00377 FB83 96 5C   NMIA   LDA A  RWDCNT         READ WORD COUNT
00378 FB85 27 0F          BEQ    BNRE           ZERO , NO FALSE START
00379 FB87 5F            CLR B
00380 FB88 D7 5C          STA B  RWDCNT         CLEAR COUNT
```

```
00381 FB8A D7 65              STA B  PARITY       AND PARITY
00382 FB8C 80 01              SUB A  #1           FALSE START IF = ONE
00383 FB8E 27 06              BEQ    BNRE         YES, OK TO GO AHEAD
00384 FB90 96 59              LDA A  MPTR+1       ERROR, RESET MSG. PTR.
00385 FB92 97 5B              STA A  CRPTR+1
00386 FB94 86 02              LDA A  #2           SET ERROR BIT
00387 FB96 9A 60       BNRE   ORA A  LISTEN       ERROR WORD
00388 FB98 8A 08              ORA A  #8           SET QUIET INT. FLAG
00389 FB9A D6 62              LDA B  NMISLC       SECONDARY COUNTER SET
00390 FB9C 26 04              BNE    BDSEC        YES
00391 FB9E 84 EF              AND A  #$EF         CLEAR BYPASS FLAG
00392 FBA0 97 60              STA A  LISTEN       SAVE
00393
00394 FBA2 7A 0061            DEC    NMICTR       COUNTDOWN TO SEND
00395 FBA5 27 1B              BEQ    BTQ          TEST QUIET
00396
00397         *     TEST IF LOOP SWITCH SET
00398         *
00399 FBA7 7F 40DE    BDC     CLR    INTCON       ALLOW INTERRUPTS
00400 FBAA 96 73              LDA A  MONFLG       TEST LOOP SWITCH BIT SET
00401 FBAC 85 40              BIT A  #$40
00402 FBAE 27 0D              BEQ    BQC1         NOT SET
00403 FBB0 88 40              EOR A  #$40         CLEAR BIT
00404 FBB2 97 73              STA A  MONFLG       RESAVE
00405 FBB4 96 66              LDA A  NMICWD       CONTROL WORD
00406 FBB6 88 01              EOR A  #1           SET FOR OTHER LOOP
00407 FBB8 97 66              STA A  NMICWD       RESAVE
00408 FBBA B7 4078            STA A  NMICON       SWITCH LOOPS
00409
00410 FBBD 86 08     BQC1     LDA A  #8           HAVE NINE BIT TIMES UNDER INT
00411 FBBF 16               TAB                   8 IN B FOR QUIET BIT
00412 FBC0 20 5C              BRA    BCLOCK       GO TO CLOCK
00413 FBC2 44        BTQ      LSR A               QUIET BIT TO CARRY
00414 FBC3 25 E2              BCS    BQC          YES,SET DON'T XMIT
00415 FBC5 44               LSR A                 ERROR BIT TO CARRY
00416 FBC6 24 07              BCC    BSEND        ZERO, XMIT
00417 FBC8 85 10              BIT A  #$10         REPEAT OR REQ. REPEAT
00418 FBCA 27 DB              BEQ    BQC          NO, DON'T SEND REPEAT REQ.
00419 FBCC 7E FB2E            JMP    BRSSR        YES, SEND REPEAT REQ.
00420
00421         *  TIME TO SEND
00422         *
00423 FBCF 96 69     BSEND    LDA A  BADDR        CURRENT SENDING ADDRESS
00424 FBD1 91 5E              CMP A  DEVNO        COMPARE TO STRAPPED ADDRESS
00425 FBD3 26 6C              BNE    BPSEUD       SEND PSEUDO ADDRESS
00426 FBD5 96 73              LDA A  MONFLG
00427 FBD7 44                 LSR A               REPEAT FLAG SET
00428 FBD8 24 12              BCC    BNTP         NO, NEXT INTO PREVIOUS
00429 FBDA 48                 ASL A               CLEAR REPEAT FLAG
00430 FBDB 97 73              STA A  MONFLG       STORE
00431 FBDD DE 6A              LDX    BXWS         PREVIOUS INTO WORKING
00432 FBDF 8C 005D             CPX   #BIMOKM      WAS PREV. AN I'M OK
00433 FBE2 27 08              BEQ    BNTP         YES, SEND NEXT
00434 FBE4 E6 00              LDA B  0,X          FIRST WORD
00435 FBE6 CA 20              ORA B  #$20         SET REPEAT BIT
00436 FBE8 DF 70     BNTP2    STX    BXWS+6
00437 FBEA 20 0C              BRA    BXM          GO XMIT
00438 FBEC DE 6E     BNTP     LDX    BXWS+4       NEXT
00439 FBEE DF 70     BNTP1    STX    BXWS+6       TO WORKING
00440 FBF0 E6 00              LDA B  0,X          TEST IF DIRECT
00441 FBF2 C5 03              BIT B  #3           D0-D1=0
00442 FBF4 27 58              BEQ    BSDIR        YES, DIRECT
00443 FBF6 DF 6A              STX    BXWS         WORKING TO PREVIOUS
00444
00445         *  XMIT FIRST WORD
00446         *
00447 FBF8 86 3D     BXM      LDA A  #$3D         SET ACIA TO XMIT
00448 FBFA B7 4070            STA A  ACIAST
00449 FBFD F7 4071            STA B  ACIARG       INTO TRANSFER DATA REG.
00450 FC00 A6 02              LDA A  2,X          GET MSG LENGTH
00451 FC02 54                 LSR B               TEST FOR I'M OK
00452 FC03 24 05              BCC    BXPC         IF NOT ,STORE FOR PARITY
00453 FC05 86 01              LDA A  #1           MSG. LENGTH IS 2
00454 FC07 D6 5E              LDA B  DEVNO        ELSE STORE DEVNO INTO PARITY
00455 FC09 53                 COM B
00456 FC0A D7 65     BXPC     STA B  PARITY
00457 FC0C 97 72              STA A  BXWS+8       STORE MSG. LENGTH
00458 FC0E 96 69              LDA A  BADDR        SENDING ADDRESS
00459 FC10 A7 01              STA A  1,X          TO BUFFER AND MSG.
00460 FC12 CE 005D            LDX    #BIMOKM      RESET NEXT FOR
00461 FC15 DF 6E              STX    BXWS+4       ANOTHER MSG.
00462
00463 FC17 7F 40DE            CLR    INTCON       ALLOW INTERRUPTS
00464
00465 FC1A 86 0E              LDA A  #14          TIME ADJUSTMENT FOR XMISSION
00466 FC1C C6 08              LDA B  #8           SET QUIET BIT
00467
00468         *  TIME CLOCK FROM BIT TIME COUNTS
00469         *
00470 FC1E DA 60     BCLOCK   ORA B  LISTEN       SET BIT FOR CHANGE IN XMISSIO
00471 FC20 D7 60              STA B  LISTEN
00472 FC22 9B 56              ADD A  CLCK         ADD IN PREVIOUS COUNT
00473 FC24 97 56              STA A  CLCK         SAVE COUNT
00474 FC26 2A 18              BPL    BEXIT        PLUS, NOT 12.5 MS.
00475 FC28 84 7F              AND A  #$7F         MASK POS.
00476 FC2A 97 56              STA A  CLCK         YES, SAVE OVERFLOW
00477 FC2C 7A 0057            DEC    CLCK+1       100 MILLISECOND CLCK
00478 FC2F 96 66              LDA A  NMICWD       XMIT CONTROL WORD
00479 FC31 B7 4078            STA A  NMICON       BUMP BUMP TIMER
00480 FC34 7C 0029            INC    BASE+1       SET TO DO FLAG
00481 FC37 96 75              LDA A  TFLAG        IRQ REQ.
00482 FC39 27 05              BEQ    *+7          NO
00483 FC3B 86 3D              LDA A  #$3D         YES , SET IRQ
00484 FC3D B7 40E8            STA A  TIRQ
00485 FC40 3B        BEXIT    RTI
00486
00487         *  LOGIC TO SEND ON PSEUDO ADDRESS
00488         *
00489 FC41 DE 6E     BPSEUD   LDX    BXWS+4       NEXT MESSAGE PTR.
00490 FC43 DF 70              STX    BXWS+6       NEXT TO WORKING
00491 FC45 E6 00              LDA B  0,X          FIRST WORD
00492 FC47 C5 03              BIT B  #3           MASK FOR DIRECT
00493 FC49 27 0C              BEQ    BSDIR1       DIRECT, GO XMIT
00494 FC4B 7E FBA7            JMP    BQC          NOT A DIRECT, GO TO CLOCK
00495         *
```

```
00496
00497              *    LOGIC TO HANDLE DIRECT MESSAGES
00498              *
00499 FC4E DF 6C   BSDIR  STX   BXWS+2       MESG. PTR TO IR/DIR SAVE SLOT
00500 FC50 4F             CLR A
00501 FC51 97 6A           STA A   BXWS       SET LAST GLOBAL TO I'M OK
00502 FC53 86 5D           LDA A   #BIMOKM    SINCE THIS IS A DIRECT.
00503 FC55 97 6B           STA A   BXWS+1
00504 FC57 86 06   BSDIR1 LDA A   #6         NO, SIX CNTS TO NMI SEC, COUN
00505 FC59 97 62           STA A   NMISEC     FOR REPEAT
00506 FC5B 97 64           STA A   NMICTB     CLEAR IMM. RESP. COUNT.
00507 FC5D 96 5E           LDA A   DEVNO      STORE REAL ADDRESS INTO
00508 FC5F A7 04           STA A   4,X        DIRECT MESSAGE
00509 FC61 20 95           BRA     BXM        GO SET UP TO XMIT
00510              *
00511              *
00512              *   NGSTI DATA INTERRUPT
00513              *
00514 FC63 44     BNGSDT LSR  A                RECEIVE BIT TO C BIT
00515 FC64 25 5F           BCS    BNGSR        GO TO RECEIVE
00516 FC66 7A 0072         DEC    BXWS+6       A SEND INT. REDUCE SEND WORD
00517 FC69 27 19           BEQ    BSPAR        SEND PARITY BYTE
00518 FC6B DE 70           LDX    BXWS+6       SEND BUFFER TO X
00519 FC6D 08             INX                 BUMP INDEX TO NEXT WORD
00520 FC6E A6 00           LDA A   0,X         NEXT BYTE TO A
00521 FC70 B7 4071         STA A   ACIARG      XMIT THIS BYTE
00522 FC73 7F 40DE         CLR     INTCON      ALLOW INTERRUPTS
00523 FC76 DF 70           STX    BXWS+6       SAVE SEND BUFFER POINTER
00524 FC78 9B 65           ADD A   PARITY      FORM PARITY
00525 FC7A 44             LSR A
00526 FC7B 24 02           BCC    BNKARY       NO CARRY
00527 FC7D 8B 80           ADD A   #$80        COMPLETE ROTATE
00528 FC7F 97 65   BNKARY STA A   PARITY       SAVE
00529 FC81 7E FD1A         JMP    BSCLCK       EXIT
00530              *
00531 FC84 96 65   BSPAR  LDA A   PARITY
00532 FC86 43             COM A                COMPLEMENT BEFORE XMISSION
00533 FC87 B7 4071         STA A   ACIARG      XMIT
00534 FC8A 86 9D           LDA A   #$9D        SET RECEIVE
00535 FC8C B7 4070         STA A   ACIAST
00536 FC8F 4F             CLR A
00537 FC90 B7 40DE         STA A   INTCON      ALLOW INTERRUPTDS
00538 FC93 B7 40DE         STA A   INTCON      ALLOW INTERRUPTS
00539 FC96 97 65           STA A   PARITY      CLEAR FOR NEXT RECEIVE.
00540              *
00541              *   TEST IF BUS SWITCH PREPPED
00542              *
00543 FC98 96 73           LDA A   MONFLG      FLAG WORD
00544 FC9A 85 20           BIT A   #$20        PREP FLAG
00545 FC9C 27 7C           BEQ    BSCLCK       NOT SET
00546 FC9E DE 6A           LDX    BXWS         LAST GLOBAL
00547 FCA0 E6 00           LDA B   0,X         CONTROL WORD
00548 FCA2 C4 07           AND B   #7          MASK
00549 FCA4 C1 06           CMP B   #6          MONITOR DIRECTIVE
00550 FCA6 26 72           BNE    BSCLCK       NO, GET OUT.
00551 FCA8 E6 03           LDA B   3,X         CONTROL EXTENSION
00552 FCAA C1 01           CMP B   #1          IS IT BUS SWITCH
00553 FCAC 26 6C           BNE    BSCLCK       NO
00554 FCAE 88 60           EOR A   #$60        SET BUS SWITCH AND CLEAR
00555 FCB0 97 73           STA A   MONFLG      BUS SWITCH PREP FLAG
00556 FCB2 20 66           BRA    BSCLCK       CLOCK AND EXIT
00557              *    HARDWARE ERROR RECEIVED
00558 FCB4 86 12   BHDWE  LDA A   #$12         SET HARDWARE ERROR, BYPASS
00559 FCB6 9A 60           ORA A   LISTEN      MASK IN
00560 FCB8 97 60           STA A   LISTEN      SAVE
00561 FCBA 96 59           LDA A   MPTR+1      RESET CURRENT PTR.
00562 FCBC 97 5B           STA A   CRPTR+1     TO BEGINNING
00563 FCBE 20 5A           BRA    BSCLCK       GO UPDATE TIME OUT COUNTER
00564              *
00565 FCC0 7F 0062 BYPASS CLR    NMISEC       CLEAR SECONDARY COUNTER
00566 FCC3 20 55           BRA    BSCLCK       UPDATE CLOCK
00567              *
00568              *   RECEIVE ROUTINE
00569 FCC5 F6 4071 BNGSR  LDA B   ACIARG      GET BYTE TO CLEAR REC DATA RE
00570 FCC8 7F 40DE         CLR     INTCON      ALLOW INTERRUPTS
00571 FCCB 84 38           AND A   #$38        TEST HARDWARE ERROR
00572 FCCD 26 E5           BNE    BHDWE       HARDWARE ERROR
00573 FCCF 96 60           LDA A   LISTEN      FLAGS
00574 FCD1 85 10           BIT A   #$10        IF SET BYPASS RECEIVE
00575 FCD3 26 EB           BNE    BYPASS      FORGET BYTE
00576 FCD5 DE 5A           LDX    CRPTR       CURRENT RECEIVE PTR
00577 FCD7 96 5C           LDA A   RWDCNT      RECEIVE WORD CNT
00578 FCD9 4C             INC A
00579 FCDA 97 5C           STA A   RWDCNT      SAVE
00580 FCDC 7C 005B BRIP   INC    CRPTR+1      BUMP MESSAGE PTR.
00581 FCDF 27 FB           BEQ    BRIP         CAN'T USE WORD 0
00582 FCE1 E7 00           STA B   0,X         STORE INTO BUFFER
00583 FCE3 DB 65           ADD B   PARITY      ADD PREVIOUS PARITY WORD
00584 FCE5 54             LSR B               SHIFT RIGHT 1
00585 FCE6 24 02           BCC    BNCARY      SKIP IF CARRY
00586 FCE8 CB 80           ADD B   #$80        ADD CARRY TO LEFT BIT
00587 FCEA D7 65   BNCARY STA B   PARITY      SAVE PARITY
00588 FCEC 5C             INC B               TEST IF LAST
00589 FCED 26 04           BNE    BNTLST      NOT LAST
00590              *
00591              *TEST EXPECTED MESSAGE LENGTH
00592 FCEF 91 67           CMP A   BMSGLW      MESSAGE LENGTH EXPECTED
00593 FCF1 27 65           BEQ    BME          END OF MESSAGE
00594              *
00595              *   RECEIVED BUT NOT LAST BYTE
00596              *
00597 FCF3 E6 00   BNTLST LDA B   0,X         WORD RECEIVED.
00598 FCF5 81 01           CMP A   #1          IS IT FIRST WORD
00599 FCF7 26 2B           BNE    BMFL        NO
00600 FCF9 53             COM B               DEVICE NO.
00601 FCFA 54             LSR B               IM OK
00602 FCFB 25 1D           BCS    BSCLCK      NO .EXIT
00603 FCFD 4C             INC A
00604 FCFE 97 67           STA A   BMSGLW      SET EXPECTED MESSAGE LENGTH.
00605 FD00 96 5E   BCNCTR LDA A   DEVNO       CALC XMIT TURN.
00606 FD02 97 68           STA A   BADDRA      XMIT ADDR. HOLD
00607 FD04 10             SBA
00608 FD05 48             ASL A               NMI COUNTDOWN CTR.
00609 FD06 97 63           STA A   NMICTA      SAVE FOR END OF MSG.
00610 FD08 96 5F           LDA A   DEVNO+1     PSEUDO NO.
00611 FD0A 27 0E           BEQ    BSCLCK      NONE, QUIT
```

```
00612 FD0C 10            SBA
00613 FD0D 2B 0B         BMI   BSCLCK        AFTER, QUIT
00614 FD0F 48            ASL A
00615 FD10 91 63         CMP A NMICTA        USE PSEUDO OR REAL
00616 FD12 22 06         BHI   BSCLCK        REAL.
00617 FD14 97 63         STA A NMICTA        PSEUDO COUNTDOWN.
00618 FD16 96 5F         LDA A DEVNO+1
00619 FD18 97 68         STA A BADDRA        SET FOR PSEUDO O/P
00620 FD1A 86 0B   BSCLCK LDA A #11          11 BIT TIMES TO CLOCK
00621 FD1C C6 04         LDA B #4            RECIVE BIT
00622 FD1E 7E FC1E       JMP   BCLOCK        GO TO CLOCK
00623 FD21 81 02   BMFL  CMP A #2            SECOND WORD
00624 FD23 26 05         BNE   BMFL1         NO TEST THIRD
00625 FD25 F7 0243       STA B BMRMG+3       SET IF DIRECT
00626 FD28 20 06         BRA   BCNCTR        GO CALC NMICTR
00627 FD2A 81 03   BMFL1 CMP A #3            THIRD WORD
00628 FD2C 26 05         BNE   BMDB          NO TEST FOURTH
00629 FD2E 5C            INC B               BUMP TO INCLUDE PARITY WORD.
00630 FD2F 07 67         STA B BMSGLW        EXPECTED MESSAGE LENGTH
00631 FD31 20 E7         BRA   BSCLCK
00632 FD33 81 04   BMDB  CMP A #4            FOURTH WORD
00633 FD35 26 E3         BNE   BSCLCK        NO, EXIT
00634 FD37 DE 58         LDX   MPTR          FIRST WORD PTR.
00635 FD39 A6 00         LDA A 0,X           FIRST WORD
00636 FD3B 85 03         BIT A #3            TEST IF DIRECT
00637 FD3D 26 DB         BNE   BSCLCK        NO, EXIT
00638 FD3F 96 5E         LDA A DEVNO         CURRENT DEVNO
00639 FD41 10            SBA                 MATCH
00640 FD42 27 0B         BEQ   BDMCH
00641 FD44 96 5F         LDA A DEVNO+1       PSEUDO MATCH
00642 FD46 10            SBA
00643 FD47 27 06         BEQ   BDMCH         YES.
00644 FD49 86 06         LDA A #6            SET UP SECONDARY CTR.
00645 FD4B 97 64         STA A NMICTB
00646 FD4D 20 CB         BRA   BSCLCK
00647 FD4F 86 04   BDMCH LDA A #4            SECONDARY SET UP
00648 FD51 97 64         STA A NMICTB
00649 FD53 F7 0241       STA B BMRMG+1       SENDER OF MSG RECEIVED
00650 FD56 20 C2         BRA   BSCLCK        EXIT
00651
00652              *  END OF MESSAGE RECEIVED
00653
00654 FD58 D7 5C   BNE   STA B RWDCNT        CLEAR AFTER GOOD REC.
00655 FD5A D7 65         STA B PARITY
00656
00657              *  TEST MESSAGE TYPE AT END OF RECEIVED MESSAGE
00658              *
00659 FD5C DE 58         LDX   MPTR          START OF MESSAGE
00660 FD5E A6 00         LDA A 0,X           FIRST WORD
00661 FD60 44            LSR A               BIT 0 TO CARRY
00662 FD61 25 16         BCS   BIMOK         I'M OK MSG
00663 FD63 44            LSR A               BIT 1 TO CARRY
00664 FD64 24 6F         BCC   BDIRM         DIRECT MESSAGE
00665 FD66 44            LSR A
00666 FD67 24 31         BCC   BCOS          CHANGE OF STATE MESSAGE
00667
00668              *  DEFAULT TO MONITOR DIRECTIVE MESSAGE
00669              *
00670
00671 FD69 E6 03         LDA B 3,X           GET CONTROL WORD
00672 FD6B C1 04         CMP B #4            ONE OR 2
00673 FD6D 2D 14         BLT   BSWIT         SWITCH BUSSES
00674 FD6F 26 29         BNE   BCOS          SET GLOBAL FLAG
00675
00676              *  GO QUILT AND WAIT FOR MONITOR REPEAT.
00677              *
00678 FD71 96 60         LDA A LISTEN        QUIET FLAG WORD.
00679 FD73 8A 02         ORA A #2            SET ERROR BIT
00680 FD75 97 60         STA A LISTEN        SAVE
00681 FD77 20 21         BRA   BCOS
00682
00683              *  I'M OK MESSAGE
00684              *
00685 FD79 96 59   BIMOK LDA A MPTR+1        MESSAGE POINTER.
00686 FD7B D6 73         LDA B MONFLG        MONITOR DEVICE
00687 FD7D 2B 27         BMI   BMONT1        YES, SET FLAG
00688 FD7F 97 5B         STA A CRPTR+1       BY OVERLAYING NEW WITH OLD
00689 FD81 20 29         BRA   BMONST        CALC NEW NMICTR
00690
00691              *  SWITCH LOOPS OR REPEAT OR BOTH
00692              *
00693 FD83 54    BSWIT   LSR B               TEST IF SWIT
00694 FD84 24 0A         BCC   BSRPT         NO, REPEAT
00695 FD86 86 01         LDA A #1            SWITCH LOOPS
00696 FD88 9B 66         EOR A NMICWD        CONTROL WORD
00697 FD8A 97 66         STA A NMICWD
00698 FD8C C5 01         BIT B #1            REPEAT ALSO
00699 FD8E 27 0A         BEQ   BCOS          NO
00700 FD90 DA 73   BSRPT ORA B MONFLG        SET RPT. BIT.
00701 FD92 D7 73         STA B MONFLG
00702 FD94 96 60         LDA A LISTEN
00703 FD96 84 FD         AND A #$FD          MASK OUT ERROR BIT
00704 FD98 97 60         STA A LISTEN
00705
00706              *  CHANGE OF STATE OR MONITOR DIRECTIVE
00707
00708 FD9A 96 59   BCOS  LDA A MPTR+1        CURRENT MSG START
00709 FD9C D6 2A         LDA B BASE+2        GLOBAL TO DO FLAG
00710 FD9E 26 02         BNE   BMONT         ALREADY SET
00711 FDA0 97 2A         STA A BASE+2        SET GLOBAL TO DO FLAG
00712 FDA2 D6 73   BMONT LDA B MONFLG        MONITOR FLAG
00713 FDA4 2A 06         BPL   BMONST        NOT A MONITOR
00714 FDA6 D6 2B   BMONT1 LDA B BASE+3       MONITOR FLAG
00715 FDA8 26 02         BNE   BMONST        FLAG SET
00716 FDAA 97 2B         STA A BASE+3        SET MONITOR FLAG
00717
00718              *  CALCULATE NMI COUNTER
00719              *
00720 FDAC 96 63   BMONST LDA A NMICTA       NMICTR FROM HOLD
00721 FDAE 97 61         STA A NMICTR
00722 FDB0 96 68         LDA A BADDRA        ADDRESS FORM HOLD
00723 FDB2 97 69         STA A BADDR
00724              *  SEND MONITOR QUILT IF GOOD REC. AFTER ERROR.
00725 FDB4 96 60         LDA A LISTEN        TEST ERROR CONDITION
00726 FDB6 85 02         BIT A #2
00727 FDB8 27 0C         BEQ   BUPTR         NO ERROR
00728 FDBA DE 58         LDX   MPTR          BUFFER PTR.
```

```
00729 FDBC D6 5E            LDA  B  DEVNO       THIS DEVICE NO.
00730 FDBE E1 01             CMP  B  1,X         REC. ADDR.
00731 FDC0 23 04              BLS     BUPTR       ADDR. REC NOT LOWER
00732 FDC2 8A 40              ORA  A  #$40        SET SEND QUIET MSG. BIT
00733 FDC4 97 60              STA  A  LISTEN
00734 FDC6 96 5B    BUPTR    LDA  A  CRPTR+1     CURRENT PTR
00735 FDC8 81 FA              CMP  A  #$FA        DONT START A REC. AFTER HERE
00736 FDCA 23 04              BLS     BUPTRA      LESS THAN OR SAME IS OK
00737 FDCC 86 01              LDA  A  #1          GO BACK TO START
00738 FDCE 97 5B              STA  A  CRPTR+1     INTO CURRENT
00739 FDD0 97 59    BUPTRA   STA  A  MPTR+1      UPDATE MESSAGE PTR TO NEXT RE
00740 FDD2 7E FD1A            JMP     BSCLCK
00741
00742                    *    RECEIVE DIRECT MSG
00743                    *
00744                    *
00745 FDD5 96 64    BDIRM    LDA  A  NMICTB      SECONDARY HOLD
00746 FDD7 81 04              CMP  A  #4          MATCH
00747 FDD9 27 0B              BEQ     BDMTCH      YES
00748 FDDB 97 62              STA  A  NMISEC      INTO SECONDARY
00749 FDDD 86 10              LDA  A  #$10        SET BYPASS FLAG
00750 FDDF 9A 60              ORA  A  LISTEN      MASK IN
00751 FDE1 97 60              STA  A  LISTEN      SAVE
00752 FDE3 7E FD79            JMP     BIMOK       GO CHECK IF MONITOR
00753 FDE6 D6 62    BDMTCH   LDA  B  NMISEC      SECONDARY CTR. NON-ZERO
00754 FDE8 27 0D              BEQ     BDSW        GO SET WAIT MSG
00755 FDEA 4F                 CLR  A              HANDSHAKE COMING BACK.
00756 FDEB 97 62              STA  A  NMISEC      CLEAR SECONDARY CTR.
00757 FDED 96 59              LDA  A  MPTR+1      MSG PTR
00758 FDEF D6 2C              LDA  B  BASE+4      DIRECT REC.
00759 FDF1 26 02              BNE     BDRS        DIRECT SET
00760 FDF3 97 2C              STA  A  BASE+4      SET TO DO FLAG
00761 FDF5 20 CF    BDRS     BRA     BUPTR       UPDATE POINTER
00762
00763                    *    SET UP MESSAGE RECEIVED.
00764                    *
00765 FDF7 CE 0240  BDSW     LDX     #BMRMG      RECEIVED ANS. MESSAGE PTR
00766 FDFA 97 62              STA  A  NMISEC      SET SECONDARY
00767 FDFC DF 6C              STX     BXWS+2      SET SEND I.R. BUFFER
00768 FDFE DE 58              LDX     MPTR        POINTER TO X FOR JBUG
00769 FE00 DF 79              STX     JDIR        SET JBUG FOR DOWNLINE LOAD
00770 FE02 A6 05              LDA  A  5,X         CONTROL EXTENSION
00771 FE04 44                 LSR  A              START OR STOP XMITTING
00772 FE05 27 05              BEQ     LSTX        START
00773 FE07 44                 LSR  A              STOP
00774 FE08 26 04              BNE     DCHKA       NO
00775 FE0A 86 01              LDA  A  #1          BIT 1 FOR SHUT UP.
00776 FE0C 97 60    DSTX     STA  A  LISTEN      SET CONTROL WORD.
00777 FE0E 96 59    DCHKA    LDA  A  MPTR+1      MSG PTR
00778 FE10 D6 2C              LDA  B  BASE+4      SET DIRECT RECEIVED FLAG
00779 FE12 26 02              BNE     BDFS
00780 FE14 97 2C              STA  A  BASE+4      SET DIRECT REC. TO DO FLAG
00781 FE16 20 8A    BDFS     BRA     BMONT       GO CHECK IF MONITOR
00782
00783                    *
00784                    *    ROUTINE TO SCHEDULE TIMED APPLICATION PROGRAMS
00785                    *
00786 FE18 5F      NCLOCK   CLR  B               NMI DRIVEN CLOCK
00787 FE19 7F 40DF            CLR     SYSWD       CLEAR SYSTEM WATCHDOG
00788 FE1C D7 4C              STA  B  BWS+4       INITIALIZATION
00789 FE1E D7 4D              STA  B  BWS+5
00790 FE20 D7 4E              STA  B  BWS+6
00791 FE22 97 52              STA  A  BWS+10      SAVE 10 MS. COUNTER
00792 FE24 9B 76              ADD  A  BCLOK       TEN MILLISECOND CTR.
00793 FE26 97 76              STA  A  BCLOK       SAVE
00794 FE28 80 50              SUB  A  #80         ONE SECOND
00795 FE2A 25 25              BCS     BSCLKL      NO
00796 FE2C 97 76              STA  A  BCLOK       YES
00797 FE2E 7C 004C            INC     BWS+4       SET SECOND FLAG
00798 FE31 D6 73              LDA  B  MONFLG      SET SWITCH BUS BIT.
00799 FE33 96 60              LDA  A  LISTEN      CHECK XMIT BITS
00800 FE35 84 0C              AND  A  #$0C
00801 FE37 81 0C              CMP  A  #$0C        BOTH TRANSITIONS SET
00802 FE39 27 04              BEQ     BNCEX1      YES
00803 FE3B CA 40              ORA  B  #$40        SET BUS SWITCH.
00804 FE3D D7 73              STA  B  MONFLG      RESAVE
00805 FE3F 98 60    BNCEX1   EOR  A  LISTEN      CLEAR XMITS BITS
00806 FE41 97 60              STA  A  LISTEN
00807 FE43 96 77              LDA  A  BCLOK+1     SECONDS CTR
00808 FE45 4C                 INC  A              BUMP
00809 FE46 97 77              STA  A  BCLOK+1
00810 FE48 80 3C              SUB  A  #60         MINUTE
00811 FE4A 25 05              BCS     BSCLKL      NO. START CLOCK FLAG TEST
00812 FE4C 7C 004D            INC     BWS+5       SET MINUTE FLAG
00813 FE4F 97 77              STA  A  BCLOK+1
00814 FE51 CE 0437  BSCLKL   LDX     #BNCT-1     GET CLOCK TABLE PTR.
00815 FE54 08      BCLCKL   INX                  TO NEXT WORD
00816 FE55 8C 0448            CPX     #BNCT+16    DONE
00817 FE58 27 3A              BEQ     BCLKL1      YES
00818 FE5A A6 00              LDA  A  0,X         CONTROL WORD ACTIVE
00819 FE5C 27 F6              BEQ     BCLCKL      NO. GET NEXT
00820 FE5E 44                 LSR  A              TEST IF MILLISECD FLAG
00821 FE5F 25 0D              BCS     BCMSC       YES
00822 FE61 44                 LSR  A              SECOND FLAG
00823 FE62 25 11              BCS     BCSSC       YES
00824 FE64 90 4D              SUB  A  BWS+5       DEC. MINUTE COUNT
00825 FE66 27 12              BEQ     BCSTDF      TIME TO SET FLAG
00826 FE68 49                 ROL  A              RESET TABLE WORD
00827 FE69 49      BRSTCW   ROL  A              RESET LAST BIT
00828 FE6A A7 00              STA  A  0,X         RESTORE INTO TABLE
00829 FE6C 20 E6              BRA     BCLCKL      LOOP
00830                    *
00831 FE6E 90 52    BCMSC    SUB  A  BWS+10      MILLISECOND COUNT
00832 FE70 23 08              BLS     BCSTDF      SET FLAG
00833 FE72 0D                 SEC
00834 FE73 20 F4              BRA     BRSTCW      RESET TABLE WORD
00835 FE75 90 4C    BCSSC    SUB  A  BWS+4       SECOND COUNT
00836 FE77 0D                 SEC                 SET C-BIT
00837 FE78 26 EE              BNE     BRSTCW-1    NOT TIME , RESET TABLE WORD
00838 FE7A 6F 00    BCSTDF   CLR     0,X         CLEAR CNTR.
00839 FE7C E6 10              LDA  B  16,X        FLAG
00840 FE7E C4 1F              AND  B  #$1F        ISOLATE FLAG
```

```
00841 FE80 D7 4F            STA B   BWS+7       SET UP PTR.
00842 FE82 DF 50            STX     BWS+8
00843 FE84 E6 10            LDA B   16,X        GET TYPE FOR FLAG STORE
00844 FE86 DE 4E            LDX     BWS+6       GET PTR
00845 FE88 C4 E0            AND B   #$E0        ISOLATE TYPE TO SET FLAG
00846 FE8A 26 02            BNE     BCSTD1      STORE VALUE
00847 FE8C 16               TAB
00848 FE8D 5A               DEC B               SET A TO FF
00849 FE8E E7 28     BCSTD1 STA B   BASE,X      SET FLAG
00850 FE90 DE 50            LDX     BWS+8       RELOAD X-REG.
00851 FE92 20 C0            BRA     BCLCKL      LOOP
00852                    *
00853 FE94 7E FF01  BCLKL1  JMP     JXC4        BACK TO 'TO DO'
00854 FE97 FF               FCB     $FF,$FF,$FF,$FF,$FF,$FF,$FF,$FF,$FF,$F
      FE98 FF
      FE99 FF
      FE9A FF
      FE9B FF
      FE9C FF
      FE9D FF
      FE9E FF
      FE9F FF
      FEA0 FF
00855 FEA1 FF               FCB     $FF,$FF,$FF
      FEA2 FF
      FEA3 FF
00856 FEA4 FF               FCB     $FF,$FF,$FF,$FF,$FF,$FF,$FF,$FF,$FF,$F
      FEA5 FF
      FEA6 FF
      FEA7 FF
      FEA8 FF
      FEA9 FF
      FEAA FF
      FEAB FF
      FEAC FF
      FEAD FF
00857 FEAE FF               FCB     $FF,$FF,$FF,$FF,$FF,$FF,$FF,$FF,$FF,$F
      FEAF FF
      FEB0 FF
      FEB1 FF
      FEB2 FF
      FEB3 FF
      FEB4 FF
      FEB5 FF
      FEB6 FF
      FEB7 FF
00858 FEB8 FF               FCB     $FF,$FF,$FF,$FF,$FF,$FF,$FF,$FF,$FF,$F
      FEB9 FF
      FEBA FF
      FEBB FF
      FEBC FF
      FEBD FF
      FEBE FF
      FEBF FF
      FEC0 FF
      FEC1 FF
00859 FEC2 FF               FCB     $FF,$FF,$FF,$FF,$FF,$FF,$FF,$FF,$FF,$F
      FEC3 FF
      FEC4 FF
      FEC5 FF
      FEC6 FF
      FEC7 FF
      FEC8 FF
      FEC9 FF
      FECA FF
      FECB FF
00860
00861 FECC                  ORG     $FECC
00862                    *
00863                    *
00864                    *   SET ACTIVITY FLAG AFTER XMIT OF MSG.
00865                    *
00866 FECC 84 1F      BSBF  AND A   #$1F        MASK FLAG
00867 FECE 27 09            BEQ     BSBFX       NONE SET . EXIT.
00868 FED0 97 51            STA A   BWS+9       BUILD X PTR.
00869 FED2 7F 0050          CLR     BWS+8
00870 FED5 DE 50            LDX     BWS+8       PTR. TO X
00871 FED7 6C 28            INC     BASE,X      SET ACTIVITY FLAG
00872 FED9 39         BSBFX RTS                 RETURN
00873                    *
00874                    *
00875                    *
00876                    *
00877
00878                    *   ADD VALUE IN REG. A TO REG. X --
00879                    *   IF ENTRY TO BADDX1  ADD VALUE IN B.
00880                    *
00881 FEDA 16        BADDX  TAB                 DO NOT DESTROY A REG
00882 FEDB DF 4C     BADDX1 STX     BWS+4       SAVE X-REG.
00883 FEDD 37               PSH B               SAVE B-REG
00884 FEDE DB 4D            ADD B   BWS+5
00885 FEE0 24 03            BCC     BADDXA      OVERFLOW
00886 FEE2 7C 004C          INC     BWS+4       YES, INC MSB
00887 FEE5 D7 4D     BADDXA STA B   BWS+5       STORE LSB
00888 FEE7 DE 4C            LDX     BWS+4
00889 FEE9 33               PUL B               RESTORE B-REG.
00890 FEEA 39               RTS
00891                    *
00892                    *
00893                    *
00894                    *   EXIT TO TO DO BUT SET NEXT ENTRY
00895                    *   A-REG.=TO DO FLAG TO CHECK NEXT
00896 FEEB 84 1F      JXC1  AND A   #$1F        MASK FOR LARGEST VALUE
00897 FEED 97 49            STA A   BWS+1       SET NEXT PTR.
00898 FEEF 20 10            BRA     JXC4        EXIT TO DO
00899                    *
00900                    *   SET TO DO FLAG FOR REENTRY
00901                    *
00902 FEF1 DE 48      JXC3B LDX     BWS         BASE FLAG PTR.
00903 FEF3 86 01            LDA A   #1
00904 FEF5 AA 28            ORA A   BASE,X      SET FLAG
00905 FEF7 A7 28            STA A   BASE,X
```

```
00906                        *  SET NEXT TO DO ENTRY TO N+1
00907                        *       LOC. ON STACK
00908                        *
00909
00910 FEF9 DE 4A    JXC3     LDX     BWS+2
00911 FEFB 32                PUL A                    UPPER HALF OF ENTRY
00912 FEFC A7 00             STA A   0,X              INTO TABLE
00913 FEFE 32                PUL A                    LOWER HALF
00914 FEFF A7 01             STA A   1,X              TO TABLE
00915                        *
00916                        *  ALL APPLICATION EXITS MUST GO THROUGH HERE
00917 FF01 96 57    JXC4     LDA A   CLCK+1           100 MILLISECOND CLOCK
00918 FF03 2A 07             BPL     JXC4A            NOT TIME
00919 FF05 86 0A             LDA A   #10              RESET
00920 FF07 97 57             STA A   CLCK+1
00921 FF09 7E FAE7           JMP     RS2              RESTART TO DO
00922 FF0C 7E FAC9  JXC4A    JMP     AL               GO BACK TO LOOP.
00923                        *
00924                        *
00925                        *  ROUTINE TO ENTER TIMES AND FLAG WHICH SCHEDULE
00926                        *  TO DO EVENTS. THE LIMIT IS 16 , IF EXCEEDED
00927                        *. YOUR FLAG WILL NOT BE SCHEDULED.
00928                        *
00929                        *
00930                        *  A-REG=TO DO FLAG IN D0-D4  FLAG CODE IN D5-D7
00931                        *  B-REG=CLOCK PARAMETERS
00932                        *       IF D0=1 THEN 10 MILLISECOND CLOCK   D1-D7
00933                        *         IS THE COUNTDOWN.
00934                        *       IF D0-D1=10 THEN SECOND CLOCK  D2-D7=COUNTDOW
00935                        *       IF D0-D1=00 THEN MINUTE CLOCK  D2-D7=COUNTDOW
00936                        *
00937 FF0F 97 4C    JXC2     STA A   BWS+4            SAVE
00938 FF11 CE 0437           LDX     #BNCT-1          CLOCK TABLE POINTER
00939 FF14 08       BJC3L    INX                      TO NEXT SLOT
00940 FF15 8C 0448           CPX     #BNCT+16         DONE
00941 FF18 27 0A             BEQ     JXC2R            YES, RET.
00942 FF1A A6 00             LDA A   0,X              SLOT OPEN
00943 FF1C 26 F6             BNE     BJC3L            GET NEXT ONE
00944 FF1E E7 00             STA B   0,X              SET CLOCK VAR.
00945 FF20 96 4C             LDA A   BWS+4
00946 FF22 A7 10             STA A   16,X             SET FLAG VAR.
00947 FF24 39      JXC2R     RTS                      EXIT
00948                        *
00949                        *  SUBROUTINE TO QUEUE A MESSAGE FOR XMISSION.
00950                        *
00951                        *  X-REG.=PTR. TO MSG. BUFFER  MAX. LENGTH 133 BYTE
00952                        *  A-REG.=TYPE(D0-D4);PRIORITY(D5-D7) 7=HIGHEST.
00953                        *
00954 FF25 97 4E   BSREQ     STA A   BWS+6            SAVE REG.
00955 FF27 DF 4C             STX     BWS+4            SAVE X
00956 FF29 CE 0405           LDX     #BSQ+45          MID-POINT OF QUEUE TABLE
00957 FF2C A6 00             LDA A   0,X              BUSY
00958 FF2E 27 09             BEQ     BSREQ1           NO
00959 FF30 CE 0435           LDX     #BSQ+93          YES, START AT END
00960 FF33 A6 00             LDA A   0,X              LAST BUSY
00961 FF35 27 02             BEQ     BSREQ1           NO
00962 FF37 0D               SEC                       TELL APPL. MSG. DIDNT GO.
00963 FF38 39               RTS                       YES CAN'T ACCEPT ANY MESSAGES
00964                        *
00965 FF39 09     BSREQ1     DEX                      DECREASE X BY 3 FOR NEXT TABL
00966 FF3A 09                DEX
00967 FF3B 09                DEX
00968 FF3C 8C 03D5           CPX     #BSQ-3           DONE
00969 FF3F 27 14             BEQ     BSTRQ            YES,STORE MSG.
00970 FF41 A6 00             LDA A   0,X              PRIORITY WORD.
00971 FF43 27 F4             BEQ     BSREQ1           ZERO, GET NEXT ENTRY
00972 FF45 91 4C             CMP A   BWS+4            HIGHER THAN CURRENT
00973 FF47 24 0C             BCC     BSTRQ            MEMORY LOWER THAN CURRENT MOV
00974 FF49 A7 03             STA A   3,X              MOVE MEMORY DOWN ONE SLOT.
00975 FF4B A6 01             LDA A   1,X
00976 FF4D A7 04             STA A   4,X
00977 FF4F A6 02             LDA A   2,X
00978 FF51 A7 05             STA A   5,X
00979 FF53 20 E4             BRA     BSREQ1           TRY NEXT
00980                        *
00981 FF55 96 4C   BSTRQ     LDA A   BWS+4            SET CURRENT INTO THIS SLOT.
00982 FF57 A7 03             STA A   3,X
00983 FF59 96 4D             LDA A   BWS+5
00984 FF5B A7 04             STA A   4,X
00985 FF5D 96 4E             LDA A   BWS+6
00986 FF5F A7 05             STA A   5,X
00987 FF61 8D 0F             BSR     BSCH             CHECK IF TOP CAN BE MOVED TO
00988 FF63 0C                CLC                      TELL APLL. MSG. WENT INTO MSG
00989 FF64 39                RTS
00990                        *
00991                        *
00992                        *  TO DO PROGRAM WHICH PULLS MESSAGES OUT OF
00993                        *  QUEUE FOR XMIT.
00994                        *
00995                        *
00996 FF65 8D 0B    BXSCH    BSR     BSCH             CHECK IF ANOTHER MSG. CAN BE
00997 FF67 B6 0429           LDA A   BSQ+81           SLOT 28
00998 FF6A 27 03             BEQ     *+5              IF FREE, CONTINUE.
00999 FF6C 7E FAE7           JMP     RS2              RESTART LOOP.
01000 FF6F 7E FF01           JMP     JXC4             BACK TO TO DO
01001                        *
01002                        *
01003                        *
01004                        *SET XMIT
01005                        *
01006 FF72 CE 03D8  BSCH     LDX     #BSQ             TOP OF QUEUE
01007 FF75 A6 00             LDA A   0,X              FIRST WORD
01008 FF77 27 0B             BEQ     BSCHE            NO MESSAGE, GET OUT
01009 FF79 97 2E             STA A   BASE+6           RESCHEDULE SELF
01010 FF7B A6 02             LDA A   2,X              PRIORITY AND TO DO FLAG
01011 FF7D DE 6E             LDX     BXWS+4           NEXT TO SEND
01012 FF7F 8C 005D           CPX     #BIMOKM
01013 FF82 27 01             BEQ     BMQTN            MOVE TOP OF QUEUE NEXT.
01014 FF84 39      BSCHE     RTS
01015                        *
01016 FF85 CE 0246  BMQTN    LDX     #SEND1           FIRST SEND BUFFER.
01017 FF88 9C 6A             CPX     BXWS             BUSY
```

```
01018 FF8A 27 04              BEQ    BTS2       YES
01019 FF8C 9C 6C              CPX    BXWS+2     BUSY AS DIRECT
01020 FF8E 26 0E              BNE    BSNDF      NO
01021 FF90 CE 02CC BTS2       LDX    #SEND2     CHECK SECOND BUFFER FREE
01022 FF93 9C 6A              CPX    BXWS
01023 FF95 27 04              BEQ    BTS3       NOT FREE, TRY BUFFER 3
01024 FF97 9C 6C              CPX    BXWS+2     DIRECT
01025 FF99 26 03              BNE    BSNDF      FREE
01026                  *
01027 FF9B CE 0352 BTS3       LDX    #SEND3     USE SEND3
01028 FF9E DF 4C   BSNDF      STX    BWS+4      NOT BUSY
01029 FFA0 FE 03D8            LDX    BSQ        BUFFER PTR.
01030 FFA3 DF 4E              STX    BWS+6      SAVE FOR LOOP
01031 FFA5 E6 00              LDA B  0,X        FIRST WORD
01032 FFA7 6F 00              CLR    0,X        CLEAR USER FIRST WORD.
01033 FFA9 BD FECC            JSR    BSBF       SET PROPER ACTIVITY FLAG.
01034 FFAC DE 4C              LDX    BWS+4      SEND BUFFER PTR.
01035 FFAE E7 00              STA B  0,X        FIRST WORD TO BUFFER
01036 FFB0 DF 6E              STX    BXWS+4     BUFFER PTR. TO NEXT
01037 FFB2 DE 4E              LDX    BWS+6      FROM BUFFER PTR.
01038 FFB4 A6 02              LDA A  2,X        GET NO. OF WORDS
01039 FFB6 8D 0D              BSR    BBMV+2     BLOCK MOVE SUBR.
01040                  *
01041 FFB8 CE 03D7            LDX    #BSQ-1     DONE , DO PULL UP
01042 FFBB 08   BSCHDL        INX               BUMP FOR LOOP
01043 FFBC A6 03              LDA A  3,X
01044 FFBE A7 00              STA A  0,X        PULL UP
01045 FFC0 26 F9              BNE    BSCHDL     NOT DONE LOOP
01046 FFC2 39                 RTS
01047                  *
01048                  *   BLOCK MOVE SUBROUTINE.
01049                  *   A= NO. OF BYTES TO MOVE
01050                  *   X= FROM BUFFER PTR. SAVED IN BWS+6
01051                  *   BWS+4 = TO BUFFER
01052                  *
01053 FFC3 E6 00   BBMV       LDA B  0,X        GET FROM BYTE
01054 FFC5 08                 INX
01055 FFC6 DF 4E              STX    BWS+6      SAVE FOR LOOP
01056 FFC8 DE 4C              LDX    BWS+4      GET 'TO' PTR.
01057 FFCA E7 00              STA B  0,X        STORE BYTE
01058 FFCC 08                 INX
01059 FFCD DF 4C              STX    BWS+4      SAVE
01060 FFCF DE 4E              LDX    BWS+6
01061 FFD1 4A                 DEC A             DONE
01062 FFD2 26 EF              BNE    BBMV       NO
01063 FFD4 39                 RTS               YES, EXIT
01064                  *
01065                  *
01066                  *
01067                  *   ROUTINE TO ALLOCATE AVAILABLE WORK SPACE.
01068                  *      INPUT= A-REG MOST SIGNIFICANT NO. WORDS WANTED.
01069                  *      INPUT= B-REG LEAST SIGNIFICANT NO. OF WORDS WAN
01070                  *
01071                  *      OUTPUT= X-REG STARTING LOCATION OF WORK SPACE.
01072                  *            = X-REG=0  IF INSUFFICIENT SPACE.
01073                  *
01074 FFD5 CE 0000 BGWS       LDX    #0         CLEAR X-REG IF NO ROOM
01075 FFD8 DB 25              ADD B  AWS+1      LOW ORDER
01076 FFDA 24 01              BCC    *+3        OVERFLOW
01077 FFDC 4C                 INC A             YES
01078 FFDD 9B 24              ADD A  AWS        HIGH ORDER
01079 FFDF 91 26              CMP A  AWS+2      HIGH ORDER OF END.
01080 FFE1 2B 06              BMI    BGWSOK     ROOM LEFT
01081 FFE3 26 0A              BNE    BGWSNO     NO ROOM LEFT
01082 FFE5 D1 27              CMP B  AWS+3      LOW ORDER
01083 FFE7 2A 06              BPL    BGWSNO     NOT ENOUGH SPACE
01084 FFE9 DE 24   BGWSOK     LDX    AWS        HERE IS WHERE SIT STARTS.
01085 FFEB 97 24              STA A  AWS        SET NEW HIGH ORDER.
01086 FFED D7 25              STA B  AWS+1      SET NEW LOW ORDER.
01087 FFEF 39     BGWSNO      RTS               EXIT
01088                  *
01089                  *
01090                  *  INTERRUPT POINTERS
01091 FFF0 EFF0              FDB    $EFF0      NMIP-4 VECTOR
01092 FFF2 EFF0              FDB    $EFF0      NMIP-3 VECTOR
01093 FFF4 F878              FDB    $F878      NMIP-2 VECTOR
01094 FFF6 FB78              FDB    NMI        NMIP-1 VECTOR
01095 FFF8 EFF0              FDB    $EFF0      IRQ
01096 FFFA EFF0              FDB    $EFF0
01097 FFFC EFF0              FDB    $EFF0      NMI FOR CONTROL PANEL
01098 FFFE FA00              FDB    START      POWER UP INTERRUPT
01099                  *
01100                         END
```

CROSS-REFERENCE TABLE

169 LABELS    489 REFERENCES

| Label | | | | | | | | |
|---|---|---|---|---|---|---|---|---|
| ACIARG | 22* | 161 | 263 | 449 | 521 | 533 | 569 | |
| ACIAST | 21* | 156 | 160 | 264 | 374 | 448 | 535 | |
| AL | 269* | 294 | 296 | 297 | 298 | 922 | | |
| AL1 | 271* | 288 | | | | | | |
| AL2 | 270* | 272 | | | | | | |
| AWS | 38* | 163 | 184 | 200 | 202 | 1075 | 1078 | 1079 | 1082 | 1084 |
| | 1085 | 1086 | | | | | | |
| BADDR | 67* | 423 | 458 | 723 | | | | |
| BADDRA | 66* | 606 | 619 | 722 | | | | |
| BADDX | 881* | | | | | | | |
| BADDX1 | 882* | 204 | | | | | | |
| BADDXA | 887* | 885 | | | | | | |
| BASE | 39* | 259 | 271 | 273 | 285 | 480 | 709 | 711 | 714 | 716 |
| | 758 | 760 | 778 | 780 | 849 | 871 | 904 | 905 | 1009 |
| BBMV | 1053* | 177 | 1039 | 1062 | | | | |
| BCLCKL | 815* | 819 | 829 | 851 | | | | |
| BCLKL1 | 853* | 817 | | | | | | |
| BCLOCK | 470* | 412 | 622 | | | | | |
| BCLUK | 83* | 792 | 793 | 796 | 807 | 809 | 813 | |
| BCMSC | 831* | 821 | | | | | | |
| BCNCTR | 605* | 626 | | | | | | |
| BCOS | 708* | 666 | 674 | 681 | 699 | | | |
| BCSSC | 835* | 823 | | | | | | |

| | | | | | | | | | | |
|---|---|---|---|---|---|---|---|---|---|---|
| BCSTD1 | 849* | 846 | | | | | | | | |
| BCSTDF | 838* | 825 | 832 | | | | | | | |
| BDFS | 781* | 779 | | | | | | | | |
| BDIRM | 745* | 664 | | | | | | | | |
| BDMCH | 647* | 640 | 643 | | | | | | | |
| BDMTCH | 753* | 747 | | | | | | | | |
| BDRS | 761* | 759 | | | | | | | | |
| BDSEC | 349* | 390 | | | | | | | | |
| BDSW | 765* | 754 | | | | | | | | |
| BDX | 197* | 199 | | | | | | | | |
| BEOM | 195* | 190 | | | | | | | | |
| BEOM1 | 207* | 201 | | | | | | | | |
| BEOM2 | 209* | | | | | | | | | |
| BEXIT | 485* | 474 | | | | | | | | |
| BGWS | 1074* | | | | | | | | | |
| BGWSNO | 1087* | 1081 | 1083 | | | | | | | |
| BGWSOK | 1084* | 1080 | | | | | | | | |
| BHDWE | 558* | 572 | | | | | | | | |
| BIL | 259* | 262 | | | | | | | | |
| BIMOK | 685* | 662 | 752 | | | | | | | |
| BIMOKN | 47* | 246 | 247 | 432 | 460 | 502 | 1012 | | | |
| BJC3L | 939* | 943 | | | | | | | | |
| BMC | 188* | 194 | | | | | | | | |
| BMDB | 632* | 628 | | | | | | | | |
| BME | 654* | 593 | | | | | | | | |
| BMFL | 623* | 599 | | | | | | | | |
| BMFL1 | 627* | 624 | | | | | | | | |
| BMONST | 720* | 689 | 713 | 715 | | | | | | |
| BMONT | 712* | 710 | 781 | | | | | | | |
| BMONT1 | 714* | 687 | | | | | | | | |
| BMOTN | 1016* | 1013 | | | | | | | | |
| BMRMG | 105* | 243 | 251 | 252 | 254 | 625 | 649 | 765 | | |
| BMSGLW | 65* | 592 | 604 | 630 | | | | | | |
| BMSSR | 329* | 419 | | | | | | | | |
| BMSSR1 | 338* | 345 | | | | | | | | |
| BMSSR2 | 342* | 332 | | | | | | | | |
| BMSU | 131* | 242 | 250 | 255 | 329 | | | | | |
| BNCARY | 587* | 585 | | | | | | | | |
| BNCEX1 | 805* | 802 | | | | | | | | |
| BNCT | 110* | 814 | 816 | 938 | 940 | | | | | |
| BNGSDT | 514* | 376 | | | | | | | | |
| BNGSR | 569* | 515 | | | | | | | | |
| BNKARY | 528* | 526 | | | | | | | | |
| BNRE | 387* | 378 | 383 | | | | | | | |
| BNTLST | 597* | 589 | | | | | | | | |
| BNTP | 438* | 428 | 433 | | | | | | | |
| BNTP1 | 439* | | | | | | | | | |
| BNTP2 | 436* | 363 | | | | | | | | |
| BPSEUD | 489* | 425 | | | | | | | | |
| BPTRTB | 120* | 167 | 182 | 186 | | | | | | |
| BQC | 399* | 351 | 357 | 365 | 414 | 418 | 494 | | | |
| BQC1 | 410* | 402 | | | | | | | | |
| BRIP | 580* | 581 | | | | | | | | |
| BRSTCW | 827* | 834 | 837 | | | | | | | |
| BS3 | 165* | 168 | | | | | | | | |
| BSBF | 866* | 1033 | | | | | | | | |
| BSBFX | 872* | 867 | | | | | | | | |
| BSCH | 1006* | 987 | 996 | | | | | | | |
| BSCHDL | 1042* | 1045 | | | | | | | | |
| BSCHL | 1014* | 1008 | | | | | | | | |
| BSCLCK | 620* | 529 | 545 | 550 | 553 | 556 | 563 | 566 | 602 | 611 |
| | | 613 | 616 | 631 | 633 | 637 | 646 | 650 | 740 | |
| BSCLKL | 814* | 795 | 811 | | | | | | | |
| BSDIR | 499* | 369 | 442 | | | | | | | |
| BSDIR1 | 504* | 493 | | | | | | | | |
| BSEND | 423* | 416 | | | | | | | | |
| BSNDF | 1028* | 1020 | 1025 | | | | | | | |
| BSPAR | 531* | 517 | | | | | | | | |
| BSQ | 109* | 956 | 959 | 968 | 997 | 1006 | 1029 | 1041 | | |
| BSREQ | 954* | | | | | | | | | |
| BSREQ1 | 965* | 958 | 961 | 971 | 979 | | | | | |
| BSRPT | 700* | 694 | | | | | | | | |
| BSTK | 202* | 183 | | | | | | | | |
| BSTRU | 981* | 969 | 973 | | | | | | | |
| BSWIT | 693* | 673 | | | | | | | | |
| BTIR | 359* | 353 | | | | | | | | |
| BTQ | 413* | 395 | | | | | | | | |
| BTS2 | 1021* | 1018 | | | | | | | | |
| BTS3 | 1027* | 1023 | | | | | | | | |
| BUPTR | 734* | 727 | 731 | 761 | | | | | | |
| BUPTRA | 739* | 736 | | | | | | | | |
| BWS | 42* | 174 | 269 | 274 | 275 | 277 | 278 | 279 | 284 | 287 |
| | | 788 | 789 | 790 | 791 | 797 | 812 | 824 | 831 | 835 | 841 |
| | | 842 | 844 | 850 | 868 | 869 | 870 | 882 | 884 | 886 | 887 |
| | | 888 | 897 | 902 | 910 | 937 | 945 | 954 | 955 | 972 | 981 |
| | | 983 | 985 | 1028 | 1030 | 1034 | 1037 | 1055 | 1056 | 1059 | 1060 |
| BXM | 447* | 341 | 437 | 509 | | | | | | |
| BXPC | 456* | 452 | | | | | | | | |
| BXSCH | 996* | 300 | | | | | | | | |
| BXW | 80* | | | | | | | | | |
| BXWS | 69* | 248 | 330 | 359 | 368 | 431 | 436 | 438 | 439 | 443 |
| | | 457 | 461 | 489 | 490 | 499 | 501 | 503 | 516 | 518 | 523 |
| | | 546 | 767 | 1011 | 1017 | 1019 | 1022 | 1024 | 1036 | | |
| BYPASS | 565* | 575 | | | | | | | | |
| CASINT | 13* | | | | | | | | | |
| CLCK | 43* | 472 | 473 | 476 | 477 | 917 | 920 | | | |
| CRPTR | 45* | 213 | 214 | 385 | 562 | 576 | 580 | 688 | 734 | 738 |
| DCHKA | 777* | 774 | | | | | | | | |
| DEVNO | 48* | 241 | 424 | 454 | 507 | 605 | 610 | 618 | 638 | 641 |
| | | 729 | | | | | | | | |
| DSTX | 776* | 772 | | | | | | | | |
| INTCON | 25* | 265 | 399 | 463 | 522 | 537 | 538 | 570 | | |
| IO | 19* | 193 | | | | | | | | |
| IRQINT | 15* | | | | | | | | | |
| JBUG | 17* | 299 | | | | | | | | |
| JCLL | 18* | | | | | | | | | |
| JDIR | 84* | 769 | | | | | | | | |
| JXC1 | 896* | | | | | | | | | |
| JXC2 | 937* | | | | | | | | | |
| JXC2N | 947* | 941 | | | | | | | | |
| JXC3 | 910* | | | | | | | | | |
| JXC3D | 902* | | | | | | | | | |
| JXC4 | 917* | 853 | 898 | 1000 | | | | | | |
| JXC4A | 922* | 918 | | | | | | | | |

```
LISTEN   50*   210   338   339   356   387   392   470   471   559
        560   573   678   680   702   704   725   733   750   751
        776   799   805   806
LPTR    103*   173
LTPR    294*   175
MCDAY   141*
MCDAYW  144*
MCHRS   140*
MCMIN   139*
MCMON   142*
MCMS    137*
MCSEC   138*
MCYEAR  143*
MEMST   152*   181
MONFLG   70*   335   336   400   404   426   430   543   555   686
        700   701   712   798   804
MPTR     44*   211   212   384   561   634   659   685   708   728
        739   757   768   777
NCLOCK  786*   295
NMI     373*  1094
NMIA    377*   375
NMICON   23*   256   408   479
NMICTA   61*   609   615   617   720
NMICTB   62*   361   506   645   648   745
NMICTR   59*   334   394   721
NMICWD   64*   257   405   407   478   696   697
NMIINT   14*
NMISEC   60*   350   389   505   565   748   753   756   766
NMIST    24*   239   373
PARITY   63*   381   456   524   528   531   539   583   587   655
PIANAC   29*   221   225
PIANAD   28*   223   226
PIANBC   31*   227   231
PIANBD   30*   229   233
RECV     96*
RS      284*   301   302   303   304   305   306   307   308   309
        310   311   312   313   314   315   316   317   318   319
        320   321   322   323   324   325
RS1     285*
RS2     286*   921   999
RWDCNT   46*   377   380   577   579   654
SEND1   106*  1016
SEND2   107*  1021
SEND3   108*  1027
START   157*  1098
SYSWD    26*   787
TFLAG    81*   481
TIRQ     33*   484

-- 3 0 --        DATE  12-21-77    TIME  10.818       ID = 9C   B-H.0

$$   2069T ENTERED B-H.0 AT 10.348 FROM SYSTEM-0 TSS/S    0-08-03

0001   $    SNUMB    2069T
0002   $    COMMENT  C00109              TSS CARDIN
0003  $$    USERID   C00109$#########
0004   $    IDENT    C00109,BERARDI - ASM6800                     00000010
0005  $$    USERID   C00109$#####                                 00000020
0006  $$    SELECT   C00109/MOTOROLA/ASM68                        00000030
0007*  $    OPTION   FORTRAN,NOMAP                                00000010
0008*  $    USE      .GTLIT                                       00000020
0009*  $$   SELECT   C00109/M68OBJ                                00000030
0010*  $    OBJECT   MAIN PROGRAM FOR M68ASM           Y08.723111677MPAM0000
0011*  $    DKEND    CONTINUE                                     MPAM0013
0012*  $    OBJECT                                     Y08.723111677000000000
0013*  $    DKEND    CONTINUE                                     00000026
0014*  $    OBJECT                                     Y08.724111677MPAM0000
0015*  $    DKEND    CONTINUE                                     MPAM0005
0016*  $    OBJECT                                     Y08.724111677MPAPAG00
0017*  $    DKEND    CONTINUE                                     MPAPAG08
0018*  $    OBJECT                                     Y08.724111677MPAPA100
0019*  $    DKEND    CONTINUE                                     MPAPA105
0020*  $    OBJECT                                     Y08.724111677MPUBSM00
0021*  $    DKEND    CONTINUE                                     MPUBSM04
0022*  $    OBJECT                                     Y08.724111677MPUCNA00
0023*  $    DKEND    CONTINUE                                     MPUCNA07
0024*  $    OBJECT                                     Y08.725111677MPUSNC00
0025*  $    DKEND    CONTINUE                                     MPUSNC03
0026*  $    OBJECT                                     Y08.725111677MPUXBS00
0027*  $    DKEND    CONTINUE                                     MPUXBS05
0028*  $    OBJECT                                     Y08.725111677MPUCA100
0029*  $    DKEND    CONTINUE                                     MPUCA104
0030*  $    OBJECT                                     Y08.725111677MPAM1000
0031*  $    DKEND    CONTINUE                                     MPAM1024
0032*  $    OBJECT                                     Y08.725111677MPAERR00
0033*  $    DKEND    CONTINUE                                     MPAERR07
0034*  $    OBJECT                                     Y08.726111677MPAFOP00
0035*  $    DKEND    CONTINUE                                     MPAFOP05
0036*  $    OBJECT                                     Y08.726111677MPAFSY00
0037*  $    DKEND    CONTINUE                                     MPAFSY06
0038*  $    OBJECT                                     Y08.726111677MPAGAM00
0039*  $    DKEND    CONTINUE                                     MPAGAM08
0040*  $    OBJECT                                     Y08.726111677MPAOPR00
0041*  $    DKEND    CONTINUE                                     MPAOPR15
0042*  $    OBJECT                                     Y08.726111677MPAOPT00
0043*  $    DKEND    CONTINUE                                     MPAOPT10
0044*  $    OBJECT                                     Y08.727111677MPAPRL00
0045*  $    DKEND    CONTINUE                                     MPAPRL26
0046*  $    OBJECT                                     Y08.727111677MPAPSC00
0047*  $    DKEND    CONTINUE                                     MPAPSC23
0048*  $    OBJECT                                     Y08.727111677MPASSY00
0049*  $    DKEND    CONTINUE                                     MPASSY09
0050*  $    OBJECT                                     Y08.727111677MPUADR00
```

```
0051*  $   DKEND    CONTINUE                                                    MPUADR06
0052*  $   OBJECT                                                   Y08.728111677MPUBNM00
0053*  $   DKEND    CONTINUE                                                    MPUBNM07
0054*  $   OBJECT                                                   Y08.728111677MPUFN000
0055*  $   DKEND    CONTINUE                                                    MPUFNO15
0056*  $   OBJECT                                                   Y08.728111677MPUGNC00
0057*  $   DKEND    CONTINUE                                                    MPUGNC08
0058*  $   OBJECT                                                   Y08.728111677MPUPIB00
0059*  $   DKEND    CONTINUE                                                    MPUPIB10
0060*  $   OBJECT                                                   Y08.728111677MPUPTS00
0061*  $   DKEND    CONTINUE                                                    MPUPTS09
0062*  $   OBJECT                                                   Y08.729111677MPUPTW00
0063*  $   DKEND    CONTINUE                                                    MPUPTW10
0064*  $   OBJECT                                                   Y08.729111677MPUXBY00
0065*  $   DKEND    CONTINUE                                                    MPUXBY04
0066*  $   OBJECT                                                   Y08.729111677MPUCA200
0067*  $   DKEND    CONTINUE                                                    MPUCA205
0068*  $   OBJECT                                                   Y08.729111677MPUCVC00
0069*  $   DKEND    CONTINUE                                                    MPUCVC04
0070*  $   OBJECT                                                   Y08.730111677MPUNEG00
0071*  $   DKEND    CONTINUE                                                    MPUNEG04
0072*  $   OBJECT                                                   Y08.730111677MPUOVF00
0073*  $   DKEND    CONTINUE                                                    MPUOVF05
0074*  $   OBJECT                                                   Y08.730111677MPAM2000
0075*  $   DKEND    CONTINUE                                                    MPAM2029
0076*  $   OBJECT                                                   Y08.730111677MPXRSV00
0077*  $   DKEND    CONTINUE                                                    MPXRSV08
0078*  $   OBJECT                                                   Y08.731111677MPXRTB00
0079*  $   DKEND                                                                MPXRTB31
0080*A$   EXECUTE                                                               00000040
0081*  $   LIMITS   .33K                                                        00000050
0082*  $   FILE     02,M1S                                                      00000060
0083*  $   FILE     07,,10L                                                     00000060
0084   $$  PRMFL    05,R,S,C00109/JBUGTEMP                                      00000040
0085   $$  PRMFL    06,R/W,S,C00109/JLIST                                       00000060
0086   $$  PRMFL    02,R/W,S,C00109/JBUGO                                       00000060
0087   $   ENDJOB                                                               00000070
   TOTAL CARD COUNT THIS JOB = 000420
```

```
* ACTY-01  $CARD #0080*  GELOAD   12/21/77   SW=000000000000
* NORMAL TERMINATION       AT 034263 I=5020 SW=000000000000

START  10.349    LINES       28    PROC  0.0203    I/O    0.002    IU   5    MEMORY
    STOP   10.373    LIMIT     5000    LIMIT 0.0500    LIMIT           CU   5    M*T
    SWAP    0.000
    LAPSE   0.024   FC D   TYPE    BUSY    IP/AT   FP/RT    IS/#C  MS/#E   ADDRESS  T#/PK#
                    R*  R  D450 *   530       0       0       34     34    0-08-05
                    07  R  D450 *   821       0      16      120    120    0-08-01
                    05  R  D450 P  1223       0      33       33     33    0-08-08
                    06  R  D450 P  1426       0      99      109    109    0-08-14
                    02  R  D450 P   142       0       7       13     13    0-08-18
                    P*     SYOUT
                    L*  R  D450 *   991       0       0     1100   1100R   0-08-08
                    *L  R  D450 *    38       0       0      850    850R   0-08-07

LIST    28 LINES AT STA.  9C
```

SNUMB = 2069T, ACTIVITY # = 01, , REPORT CODE = 74, RECORD COUNT = 000028

```
20691 01  12-21-77  10.350
ORIGIN  DATE MODULE ENTRY LOCATION    ENTRY LOCATION    ENTRY LOCATION    ENTRY LOCATION    ENTRY LOCATION

SUBPROGRAMS INCLUDED IN DECK.
   $      OPTION  FORTRAN,NOMAP                                                                00000010
   $      USE    .GTLIT                                                                        00000020

SUBPROGRAMS OBTAINED FROM SYSTEM LIBRARY

RANGE              SIZE
   ALLOCATED CORE    000000 THRU 101777        102000
   RELOCATABLE       025070 THRU 101777        054710
   COMMON            000100 THRU 020676        020577
         FILE       02,M1S                                                                     00000060
   $     FILE       07,I0L                                                                     00000040
   $     PRMFL      05,R,S,C00109/JBUGTEMP                                                     00000040
   $     PRMFL      06,R/W,S,C00109/JLIST                                                      00000060
   $     PRMFL      02,R/W,S,C00109/JBUGO                                                      00000060
*** NON FATAL ERROR * FILE CODE USED MORE THAN ONCE

FCB AND BUFFER SPACE  020700 THRU 025067     004170
   AVAILABLE             024610 THRU 025070     000261
   FILE CTRL BLKS                               003606
   MAXIMUM BUFFER SPACE REQUIRED

33K, IS THE MINIMUM MEMORY NEEDED TO LOAD THIS ACTIVITY WITH ALL FILES OPEN
   001754 LOCATIONS REQUIRED FOR LOAD TABLE
   EXECUTION PROGRAM ENTERED AT 101502 THROUGH .FSETU
   THERE WERE  000001 WARNING FLAGS IN THE ABOVE LOAD 740808  2/H
```

The embodiments of the invention in which an exclusive property or right is claimed are defined as follows:

1. A transceiver circuit for connecting a data processing unit to a communication bus, said data processing unit capable of transmitting, receiving and processing non-return to zero signals having a normal first level and assuming a second level to indicate a data bit and said communication bus capable of transmitting pulses to communicate a data bit, said transceiver circuit comprising:
- an input connected to said data processing unit for receiving non-return to zero signals to be transmitted;
- triggering means connected to said input and responsive to an edge of a non-return to zero signal to be transmitted to begin supplying triggering pulses having a predetermined frequency;
- gate means connected to both said triggering means and said input for passing said triggering pulses through as long as said non-return to zero signals to be transmitted are at their second level;
- pulse-no pulse means connected to said gate means and responsive to said triggering pulses for supplying said pulses to said communication bus;
- receive means connected to said communication bus for receiving pulses from said communication bus and converting them to non-return to zero signals to be processed; and,
- means connected to said receive means and to said data processing unit for transmitting said non-return to zero signals to be processed to said data processing means.

2. The transceiver circuit of claim 1 wherein said triggering means comprises a first counter enabled by said second level of said non-return to zero signals to be transmitted for counting a first clock signal and for providing said triggering pulses having said predetermined frequency.

3. The transceiver circuit of claim 2 wherein said pulse-no pulse means comprises a switching means having an input for receiving triggering pulses from said gate means, an output to begin supplying a pulse to said communication bus upon the receipt of a triggering pulse, and a reset input for terminating said pulses after a predetermined length of time which is less than the time between triggering pulses.

4. The transceiver circuit of claim 3 wherein said reset input comprises a counter enabled by the output of said switching means for counting a second clock signal and providing a reset signal to said switching means at the end of said predetermined length of time.

5. The transceiver circuit of claim 4 wherein said switching means comprises a flip-flop circuit.

6. The transceiver circuit of claim 5 wherein said gate means comprises a logic gate having a first input connected to said triggering means, a second input connected to said input of said transceiver circuit and an output connected to a set terminal of said flip-flop circuit.

7. The transceiver circuit of claim 1 wherein said pulse-no pulse means comprises a switching means having an input for receiving triggering pulses from said gate means, an output to begin supplying a pulse to said communication bus upon the receipt of a triggering pulse, and a reset input for terminating said pulse after a predetermined length of time which is less than the time between triggering pulses.

8. The transceiver circuit of claim 7 wherein said reset input comprises a counter enabled by the output of said switching means for counting a second clock signal and providing a reset signal to said switching means at the end of said predetermined length of time.

9. The transceiver circuit of claim 8 wherein said switching means comprises a flip-flop circuit.

10. The transceiver circuit of claim 9 wherein said gate means comprises a logic gate having a first input connected to said triggering means, a second input connected to said input of said transceiver circuit and an output connected to a set terminal of said flip-flop circuit.

11. A transceiver circuit for connecting a data processing unit to a communication bus, said data processing unit capable of transmitting, receiving and processing non-return to zero signals having a normal first level and assuming a second level to indicate a data bit and said communication bus capable of transmitting pulses to indicate a data bit, said transceiver circuit comprising:
- transmit means connected to said data processing unit for receiving non-return to zero signals to be transmitted and converting them to pulses to be transmitted;
- means connecting said transmit means to said communication bus;
- input means connected to said communication bus for receiving pulses to be processed;
- connecting means for connecting said pulses to be processed from said input means to an output;
- first switching means having a normal first level output connected to said output of said connecting means and responsive to said pulses to be processed to switch said first level output to a second level output; and,
- means for connecting said output of said switching means to said data processing unit.

12. The transceiver circuit of claim 11 wherein said first switching means comprises a counter being enabled by said second level output of said first switching means for counting a clock signal and resetting said output of said first switching means to its normal first level at the end of a first predetermined length of time longer than the duration of a pulse to be processed.

13. The transceiver circuit of claim 11 wherein said transmit means comprises an input connected to said data processing unit for receiving from said data processing unit non-return to zero signals to be transmitted, triggering means connected to said input of said transmit means and responsive to an edge of a non-return to zero signal to be transmitted to begin supplying triggering pulses having a predetermined frequency, gate means connected to both said triggering means and to said input of said transmit means for passing said triggering pulses through as long as said non-return to zero signals to be transmitted are at their second level, and pulse-no pulse means connected to said gate means and responsive to said triggering pulses for supplying said pulses to be transmitted to said communication bus.

14. The transceiver circuit of claim 13 wherein said triggering means comprises a first counter enabled by said second level of said non-return to zero signals to be transmitted for counting a first clock signal and for providing said triggering pulses having said predetermined frequency.

15. The transceiver circuit of claim 14 wherein said first switching means comprises a counter being enabled by said second level output of said first switching means for counting a clock signal and resetting said output of said first switching means to its normal first level at the end of a first predetermined length of time longer than the duration of a pulse to be processed.

16. The transceiver circuit of claim 14 wherein said pulse-no pulse means comprises a second switching means having an input for receiving triggering pulses from said gate means, an output to begin supplying a pulse to said communication bus upon the receipt of a triggering pulse, and a reset input for terminating said pulse after a second predetermined length of time which is less than the time between triggering pulses.

17. The transceiver circuit of claim 16 wherein said reset input comprises a counter enabled by the output of said second switching means for counting a clock signal and providing a reset signal to said second switching means at the end of said second predetermined length of time.

18. The transceiver circuit of claim 17 wherein said second switching means comprises a flip-flop circuit.

19. The transceiver circuit of claim 18 wherein said first switching means comprises a counter being enabled by said second level output of said first switching means for counting a clock signal and resetting said output of said first switching means to its normal first level at the end of a first predetermined length of time longer than the duration of a pulse to be processed.

20. The transceiver circuit of claim 19 wherein said gate means comprises a logic gate having a first input connected to said triggering means, a second input connected to said input of said transceiver circuit and an output connected to a set terminal of said flip-flop circuit.

21. The transceiver circuit of claim 11 wherein said pulse-no pulse means comprises a second switching means having an input for receiving triggering pulses from said gate means, an output to begin supplying a pulse to be transmitted to said communication bus upon the receipt of a triggering pulse, and a reset input for terminating said pulse to be transmitted after a second predetermined length of time which is less than the time between triggering pulses.

22. The transceiver circuit of claim 21 wherein said reset input comprises a counter enabled by the output of said second switching means for counting a clock signal and providing a reset signal to said second switching means at the end of said second predetermined length of time.

23. The transceiver circuit of claim 22 wherein said second switching means comprises a flip-flop circuit.

24. The transceiver circuit of claim 23 wherein said first switching means comprises a counter being enabled by said second level output of said first switching means for counting a clock signal and resetting said output of said first switching means to its normal first level at the end of a first predetermined length of time longer than the duration of a pulse to be processed.

* * * * *